US008972348B2

(12) United States Patent
Hopmann et al.

(10) Patent No.: US 8,972,348 B2
(45) Date of Patent: Mar. 3, 2015

(54) METHOD AND SYSTEM FOR SUPPORTING OFF-LINE MODE OF OPERATION AND SYNCHRONIZATION

(75) Inventors: Alexander I. Hopmann, Seattle, WA (US); Rebecca L. Anderson, Redmond, WA (US); Brian J. Deen, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/975,198

(22) Filed: Dec. 21, 2010

(65) Prior Publication Data

US 2011/0093597 A1 Apr. 21, 2011

Related U.S. Application Data

(63) Continuation of application No. 11/613,157, filed on Dec. 19, 2006, now Pat. No. 7,865,469, which is a continuation of application No. 10/459,380, filed on Jun. 10, 2003, now Pat. No. 7,240,091, which is a continuation of application No. 09/412,766, filed on Oct. 4, 1999, now Pat. No. 6,578,054.

(51) Int. Cl.
*G06F 17/00* (2006.01)
*G06F 17/30* (2006.01)
(Continued)

(52) U.S. Cl.
CPC .... *G06F 17/30575* (2013.01); *G06F 17/30578* (2013.01); *G06Q 10/107* (2013.01);
(Continued)

(58) Field of Classification Search
None
See application file for complete search history.

(56) References Cited

U.S. PATENT DOCUMENTS 4,058,672 A 11/1977 Crager ........................ 370/394
4,558,413 A * 12/1985 Schmidt et al. ............... 717/170
(Continued)

FOREIGN PATENT DOCUMENTS

CA 2120461 3/1994 ............. G06F 20/00
EP 0 462 587 11/1996 ............. G06F 17/30
(Continued)

OTHER PUBLICATIONS

Amended Complaint for Patent Infringement, filed Oct. 6, 2010, in U.S. Dist. Court for the Western District of Washington, CA 2:10-cv-1577-RSM, 9 pgs.
(Continued)

*Primary Examiner* — Kaveh Abrishamkar
*Assistant Examiner* — James J Wilcox
(74) *Attorney, Agent, or Firm* — Louise Bowman; Jim Ross; Micky Minhas

(57) ABSTRACT

Systems and methods for synchronizing multiple copies of data in a network environment that includes servers and clients so that incremental changes made to one copy of the data can be identified, transferred, and incorporated into all other copies of the data. The synchronization can be accomplished regardless of whether modifications to the data have been made by a client while the client is in an on-line or off-line mode of operation. The clients cache data locally as data are modified and downloaded. The caching enables the clients to access the data and allows the synchronization to be performed without transmitting a particular version more than once between a client and a server. Such elimination of redundant data transmission results in an efficient use of time and network bandwidth.

13 Claims, 8 Drawing Sheets

(51) Int. Cl.
  *G06Q 10/10* (2012.01)
  *H04L 29/08* (2006.01)
  *G06F 7/00* (2006.01)
(52) U.S. Cl.
  CPC ........ *H04L67/1095* (2013.01); *H04L 67/2842* (2013.01); *Y10S 707/99952* (2013.01); *Y10S 707/99953* (2013.01); *Y10S 707/959* (2013.01)
  USPC .......... 707/638; 707/203; 707/226; 707/695; 707/999.201; 707/999.202; 707/959

(56) References Cited

U.S. PATENT DOCUMENTS

| | | | |
|---|---|---|---|
| 4,631,673 A | 12/1986 | Haas | |
| 4,780,821 A | 10/1988 | Crossley | 718/100 |
| 4,789,962 A | 12/1988 | Berry et al. | 715/715 |
| 4,853,843 A * | 8/1989 | Ecklund | 1/1 |
| 4,887,204 A * | 12/1989 | Johnson et al. | 1/1 |
| 4,945,475 A | 7/1990 | Bruffey | 1/1 |
| 4,945,476 A | 7/1990 | Bodick | 600/301 |
| 4,987,531 A | 1/1991 | Nishikado | 1/1 |
| 4,999,766 A | 3/1991 | Peters | 1/1 |
| 5,058,000 A | 10/1991 | Cox | 1/1 |
| 5,083,264 A | 1/1992 | Platteter | 714/5.11 |
| 5,129,088 A | 7/1992 | Auslander | 711/1 |
| 5,157,768 A | 10/1992 | Hoeber | 715/711 |
| 5,179,703 A | 1/1993 | Evans | 717/122 |
| 5,202,982 A | 4/1993 | Gramlich | 1/1 |
| 5,202,983 A | 4/1993 | Orita | 707/694 |
| 5,204,947 A | 4/1993 | Bernstein | 715/854 |
| 5,241,545 A | 8/1993 | Kazecki | 370/337 |
| 5,243,697 A | 9/1993 | Hoeber | 715/840 |
| 5,249,300 A | 9/1993 | Bachman | 1/1 |
| 5,287,502 A | 2/1994 | Kaneko | 1/1 |
| 5,291,595 A | 3/1994 | Martins | 1/1 |
| 5,297,249 A | 3/1994 | Bernstein | 715/854 |
| 5,307,494 A | 4/1994 | Yasumatsu | 1/1 |
| 5,313,646 A | 5/1994 | Hendricks | 1/1 |
| 5,317,733 A | 5/1994 | Murdock | 1/1 |
| 5,329,427 A | 7/1994 | Hogdahl | 361/730 |
| 5,333,266 A | 7/1994 | Boaz | 709/206 |
| 5,347,628 A | 9/1994 | Brewer | 715/775 |
| 5,347,653 A * | 9/1994 | Flynn et al. | 707/695 |
| 5,355,497 A | 10/1994 | Cohen-Levy | 1/1 |
| 5,359,724 A | 10/1994 | Earle | 1/1 |
| 5,359,725 A | 10/1994 | Garcia | 1/1 |
| 5,363,487 A | 11/1994 | Willman | 710/8 |
| 5,367,671 A | 11/1994 | Feigenbaum | 1/1 |
| 5,371,885 A | 12/1994 | Letwin | 1/1 |
| 5,388,257 A | 2/1995 | Bauer | 707/741 |
| 5,392,390 A | 2/1995 | Crozier | 715/751 |
| 5,392,427 A | 2/1995 | Barrett | 707/800 |
| 5,412,808 A | 5/1995 | Bauer | 707/822 |
| 5,421,001 A | 5/1995 | Methe | 1/1 |
| 5,434,974 A | 7/1995 | Loucks | 1/1 |
| 5,434,994 A | 7/1995 | Shaheen | |
| 5,437,029 A | 7/1995 | Sinha | 1/1 |
| 5,483,652 A | 1/1996 | Sudama | 709/201 |
| 5,485,606 A | 1/1996 | Midgdey | 1/1 |
| 5,530,828 A | 6/1996 | Kaki | 711/103 |
| 5,535,375 A | 7/1996 | Eshel | 703/27 |
| 5,537,592 A | 7/1996 | King | |
| 5,560,005 A | 9/1996 | Hoover | |
| 5,579,517 A | 11/1996 | Reynolds | 1/1 |
| 5,581,686 A | 12/1996 | Koppolu | 715/784 |
| 5,596,755 A | 1/1997 | Pletcher et al. | 710/261 |
| 5,598,370 A | 1/1997 | Niijima | 365/185.33 |
| 5,600,834 A | 2/1997 | Howard | 713/178 |
| 5,627,996 A | 5/1997 | Bauer | 703/20 |
| 5,630,081 A | 5/1997 | Rybicki | 715/839 |
| 5,647,002 A | 7/1997 | Brunson | 709/206 |
| 5,664,228 A | 9/1997 | Mital | 710/62 |
| 5,666,530 A | 9/1997 | Clark | 1/1 |
| 5,684,990 A | 11/1997 | Boothby | 1/1 |
| 5,694,606 A | 12/1997 | Pletcher | 710/261 |
| 5,701,423 A | 12/1997 | Crozier | 715/762 |
| 5,721,922 A | 2/1998 | Dingwall | 718/103 |
| 5,729,687 A | 3/1998 | Rothrock | 709/204 |
| 5,734,816 A | 3/1998 | Niijima | 714/6.13 |
| 5,737,601 A | 4/1998 | Jain | 707/622 |
| 5,745,418 A | 4/1998 | Ma | 365/185.33 |
| 5,745,752 A | 4/1998 | Hurvig | 1/1 |
| 5,745,902 A | 4/1998 | Miller | 1/1 |
| 5,754,848 A | 5/1998 | Hanes | 1/1 |
| 5,757,616 A | 5/1998 | May | 361/679.57 |
| 5,758,352 A | 5/1998 | Reynolds | 1/1 |
| 5,758,354 A | 5/1998 | Huang | 1/1 |
| 5,761,675 A | 6/1998 | Isenberg | 1/1 |
| 5,765,169 A | 6/1998 | Liencres et al. | 711/143 |
| 5,767,854 A | 6/1998 | Anwar | 715/848 |
| 5,787,262 A | 7/1998 | Shakib | 709/205 |
| 5,799,168 A | 8/1998 | Ban | 711/103 |
| 5,799,305 A | 8/1998 | Bortvedt | 1/1 |
| 5,805,830 A | 9/1998 | Reese | 709/205 |
| 5,806,074 A * | 9/1998 | Souder et al. | 1/1 |
| 5,812,749 A | 9/1998 | Fernandez | 714/4.4 |
| 5,812,773 A | 9/1998 | Norin | 709/204 |
| 5,812,793 A | 9/1998 | Shakib | 709/201 |
| 5,813,009 A * | 9/1998 | Johnson et al. | 707/695 |
| 5,819,275 A | 10/1998 | Badger | 707/758 |
| 5,826,265 A | 10/1998 | Van Huben | 1/1 |
| 5,832,218 A | 11/1998 | Gibbs | 709/203 |
| 5,832,489 A | 11/1998 | Kucala | 1/1 |
| 5,832,512 A * | 11/1998 | Mastors et al. | 1/1 |
| 5,856,978 A | 1/1999 | Anthias | 370/429 |
| 5,864,837 A * | 1/1999 | Maimone | 1/1 |
| 5,867,641 A | 2/1999 | Jenett | 714/6.32 |
| 5,870,759 A * | 2/1999 | Bauer et al. | 1/1 |
| 5,878,408 A | 3/1999 | Van Huben | 1/1 |
| 5,884,323 A | 3/1999 | Hawkins | 1/1 |
| 5,884,325 A | 3/1999 | Bauer | 1/1 |
| 5,884,328 A | 3/1999 | Mosher | 1/1 |
| 5,887,198 A | 3/1999 | Houlberg | 710/62 |
| 5,903,752 A | 5/1999 | Dingwall | 718/103 |
| 5,920,725 A * | 7/1999 | Ma et al. | 717/171 |
| 5,920,873 A | 7/1999 | Van Huben | 1/1 |
| 5,924,094 A | 7/1999 | Sutter | 1/1 |
| 5,924,096 A | 7/1999 | Draper | 1/1 |
| 5,926,501 A | 7/1999 | Souissi | 375/131 |
| 5,926,805 A | 7/1999 | Hurvig | 707/690 |
| 5,926,816 A | 7/1999 | Bauer | |
| 5,928,329 A | 7/1999 | Clark | 709/227 |
| 5,930,268 A | 7/1999 | Kurby et al. | 379/355.06 |
| 5,930,350 A | 7/1999 | Johnson | 379/355.06 |
| 5,937,425 A | 8/1999 | Ban | 711/103 |
| 5,943,055 A | 8/1999 | Sylvan | 715/839 |
| 5,956,473 A | 9/1999 | Ma | 714/5.1 |
| 5,960,406 A | 9/1999 | Rasansky | 705/7.18 |
| 5,961,590 A | 10/1999 | Mendez | 709/206 |
| 5,974,426 A | 10/1999 | Lee | 1/1 |
| 5,991,760 A | 11/1999 | Gauvin | |
| 5,991,771 A | 11/1999 | Falls | 1/1 |
| 5,991,778 A | 11/1999 | Starek | 1/1 |
| 6,014,724 A | 1/2000 | Jenett | 711/103 |
| 6,016,478 A | 1/2000 | Zhang | 705/7.19 |
| 6,018,571 A | 1/2000 | Langlois | 379/201.04 |
| 6,018,761 A | 1/2000 | Uomini | 709/206 |
| 6,034,621 A | 3/2000 | Kaufman | 340/7.21 |
| 6,035,297 A * | 3/2000 | Van Huben et al. | 707/695 |
| 6,049,799 A | 4/2000 | Mangat | |
| 6,055,527 A | 4/2000 | Badger | 1/1 |
| 6,058,401 A | 5/2000 | Stamos | 1/1 |
| 6,070,174 A | 5/2000 | Starek | 1/1 |
| 6,078,999 A | 6/2000 | Raju | 711/161 |
| 6,085,198 A | 7/2000 | Skinner | |
| 6,098,093 A | 8/2000 | Bayeh | 709/203 |
| 6,101,506 A * | 8/2000 | Ukai et al. | 707/695 |
| 6,141,564 A | 10/2000 | Bruner | 455/558 |
| 6,178,529 B1 * | 1/2001 | Short et al. | 714/51 |
| 6,182,117 B1 | 1/2001 | Christie | |
| 6,202,085 B1 | 3/2001 | Benson | |
| 6,208,996 B1 | 3/2001 | Ben-Shachar | 1/1 |
| 6,233,606 B1 * | 5/2001 | Dujari | 709/213 |
| 6,240,414 B1 | 5/2001 | Beizer | |

(56) References Cited

U.S. PATENT DOCUMENTS

| | | |
|---|---|---|
| 6,256,740 B1 | 7/2001 | Muller et al. |
| 6,269,254 B1 | 7/2001 | Mathis ............................ 455/557 |
| 6,279,069 B1 | 8/2001 | Robinson ........................ 711/103 |
| 6,289,358 B1 * | 9/2001 | Mattis et al. ................... 707/695 |
| 6,289,410 B1 | 9/2001 | Cummins |
| 6,345,308 B1 | 2/2002 | Abe |
| 6,347,051 B2 | 2/2002 | Yanagami ................... 365/185.09 |
| 6,351,753 B1 * | 2/2002 | Jagadish et al. ........................ 1/1 |
| 6,377,540 B1 | 4/2002 | Hogberg |
| 6,405,218 B1 | 6/2002 | Boothby ................................ 1/1 |
| 6,430,564 B1 | 8/2002 | Judge |
| 6,457,065 B1 | 9/2002 | Rich |
| 6,487,560 B1 * | 11/2002 | LaRue et al. .................... 707/625 |
| 6,553,409 B1 * | 4/2003 | Zhang et al. .................... 709/213 |
| 6,578,069 B1 * | 6/2003 | Hopmann et al. ............. 709/203 |
| 6,584,185 B1 | 6/2003 | Nixom ....................... 379/201.01 |
| 6,694,335 B1 | 2/2004 | Hopmann et al. |
| 6,741,994 B1 | 5/2004 | Kang ....................................... 1/1 |
| 6,757,705 B1 * | 6/2004 | Pardikar et al. ................ 709/203 |
| 6,928,300 B1 | 8/2005 | Skinner ........................ 455/556.2 |
| 6,944,642 B1 | 9/2005 | Hopmann |
| 2002/0046299 A1 | 4/2002 | Lefeber ........................... 719/318 |
| 2002/0052968 A1 | 5/2002 | Bonefas .......................... 709/231 |
| 2002/0184407 A1 | 12/2002 | Shell ............................... 719/328 |
| 2003/0028602 A1 | 2/2003 | Bhattacharya ................ 709/206 |
| 2003/0083046 A1 | 5/2003 | Mathis ......................... 455/412.1 |
| 2003/0148790 A1 | 8/2003 | Pappalardo .................... 455/558 |
| 2004/0066920 A1 | 4/2004 | Vandermeijden ........... 379/88.19 |
| 2005/0033863 A1 | 2/2005 | Tosey |
| 2005/0091219 A1 | 4/2005 | Karachale ............................. 1/1 |

FOREIGN PATENT DOCUMENTS

| | | | |
|---|---|---|---|
| EP | 0 578 205 | 3/2000 | ............. G06F 17/30 |
| EP | 0994614 | 4/2000 | ............. H04L 29/06 |
| EP | 0 618 540 | 12/2001 | ............. G06F 17/30 |
| JP | 64-41039 | 2/1989 | ............. G06F 12/00 |
| JP | 1-315843 | 12/1989 | ............. G06F 12/00 |
| JP | 2-148341 | 6/1990 | ............. G06F 12/00 |
| JP | 4-297934 | 10/1992 | ............. G06F 12/00 |
| JP | 6-19763 | 1/1994 | ............. G06F 12/00 |
| WO | WO96/06393 | 2/1996 | ................ G06F 9/44 |

OTHER PUBLICATIONS

Complaint for Patent Infringement, filed Nov. 10, 2010, in U.S. Dist. Court for the Southern District of Florida, CA 1:10-cv-24063-FAM, 15 pgs.
Defendant Microsoft Corporation's Answer and Counterclaims to Plaintiff's First Amended Complaint for Patent Infringement, filed Jan. 15, 2011, in U.S. Dist. Court for the Western District of Wisconsin, CA No. 3:10-cv-699, 39 pgs.
Defendant Microsoft Corporation's Answer and Counterclaims to Plaintiff's Complaint for Patent Infringement, filed Dec. 23, 2010, in U.S. Dist. Court for the Southern District of Florida, 21 pgs.
First Amended Complaint for Patent Infringement, filed Jan. 11, 2011, in U.S. Dist. Court for the Western District of Wisconsin, CA No. 3:10-cv-699, 13 pgs.
ITC Investigation No. 337-744, captioned: "Certain Mobile Devices, Associated Software, and Components Thereof" Doc. No. 584043-434902_15 "Appendix B4_107 Lang Translation of Pit's Boese Ltr 2004".
ITC Investigation No. 337-744, captioned: "Certain Mobile Devices, Associated Software, and Components Thereof" Doc. No. 584057-434902_29 "Appendix B4_122 Microsoft Common Name Ex. 15 1994".
ITC Investigation No. 337-744, captioned: "Certain Mobile Devices, Associated Software, and Components Thereof" Doc. No. 584058-434902_30 "Appendix B4_123 Microsoft File sharing Protocol 1988".
ITC Investigation No. 337-744, captioned: "Certain Mobile Devices, Associated Software, and Components Thereof" Doc. No. 584076-434902_48 "Appendix B4_142 Rock Ridge Prot Vers. 1.09 1991".
ITC Investigation No. 337-744, captioned: "Certain Mobile Devices, Associated Software, and Components Thereof" Doc. No. 584080-434902_52 "Appendix B4_145 Saiedian Frame for Assessment 1996".
ITC Investigation No. 337-744, captioned: "Certain Mobile Devices, Associated Software, and Components Thereof" Doc. No. 584098-434902_70 "Appendix B4_164 WSC Extend-A-Name 1988".
ITC Investigation No. 337-744, captioned: "Certain Mobile Devices, Associated Software, and Components Thereof" Doc. No. 584134-434903_34 "Appendix D2_009 Cappelletti Mobile Computing Beyond Laptops 1997".
ITC Investigation No. 337-744, captioned: "Certain Mobile Devices, Associated Software, and Components Thereof" Doc. No. 584135-434903_35 "Appendix D2_010 Darby Bridging Wireless and Wired Networks 1999".
ITC Investigation No. 337-744, captioned: "Certain Mobile Devices, Associated Software, and Components Thereof" Doc. No. 584136-434903_36 "Appendix D2_011 Davies L2imbo A Distributed Systems Platform 1998".
ITC Investigation No. 337-744, captioned: "Certain Mobile Devices, Associated Software, and Components Thereof" Doc. No. 584137-434903_37 "Appendix D2_012 Kristoffersen Making Place to Make IT Work 1999".
ITC Investigation No. 337-744, captioned: "Certain Mobile Devices, Associated Software, and Components Thereof" Doc. No. 584138-434903_38 "Appendix D2_013 Mattila Design Designing Mobile Phones 1999".
ITC Investigation No. 337-744, captioned: "Certain Mobile Devices, Associated Software, and Components Thereof" Doc. No. 584139-434903_39 "Appendix D2_014 Steeman Wireless Application Protocol (WAP) 2000".
ITC Investigation No. 337-744, captioned: "Certain Mobile Devices, Associated Software, and Components Thereof" Doc. No. 584140-434903_40 "Appendix D2_015 Tso Always On Always Connected 1996".
ITC Investigation No. 337-744, captioned: "Certain Mobile Devices, Associated Software, and Components Thereof" Doc. No. 583756-434904_20 "Appendix F2_008.Inouye Dyami . . . rk Reconfiguration (2007)".
ITC Investigation No. 337-744, captioned: "Certain Mobile Devices, Associated Software, and Components Thereof" Doc. No. 585219-534905_59 "Appendix H2_013.Borenstein MIME Part One_ 1993".
Borenstein, et al., RFC 1521, "MIME (Multipurpose Internet Mail Extensions) Part One: Mechanisms for Specifying and Describing the Format of Internet Message Bodies," Sep. 1993, 75 pgs.
Fielding, et al., RFC 2068, "Hypertext Transfer Protocol—HTTP/1.1" Jan. 1997, 162 pgs.
Fielding, et al. RFC 2616, "Hypertext Transfer Protocol—HTTP/1.1" Jun. 1999, 176 pgs.
Goland, et al., RFC 2518, "HTTP Extension for Distributed Authoring—WEBDAV," Feb. 1999, 94 pgs.
Martin J., "Design and Strategy for Distributed Data Processing," Prentice-Hall, 1998, pp. 273-304, 38 pgs.
Slein, et al., RFC 2291. "Requirements for a Distributed Authoring and Versioning Protocol for the World Wide Web," Feb. 1998, 21 pgs.
Yavin, D., "Republication's Fast Track," BYTE, Aug. 1995, pp. 88a-88d, 990, 4 pgs.
Notice of Allowance and Fee(s) Due mailed Aug. 26, 2010 in U.S. Appl. No. 11/613,157.
Notice of Allowance and Fee(s) Due mailed May 27, 2010 in U.S. Appl. No. 11/613,157.
Amendment and Response to Non-Final Office Action mailed Dec. 1, 2009 in U.S. Appl. No. 11/613,157, filed Apr. 1, 2010.
Non-Final Office Action mailed Dec. 1, 2009 in U.S. Appl. No. 11/613,157.
Amendment and Response to Final Office Action mailed Jul. 28, 2009 in U.S. Appl. No. 11/613,157, filed Sep. 28, 2009.
Final Office Action mailed Jul. 28, 2009 in U.S. Appl. No. 11/613,157.
Supplemental Amendment filed Apr. 29, 2009 in U.S. Appl. No. 11/613,157.

(56) References Cited

OTHER PUBLICATIONS

Amendment and Response to Non-Final Office Action mailed Oct. 15, 2008 in U.S. Appl. No. 11/613,157, filed Mar. 16, 2009.
Non-Final Office Action mailed Oct. 15, 2008 in U.S. Appl. No. 11/613,157.
Notice of Allowance and Fee(s) Due mailed Mar. 6, 2007 in U.S. Appl. No. 10/459,380.
Amendment and Response to Non-Final Office Action mailed Sep. 19, 2006 in U.S. Appl. No. 10/459,380, filed Dec. 19, 2006.
Non-Final Office Action mailed Sep. 19, 2006 in U.S. Appl. No. 10/459,380.
Amendment and Response to Final Office Action mailed Apr. 3, 2006 in U.S. Appl. No. 10/459,380, filed Jul. 10, 2006.
Final Office Action mailed Apr. 3, 2006 in U.S. Appl. No. 10/459,380.
Amendment and Response to Non-Final Office Action mailed Nov. 4, 2005 in U.S. Appl. No. 10/459,380, filed Feb. 6, 2006.
Non-Final Office Action mailed Nov. 4, 2005 in U.S. Appl. No. 10/459,380.
Notice of Allowance and Fee(s) Due mailed Jan. 21, 2003 in U.S. Appl. No. 09/412,766.
Supplemental Response filed Jan. 10, 2003 in U.S. Appl. No. 09/412,766.
Amendment and Response to Non-Final Office Action Mailed Jun. 17, 2002 in U.S. Appl. No. 09/412,766, filed Oct. 21, 2002.
Non-Final Office Action mailed Jun. 21, 2002 in U.S. Appl. No. 09/412,766.
ITC Investigation No. 337-744, captioned: "*Certain Mobile Devices, Associated Software, and Components Thereof*" Doc. No. 434896-583843_13 "*Appendix A4_013 Duncan Des Goals 1989*".
ITC Investigation No. 337-744, captioned: "*Certain Mobile Devices, Associated Software, and Components Thereof*" Doc. No. 434896-583844_14 "*Appendix A4_014 Duncan Using Long File Names Prt 1 1990*".
ITC Investigation No. 337-744, captioned: "*Certain Mobile Devices, Associated Software, and Components Thereof*" Doc. No. 434896-583845_15 "*Appendix A4_015.Duncan Using Long File Names Prt 2 1990*".
ITC Investigation No. 337-744, captioned: "*Certain Mobile Devices, Associated Software, and Components Thereof*" Doc. No. 434896-583846_16 "*Appendix A4_016 Leffler 4.3BSD Unix 1989*".
ITC Investigation No. 337-744, captioned: "*Certain Mobile Devices, Associated Software, and Components Thereof*" Doc. No. 434896-583847_17 "*Appendix A4_017 Wang Universal File 1990*".
ITC Investigation No. 337-744, captioned: "*Certain Mobile Devices, Associated Software, and Components Thereof*" Doc. No. 434896-583848_18 "Appendix A4_018 WSC Extend-A-Name 1988".
ITC Investigation No. 337-744, captioned: "*Certain Mobile Devices, Associated Software, and Components Thereof*" Doc. No. 434897-585091_24 "*Appendix A5_055 2010 Software Sherlock 2.0 1998*".
ITC Investigation No. 337-744, captioned: "*Certain Mobile Devices, Associated Software, and Components Thereof*" Doc. No. 434897-585092_25 "*Appendix A5_056 Acerson WordPerfect 5.1 1990*".
ITC Investigation No. 337-744, captioned: "*Certain Mobile Devices, Associated Software, and Components Thereof*" Doc. No. 434897-585093_26 "*Appendix A5_057 Allen Vices and Virtues 1993*".
ITC Investigation No. 337-744, captioned: "*Certain Mobile Devices, Associated Software, and Components Thereof*" Doc. No. 434897-585098_31 "*Appendix A5_062 Blackwell WSC Launches Extend 1990*".
ITC Investigation No. 337-744, captioned: "*Certain Mobile Devices, Associated Software, and Components Thereof*" Doc. No. 434897-585101_34 "*Appendix A5_065 Bonner Whats in 1988*".
ITC Investigation No. 337-744, captioned: "*Certain Mobile Devices, Associated Software, and Components Thereof*" Doc. No. 434897-585111_44 "*Appendix A5_075 Dateline Gold Retr 2.0b 1993*".
ITC Investigation No. 337-744, captioned: "*Certain Mobile Devices, Associated Software, and Components Thereof*" Doc. No. 434897-585112_45 "*Appendix A5_076 Dateline The Intell Way 1987*".
ITC Investigation No. 337-744, captioned: "*Certain Mobile Devices, Associated Software, and Components Thereof*" Doc. No. 434897-585113_46 "*Appendix A5_077 Davis NT No Thanks 1993*".
ITC Investigation No. 337-744, captioned: "*Certain Mobile Devices, Associated Software, and Components Thereof*" Doc. No. 434897-585114_47 "*Appendix A5_078 Derfler Build Workgroup Sol 1988*".
ITC Investigation No. 337-744, captioned: "*Certain Mobile Devices, Associated Software, and Components Thereof*" Doc. No. 434897-585115_48 "*Appendix A5_079 DeVoney NT Has Arrived 1993*".
ITC Investigation No. 337-744, captioned: "*Certain Mobile Devices, Associated Software, and Components Thereof*" Doc. No. 434897-585116_49 "*Appendix A5_080 Dig Res Intr ROM 1988*".
ITC Investigation No. 337-744, captioned: "*Certain Mobile Devices, Associated Software, and Components Thereof*" Doc. No. 434899-583913_33 "*Appendix B3_021 Blackwell WSC Launches Extend 1990*".
ITC Investigation No. 337-744, captioned: "*Certain Mobile Devices, Associated Software, and Components Thereof*" Doc. No. 434899-583914_34 "*Appendix B3_022 Bonner Build a Doc 1991*".
ITC Investigation No. 337-744, captioned: "*Certain Mobile Devices, Associated Software, and Components Thereof*" Doc. No. 434899-583916_36 "*Appendix B3_024 Dateline Gold Retr 2.0b 1993*".
ITC Investigation No. 337-744, captioned: "*Certain Mobile Devices, Associated Software, and Components Thereof*" Doc. No. 434899-583917_37 "*Appendix B3_025.Dateline the Intell Way 1987*".
ITC Investigation No. 337-744, captioned: "*Certain Mobile Devices, Associated Software, and Components Thereof*" Doc. No. 434899-583918_38 "*Appendix B3_026 duncan Des Goals 1989*".
ITC Investigation No. 337-744, captioned: "*Certain Mobile Devices, Associated Software, and Components Thereof*" Doc. No. 434899-583919_39 "*Appendix B3_027 Duncan Using Long File Names Prt 1 1990*".
ITC Investigation No. 337-744, captioned: "*Certain Mobile Devices, Associated Software, and Components Thereof*" Doc. No. 434899-583920_40 "*Appendix B3_028 Duncan Using Long File Names Prt 2 1990*".
ITC Investigation No. 337-744, captioned: "*Certain Mobile Devices, Associated Software, and Components Thereof*" Doc. No. 434899-583921_41 "*Appendix B3_029 Glass Create Own Env 1990*".
ITC Investigation No. 337-744, captioned: "*Certain Mobile Devices, Associated Software, and Components Thereof*" Doc. No. 434899-583922_42 "*Appendix B3_030 Hurwicz MS-DOS 3.1 1985*".
ITC Investigation No. 337-744, captioned: "*Certain Mobile Devices, Associated Software, and Components Thereof*" Doc. No. 434899-583923_43 "*Appendix B3_031 Leffler 4 3BSD Unix 1989*".
ITC Investigation No. 337-744, captioned: "*Certain Mobile Devices, Associated Software, and Components Thereof*" Doc. No. 434899-583924_44 "Appendix B3_032 Lent New Improv Wind 1993".
ITC Investigation No. 337-744, captioned: "*Certain Mobile Devices, Associated Software, and Components Thereof*" Doc. No. 434899-583925_45 "Appendix B3_033 Mallory DOS Filename 1993".
ITC Investigation No. 337-744, captioned: "*Certain Mobile Devices, Associated Software, and Components Thereof*" Doc. No. 434899-583926_46 "*Appendix B3_034 McCormick Present Mgr 1990*".
ITC Investigation No. 337-744, captioned: "*Certain Mobile Devices, Associated Software, and Components Thereof*" Doc. No. 434899-583927_47 "*Appendix B3_035 Microsoft File Sharing Protocol 1988*".
ITC Investigation No. 337-744, captioned: "*Certain Mobile Devices, Associated Software, and Components Thereof*" Doc. No. 434902-584030_2 "*Appendix B4_094 Glass Create Own PC Env 1990*".
ITC Investigation No. 337-744, captioned: "*Certain Mobile Devices, Associated Software, and Components Thereof*" Doc. No. 434902-584031_3 "*Appendix B4_095 Goh MS DOS 6.0 1993*".
ITC Investigation No. 337-744, captioned: "*Certain Mobile Devices, Associated Software, and Components Thereof*" Doc. No. 434902-584032_4 "*Appendix B4_096 Gralla Factors Impeding OS2 1989*".
ITC Investigation No. 337-744, captioned: "*Certain Mobile Devices, Associated Software, and Components Thereof*" Doc. No. 434902-584033_5 "*Appendix B4_097 Gralla Shareware 1992*".
ITC Investigation No. 337-744, captioned: "*Certain Mobile Devices, Associated Software, and Components Thereof*" Doc. No. 434902-584034_6 "*Appendix B4_098 Greenberg Compress and Exp 1989*".

(56) References Cited

OTHER PUBLICATIONS

ITC Investigation No. 337-744, captioned: "*Certain Mobile Devices, Associated Software, and Components Thereof*" Doc. No. 434902-584035_7 "*Appendix B4_099 Hall Overview of FreeDOS 2002*".

ITC Investigation No. 337-744, captioned: "*Certain Mobile Devices, Associated Software, and Components Thereof*" Doc. No. 434902-584036_8 "*Appendix B4_100 Hayes Making CD-ROM Usable 1991*".

ITC Investigation No. 337-744, captioned: "*Certain Mobile Devices, Associated Software, and Components Thereof*" Doc. No. 434902-584037_9 "*Appendix B4_101 Hotch Will This Be 1992*".

ITC Investigation No. 337-744, captioned: "*Certain Mobile Devices, Associated Software, and Components Thereof*" Doc. No. 434902-584038_10 "*Appendix B4_102 Hurwicz MS-DOS 3.1 1985*".

ITC Investigation No. 337-744, captioned: "*Certain Mobile Devices, Associated Software, and Components Thereof*" Doc. No. 434902-584040_12 "*Appendix B4_104 Jackson Apple Talk 1990*".

ITC Investigation No. 337-744, captioned: "*Certain Mobile Devices, Associated Software, and Components Thereof*" Doc. No. 434902-584041_13 "*Appendix B4_105 Jeffries What's Ahead 1985*".

ITC Investigation No. 337-744, captioned: "*Certain Mobile Devices, Associated Software, and Components Thereof*" Doc. No. 434902-584042_14 "*Appendix B4_106 JH 20Years of DOS History 2005*".

ITC Investigation No. 337-744, captioned: "*Certain Mobile Devices, Associated Software, and Components Thereof*" Doc. No. 434902-584044_16 "*Appendix B4_108 Leffler 4.3BSD Unix 1989*".

ITC Investigation No. 337-744, captioned: "*Certain Mobile Devices, Associated Software, and Components Thereof*" Doc. No. 434902-584045_17 "*Appendix B4_109 Lent New Improv Wind 1993*".

ITC Investigation No. 337-744, captioned: "*Certain Mobile Devices, Associated Software, and Components Thereof*" Doc. No. 434902-584046_18 "*Appendix B4_110 Lewallen The NT Desktop 1993*".

ITC Investigation No. 337-744, captioned: "*Certain Mobile Devices, Associated Software, and Components Thereof*" Doc. No. 434902-584047_19 "*Appendix B4_111 Lincoln Death to 83 Filenames 1993*".

ITC Investigation No. 337-744, captioned: "*Certain Mobile Devices, Associated Software, and Components Thereof*" Doc. No. 434902-584048_20 "*Appendix B4_112 Mallory DOS filename 1993*".

ITC Investigation No. 337-744, captioned: "*Certain Mobile Devices, Associated Software, and Components Thereof*" Doc. No. 434902-584049_21 "*Appendix B4_113 Manes Taking a Gamble 1984*".

ITC Investigation No. 337-744, captioned: "*Certain Mobile Devices, Associated Software, and Components Thereof*" Doc. No. 434902-584050_22 "*Appendix B4_114 Mathisen Novell's DOS 7 1994*".

ITC Investigation No. 337-744, captioned: "*Certain Mobile Devices, Associated Software, and Components Thereof*" Doc. No. 434902-584051_23 "*Appendix B4_115 Matthias 25 Years of DOS 2000*".

ITC Investigation No. 337-744, captioned: "*Certain Mobile Devices, Associated Software, and Components Thereof*" Doc. No. 434902-584052_24 "*Appendix B4_116 McCormick Present Mgr 1990*".

ITC Investigation No. 337-744, captioned: "*Certain Mobile Devices, Associated Software, and Components Thereof*" Doc. No. 434902-584053_25 "*Appendix B4_117 Mefford Adding Notes 1987*".

ITC Investigation No. 337-744, captioned: "*Certain Mobile Devices, Associated Software, and Components Thereof*" Doc. No. 434902-584056_28 *Appendix B4_120 Microsoft App C—LAN Mgr Macintosh 1991 (Missing p. 122).*

ITC Investigation No. 337-744, captioned: "*Certain Mobile Devices, Associated Software, and Components Thereof*" Doc. No. 434902-584059_31 "*Appendix B4_125 Neuhaus Databases 1990*".

ITC Investigation No. 337-744, captioned: "*Certain Mobile Devices, Associated Software, and Components Thereof*" Doc. No. 434902-584060_32 "*Appendix B4_126 Newsgroups Ex. 7a of Ref 1992*".

ITC Investigation No. 337-744, captioned: "*Certain Mobile Devices, Associated Software, and Components Thereof*" Doc. No. 434902-584061_33 "*Appendix B4_127 Newsgroups Ex. 7b of Ref 1991*".

ITC Investigation No. 337-744, captioned: "*Certain Mobile Devices, Associated Software, and Components Thereof*" Doc. No. 434902-584062_34 "*Appendix B4_128 Newsgroups Ex. 7c of Ref 1991*".

ITC Investigation No. 337-744, captioned: "*Certain Mobile Devices, Associated Software, and Components Thereof*" Doc. No. 434902-584063_35 "*Appendix B4_129 Newsgroups Ex. 7d of Ref 1992*".

ITC Investigation No. 337-744, captioned: "*Certain Mobile Devices, Associated Software, and Components Thereof*" Doc. No. 434902-584064_36 "*Appendix B4_130 Nilsson Sherlock Solves 1993*".

ITC Investigation No. 337-744, captioned: "*Certain Mobile Devices, Associated Software, and Components Thereof*" Doc. No. 434902-584065_37 "*Appendix B4_131 Olson Student Writes Free ODS 1994*".

ITC Investigation No. 337-744, captioned: "*Certain Mobile Devices, Associated Software, and Components Thereof*" Doc. No. 434902-584066_38 "*Appendix B4_132 OMalley Fetch Desk 1993*".

ITC Investigation No. 337-744, captioned: "*Certain Mobile Devices, Associated Software, and Components Thereof*" Doc. No. 434902-584067_39 "*Appendix B4_133 PC Guide File Allocation Tables 2001*".

ITC Investigation No. 337-744, captioned: "*Certain Mobile Devices, Associated Software, and Components Thereof*" Doc. No. 434902-584068_40 "*Appendix B4_134 Petzold 1989 The Year in Oper Sys 1990*".

ITC Investigation No. 337-744, captioned: "*Certain Mobile Devices, Associated Software, and Components Thereof*" Doc. No. 434902-584069_41 "*Appendix B4_135 Petzold OS-2 A New Beg 1988*".

ITC Investigation No. 337-744, captioned: "*Certain Mobile Devices, Associated Software, and Components Thereof*" Doc. No. 434902-584070_42 "*Appendix B4_136 Prosise Retrofitting 1986*".

ITC Investigation No. 337-744, captioned: "*Certain Mobile Devices, Associated Software, and Components Thereof*" Doc. No. 434902-584071_43 "*Appendix B4_137 Prosise Tutor 1992*".

ITC Investigation No. 337-744, captioned: "*Certain Mobile Devices, Associated Software, and Components Thereof*" Doc. No. 434902-584072_44 "*Appendix B4_138 Proteo Master Their PCs 1991*".

ITC Investigation No. 337-744, captioned: "*Certain Mobile Devices, Associated Software, and Components Thereof*" Doc. No. 434902-584073_45 "*Appendix B4_139 Response to Office Comm. 2000*".

ITC Investigation No. 337-744, captioned: "*Certain Mobile Devices, Associated Software, and Components Thereof*" Doc. No. 434902-584074_46 "*Appendix B4_140 Rettig Custom Windows 1993*".

ITC Investigation No. 337-744, captioned: "*Certain Mobile Devices, Associated Software, and Components Thereof*" Doc. No. 434902-584075_47 "*Appendix B4_141 Rizzo Disks of Diff Color 1991*".

ITC Investigation No. 337-744, captioned: "*Certain Mobile Devices, Associated Software, and Components Thereof*" Doc. No. 434902-584078_50 "*Appendix B4_143 Rohan Golden Retriever 1992*".

ITC Investigation No. 337-744, captioned: "*Certain Mobile Devices, Associated Software, and Components Thereof*" Doc. No. 434902-584079_51 "*Appendix B4_144 Ruley Feature-Rich Beta 1992*".

ITC Investigation No. 337-744, captioned: "*Certain Mobile Devices, Associated Software, and Components Thereof*" Doc. No. 434902-584081_53 *Appendix B4_146 Sanders the SRO 1987.*

ITC Investigation No. 337-744, captioned: "*Certain Mobile Devices, Associated Software, and Components Thereof*" Doc. No. 434902-584082_54 "*Appendix B4_147 Simon What You Can Do 1991*".

ITC Investigation No. 337-744, captioned: "*Certain Mobile Devices, Associated Software, and Components Thereof*" Doc. No. 434902-584083_55 "*Appendix B4_148 Smith OS-2 2.0 does the Job 1992*".

ITC Investigation No. 337-744, captioned: "*Certain Mobile Devices, Associated Software, and Components Thereof*" Doc. No. 434902-584084_56 "*Appendix B4_149 Sobell Practice Guide Unix 1989*".

ITC Investigation No. 337-744, captioned: "*Certain Mobile Devices, Associated Software, and Components Thereof*" Doc. No. 434902-584085_57 "*Appendix B4_150 Somerson DOS 5.0 1991*".

ITC Investigation No. 337-744, captioned: "*Certain Mobile Devices, Associated Software, and Components Thereof*" Doc. No. 434902-584086_58 "*Appendix B4_151 Somerson Spy-Proof 1992*".

ITC Investigation No. 337-744, captioned: "*Certain Mobile Devices, Associated Software, and Components Thereof*" Doc. No. 434902-584087_59 "*Appendix B4_152 Styer disks 1997*".

ITC Investigation No. 337-744, captioned: "*Certain Mobile Devices, Associated Software, and Components Thereof*" Doc. No. 434902-584088_60 "*Appendix B4_153 Tanenbaum Modern OS 2001*".

(56) References Cited

OTHER PUBLICATIONS

ITC Investigation No. 337-744, captioned: "*Certain Mobile Devices, Associated Software, and Components Thereof*" Doc. No. 434902-584089_61 "*Appendix B4_154 Trivette Utility 60 Char 1988*".
ITC Investigation No. 337-744, captioned: "*Certain Mobile Devices, Associated Software, and Components Thereof*" Doc. No. 434902-584090_62 "*Appendix B4_155 vinDaci Long Filename Spec 1998*".
ITC Investigation No. 337-744, captioned: "*Certain Mobile Devices, Associated Software, and Components Thereof*" Doc. No. 434902-584091_63 "*Appendix B4_156 Wagner Developers Tour of Chicago 1993*".
ITC Investigation No. 337-744, captioned: "*Certain Mobile Devices, Associated Software, and Components Thereof*" Doc. No. 434902-584092_64 "*Appendix B4_157 Wang Universal File 1990*".
ITC Investigation No. 337-744, captioned: "*Certain Mobile Devices, Associated Software, and Components Thereof*" Doc. No. 434902-584093_65 "*Appendix B4_158 Wendin Wendin DOS 1987*".
ITC Investigation No. 337-744, captioned: "*Certain Mobile Devices, Associated Software, and Components Thereof*" Doc. No. 434902-584094_66 "*Appendix B4_159 wikipedia Comparison of FS 2005*".
ITC Investigation No. 337-744, captioned: "*Certain Mobile Devices, Associated Software, and Components Thereof*" Doc. No. 434902-584095_67 "*Appendix B4_160 Wikipedia DOS 2005*".
ITC Investigation No. 337-744, captioned: "*Certain Mobile Devices, Associated Software, and Components Thereof*" Doc. No. 434902-584096_68 "*Appendix B4_162 Windows Mag Access Review 1993*".
ITC Investigation No. 337-744, captioned: "*Certain Mobile Devices, Associated Software, and Components Thereof*" Doc. No. 434902-584097_69 "*Appendix B4_163 Winship DOS Shells 1990*".
ITC Investigation No. 337-744, captioned: "*Certain Mobile Devices, Associated Software, and Components Thereof*" Doc. No. 434902-584099_71 "*Appendix B4_165 Young CD-ROM Stand 1991*".
ITC Investigation No. 337-744, captioned: "*Certain Mobile Devices, Associated Software, and Components Thereof*" Doc. No. 434902-584100_72 "*Appendix B4_166 Zelnick Way You Work 1991*".
ITC Investigation No. 337-744, captioned: "*Certain Mobile Devices, Associated Software, and Components Thereof*" Doc. No. 585121-434898_2 "*Appendix A4_081 Duncan Comparing ODS 1989*".
ITC Investigation No. 337-744, captioned: "*Certain Mobile Devices, Associated Software, and Components Thereof*" Doc. No. 585122-434898_3 "*Appendix A4_082 Duncan Des goals 1989*".
ITC Investigation No. 337-744, captioned: "*Certain Mobile Devices, Associated Software, and Components Thereof*" Doc. No. 585123-434898_4 "*Appendix A4_083 Duncan Getting Acquainted Prt 1 1990*".
ITC Investigation No. 337-744, captioned: "*Certain Mobile Devices, Associated Software, and Components Thereof*" Doc. No. 585124-434898_5 "*Appendix A4_084 Duncan Getting Acquainted Prt 2 1990*".
ITC Investigation No. 337-744, captioned: "*Certain Mobile Devices, Associated Software, and Components Thereof*" Doc. No. 585125-434898_6 "*Appendix A4_085 Duncan Using Long File Names Prt 1 1990*".
ITC Investigation No. 337-744, captioned: "*Certain Mobile Devices, Associated Software, and Components Thereof*" Doc. No. 585125-434898_7 "*Appendix A4_086 Duncan Using Long File Names Prt 2 1990*".
ITC Investigation No. 337-744, captioned: "*Certain Mobile Devices, Associated Software, and Components Thereof*" Doc. No. 585125-434898_8"*Appendix A4_087 Edge CD-ROM Rock Ridge Group 1991*".
ITC Investigation No. 337-744, captioned: "*Certain Mobile Devices, Associated Software, and Components Thereof*" Doc. No. 585129-434898_10 "*Appendix A4_089 Fowler Cross Talking 1993*".
ITC Investigation No. 337-744, captioned: "*Certain Mobile Devices, Associated Software, and Components Thereof*" Doc. No. 585130-434898_11 "*Appendix A4_090 Freed High End 1992*".
ITC Investigation No. 337-744, captioned: "*Certain Mobile Devices, Associated Software, and Components Thereof*" Doc. No. 585131-434898_12 "*Appendix A4_091 Fuchs DOS FAQ 2004*".
ITC Investigation No. 337-744, captioned: "*Certain Mobile Devices, Associated Software, and Components Thereof*" Doc. No. 585132-434898_13 "*Appendix A4_092 Giovetti Way You Work 1992*".
ITC Investgatlon No. 337-744, captioned: "*Certain Mobile Devices, Associated Software, and Components Thereof*" Doc. No. 585133-434898_14 "*Appendix A4_093 Glass Create Own PC Env 1990*".
ITC Investigation No. 337-744, captioned: "*Certain Mobile Devices, Associated Software, and Components Thereof*" Doc. No. 585134-434898_15 "*Appendix A4_094 Goh MS DOS 6.0 1993*".
ITC Investigation No. 337-744, captioned: "*Certain Mobile Devices, Associated Software, and Components Thereof*" Doc. No. 585135-434898_16 "*Appendix A4_095 Gralla Factors Impeding OS2 1989*".
ITC Investigation No. 337-744, captioned: "*Certain Mobile Devices, Associated Software, and Components Thereof*" Doc. No. 585136-434898_17 "*Appendix A4_096 Gralla Shareware 1992*".
ITC Investigation No. 337-744, captioned: "*Certain Mobile Devices, Associated Software, and Components Thereof*" Doc. No. 585137-434898_18 "*Appendix A4_097 Greenberg Compress and Exp 1989*".
ITC Investigation No. 337-744, captioned: "*Certain Mobile Devices, Associated Software, and Components Thereof*" Doc. No. 585138-434898_19 "*Appendix A4_098 Hall 0verview of FreeDOS 2002*".
ITC Investigation No. 337-744, captioned: "*Certain Mobile Devices, Associated Software, and Components Thereof*" Doc. No. 585139-434898_20 "*Appendix A4_099 Hayes Making CD-ROM Usable 1991*".
ITC Investigation No. 337-744, captioned: "*Certain Mobile Devices, Associated Software, and Components Thereof*" Doc. No. 585140-434898_21 "*Appendix A4_100 Hotch Will This Be 1992*".
ITC Investigation No. 337-744, captioned: "*Certain Mobile Devices, Associated Software, and Components Thereof*" Doc. No. 585141-434898_22 "*Appendix A4_101 Hurwicz MS-DOS 3.1 1985*".
ITC Investigation No. 337-744, captioned: "*Certain Mobile Devices, Associate Software, and Components Thereof*" Doc. No. 585142-434898_23 "*Appendix A4_102 Idol Sherlock 1993*".
ITC Investigation No. 337-744, captioned: "*Certain Mobile Devices, Associated Software, and Components Thereof*" Doc. No. 585143-434898_24 "*Appendix A4_103 Jackson Apple Talk 1990*".
ITC Investigation No. 337-744, captioned: "*Certain Mobile Devices, Associated Software, and Components Thereof*" Doc. No. 585144-434898_25 "*Appendix A4_104 Jeffries What's Ahead 1985*".
ITC Investigation No. 337-744, captioned: "*Certain Mobile Devices, Associated Software, and Components Thereof*" Doc. No. 585145-434898_26 "*Appendix A4_105 JH 20 Years of DOS History 2005*".
ITC Investigation No. 337-744, captioned: "*Certain Mobile Devices, Associated Software, and Components Thereof*" Doc. No. 585146-434898_27 "*Appendix A4_106 Lang Translation of Pits Boese Ltr 2004*".
ITC Investigation No. 337-744, captioned: "*Certain Mobile Devices, Associated Software, and Components Thereof*" Doc. No. 585147-434898_28 "*Appendix A4_107 Leffler 4.3BSD Unix 1989*".
ITC Investigation No. 337-744, captioned: "*Certain Mobile Devices, Associated Software, and Components Thereof*" Doc. No. 585148-434898_29 "*Appendix A4_108 Lent New Improv Wind 1993*".
ITC Investigation No. 337-744, captioned: "*Certain Mobile Devices, Associated Software, and Components Thereof*" Doc. No. 585149-434898_30 "*Appendix A4_109 Lewallen The NT Desktop 1993*".
ITC Investigation No. 337-744, captioned: "*Certain Mobile Devices, Associated Software, and Components Thereof*" Doc. No. 585150-434898_31 "*Appendix A4_110 Lincoln Death to Filenames 1993*".
ITC Investigation No. 337-744, captioned: "*Certain Mobile Devices, Associated Software, and Components Thereof*" Doc. No. 585151-434898_32 "*Appendix A4_111 Mallory DOS Filename 1993*".
ITC Investigation No. 337-744, captioned: "*Certain Mobile Devices, Associated Software, and Components Thereof*" Doc. No. 585152-434898_33 "*Appendix A4_112 Manes Taking a Gamble 1984*".
ITC Investigation No. 337-744, captioned: "*Certain Mobile Devices, Associated Software, and Components Thereof*" Doc. No. 585153-434898_34 "*Appendix A4_113 Mathisen Novelis DOS 7 1994*".

(56) References Cited

OTHER PUBLICATIONS

ITC Investigation No. 337-744, captioned: "*Certain Mobile Devices, Associated Software, and Components Thereof*" Doc. No. 585154-434898_35 "*Appendix A4_114 Matthias 25 Years of DOS 2000*".
ITC Investigation No. 337-744, captioned: "*Certain Mobile Devices, Associated Software, and Components Thereof*" Doc. No. 585155-434898_36 "*Appendix A4_115 McCormick Present Mgr 1990*".
ITC Investigation No. 337-744, captioned: "*Certain Mobile Devices, Associated Software, and Components Thereof*" Doc. No. 585156-434898_37 "*Appendix A4_116 Mefford Adding Notes 1987*".
ITC Investigation No. 337-744, captioned: "*Certain Mobile Devices, Associated Software, and Components Thereof*" Doc. No. 585160-434898_41 "*Appendix A4_121 Microsoft Common Name Ex15 1994*".
ITC Investigation No. 337-744, captioned: "*Certain Mobile Devices, Associated Software, and Components Thereof*" Doc. No. 585161-434898_42 "*Appendix A4_122 Microsoft File sharing Protocol 1988*".
ITC Investigation No. 337-744, captioned: "*Certain Mobile Devices, Associated Software, and Components Thereof*" Doc. No. 585162-434898_43 "*Appendix A4_124 Neuhaus Databases 1990*".
ITC Investigation No. 337-744, captioned: "*Certain Mobile Devices, Associated Software, and Components Thereof*" Doc. No. 585163-434898_44 "*Appendix A4_125 Newsgroups Ex. 7a of Ref 1992*".
ITC Investigation No. 337-744, captioned: "*Certain Mobile Devices, Associated Software, and Components Thereof*" Doc. No. 585164-434898_45 "*Appendix A4_126 Newsgroups Ex. 7b of Ref 1991*".
ITC Investigation No. 337-744, captioned: "*Certain Mobile Devices, Associated Software, and Components Thereof*" Doc. No. 585165-434898_46 "*Appendix A4_127 Newsgroups Ex. 7c of Ref 1991*".
ITC Investigation No. 337-744, captioned: "*Certain Mobile Devices, Associated Software, and Components Thereof*" Doc. No. 585166-434898_47 "*Appendix A4_128 Newsgroups Ex. 7d of Ref 1992*".
ITC Investigation No. 337-744, captioned: "*Certain Mobile Devices, Associated Software, and Components Thereof*" Doc. No. 585167-434898_48 "*Appendix A4_129 Nilsson Sherlock Solves 1993*".
ITC Investigation No. 337-744, captioned: "*Certain Mobile Devices, Associated Software, and Components Thereof*" Doc. No. 585169-434898_50 "*Appendix A5_130 Olson Student Writes Free DOS 1994*".
ITC Investigation No. 337-744, captioned: "*Certain Mobile Devices, Associated Software, and Components Thereof*" Doc. No. 585170-434898_51 "*Appendix A5_131 OMalley Fetch Desk 1993*".
ITC Investigation No. 337-744, captioned: "*Certain Mobile Devices, Associated Software, and Components Thereof*" Doc. No. 585171-434898_52 "*Appendix A5_132 PC Guide File Allocation Tables 2001*".
ITC Investigation No. 337-744, captioned: "*Certain Mobile Devices, Associated Software, and Components Thereof*" Doc. No. 585172-434898_53 "*Appendix A5_133 Petzold 1989 The Year in Oper Sys 1990*".
ITC Investigation No. 337-744, captioned: "*Certain Mobile Devices, Associated Software, and Components Thereof*" Doc. No. 585173-434898_54 "*Appendix A5_134 Petzold OS-2 A New Beg 1988*".
ITC Investigation No. 337-744, captioned: "*Certain Mobile Devices, Associated Software, and Components Thereof*" Doc. No. 585174-434898_55 "*Appendix A5_135 Prosise Retrofitting 1986*".
ITC Investigation No. 337-744, captioned: "*Certain Mobile Devices, Associated Software, and Components Thereof*" Doc. No. 585175-434898_56 "*Appendix A5_136 Prosise Tutor 1992*".
ITC Investigation No. 337-744, captioned: "*Certain Mobile Devices, Associated Software, and Components Thereof*" Doc. No. 585176-434898_57 "*Appendix A5_137 Proteo Master Their PCs 1991*".
ITC Investigation No. 337-744, captioned: "*Certain Mobile Devices, Associated Software, and Components Thereof*" Doc. No. 585177-434898_58 "*Appendix A5_138 Response to Office Comm 2000*".
ITC Investigation No. 337-744, captioned: "*Certain Mobile Devices, Associated Software, and Components Thereof*" Doc. No. 585178-434898_59 "*Appendix Ahd —139 Rettig Custom Windosw 1993*".
ITC Investigation No. 337-744, captioned: "*Certain Mobile Devices, Associated Software, and Components Thereof*" Doc. No. 585179-434898_60 "*Appendix A5_140 Rizzo Disks of Diff Color 1991*".
ITC Investigation No. 337-744, captioned: "*Certain Mobile Devices, Associated Software, and Components Thereof*" Doc. No. 585180-434898_61 "*Appendix A5_141 Rock Ridge Prot Vers 1.09 1991*".
ITC Investigation No. 337-744, captioned: "*Certain Mobile Devices, Associated Software, and Components Thereof*" Doc. No. 585181-434898_62 "*Appendix A5_142 Rohan Golden Retriever 1992*".
ITC Investigation No. 337-744, captioned: "*Certain Mobile Devices, Associated Software, and Components Thereof*" Doc. No. 585182-434898_63 "*Appendix A5_143 Ruley Feature-Rich Beta 1992*".
ITC Investigation No. 337-744, captioned: "*Certain Mobile Devices, Associated Software, and Components Thereof*" Doc. No. 585183-434898_64 "*Appendix A5_144 Saiedian Frame for Assessment 1996*".
ITC Investigation No. 337-744, captioned: "*Certain Mobile Devices, Associated Software, and Components Thereof*" Doc. No. 585184-434898_65 "*Appendix A5_145 Sanders The RO 1987*".
ITC Investigation No. 337-744, captioned: "*Certain Mobile Devices, Associated Software, and Components Thereof*" Doc. No. 585185-434898_66 "*Appendix A5_146 Simon What You Can Do 1991*".
ITC Investigation No. 337-744, captioned: "*Certain Mobile Devices, Associated Software, and Components Thereof*" Doc. No. 585186-434898_67 "*Appendix A5_147 Smith OS-2.2.0 Does the Job 1992*".
ITC Investigation No. 337-744, captioned: "*Certain Mobile Devices, Associated Software, and Components Thereof*" Doc. No. 585187-434898_68 "*Appendix A5_148 Sobell Practice Guide Unix 1989*".
ITC Investigation No. 337-744, captioned: "*Certain Mobile Devices, Associated Software, and Components Thereof*" Doc. No. 585188-434898_69 "*Appendix A5_149 Somerson DOS 5.0 1991*".
ITC Investigation No. 337-744, captioned: "*Certain Mobile Devices, Associated Software, and Components Thereof*" Doc. No. 585189-434898_70 "*Appendix A5_150 Somerson Spy-Proof 1992*".
ITC Investigation No. 337-744, captioned: "*Certain Mobile Devices, Associated Software, and Components Thereof*" Doc. No. 585190-434898_71 "*Appendix A5_151 Styer Disks 1997*".
ITC Investigation No. 337-744, captioned: "*Certain Mobile Devices, Associated Software, and Components Thereof*" Doc. No. 585191-434898_72 "*Appendix A5_152 Tanenbaum Modern OS 2001*".
ITC Investigation No. 337-744, captioned: "*Certain Mobile Devices, Associated Software, and Components Thereof*" Doc. No. 585192-434898_73 "*Appendix A5_153 Trivette Utility 60 Char 1988*".
ITC Investigation No. 337-744, captioned: "*Certain Mobile Devices, Associated Software, and Components Thereof*" Doc. No. 585193-434898_74 "*Appendix A5_154 vinDaci Long Filename Spec 1998*".
ITC Investigation No. 337-744, captioned: "*Certain Mobile Devices, Associated Software, and Components Thereof*" Doc. No. 585194-434898_75 "*Appendix A5_155 Wagner Developers Tour of Chicago 1993*".
ITC Investigation No. 337-744, captioned: "*Certain Mobile Devices, Associated Software, and Components Thereof*" Doc. No. 585195-434898_76 "*Appendix A5_156 Wang Universal File 1990*".
ITC Investigation No. 337-744, captioned: "*Certain Mobile Devices, Associated Software, and Components Thereof*" Doc. No. 585196-434898_77 "*Appendix A5_157 Wendin Wendin DOS 1987*".
ITC Investigation No. 337-744, captioned: "*Certain Mobile Devices, Associated Software, and Components Thereof*" Doc. No. 585197-434898_78 "*Appendix A5_158 Wikipedia Comparison of FS 2005*".
ITC Investigation No. 337-744, captioned: "*Certain Mobile Devices, Associated Software, and Components Thereof*" Doc. No. 585198-434898_79 "*Appendix A5_159 Wikipedia DOS 2005*".
ITC Investigation No. 337-744, captioned: "*Certain Mobile Devices, Associated Software, and Components Thereof*" Doc. No. 585199-434898_80 "*Appendix A5_161 Winship Mag Access Review 1993*".
ITC Investigation No. 337-744, captioned: "*Certain Mobile Devices, Associated Software, and Components Thereof*" Doc. No. 585200-434898_81 "*Appendix A5_162 Winship DOS Shells 1990*".
ITC Investigation No. 337-744, captioned: "*Certain Mobile Devices, Associated Software, and Components Thereof*" Doc. No. 585201-434898_82 "*Appendix A5_163 WSC Extend-A-Name 1988*".

(56) References Cited

OTHER PUBLICATIONS

ITC Investigation No. 337-744, captioned: "*Certain Mobile Devices, Associated Software, and Components Thereof*" Doc. No. 585202-434898_83 "*Appendix A5_164 Young CD-ROM Stand 1991*".
ITC Investigation No. 337-744, captioned: "*Certain Mobile Devices, Associated Software, and Components Thereof*" Doc. No. 585203-434898_84 "*Appendix A5_165 Zelnick Way You Work 1991*".
ITC Investigation No. 337-744, captioned: "*Certain Mobile Devices, Associated Software, and Components Thereof*" Doc. No. 583929-434900_2 "*O'Malley Fetch Desk 1993*".
ITC Investigation No. 337-744, captioned: "*Certain Mobile Devices, Associated Software, and Components Thereof*" Doc. No. 583930-434900_3 "*Rohan Golden Retriever 1992*".
ITC Investigation No. 337-744, captioned: "*Certain Mobile Devices, Associated Software, and Components Thereof*" Doc. No. 583931-434900_4 "*Trivette Utility 60 Char 1988*".
ITC Investigation No. 337-744, captioned: "*Certain Mobile Devices, Associated Software, and Components Thereof*" Doc. No. 583932-434900_5 "*Wang Universal File 1990*".
ITC Investigation No. 337-744, captioned: "*Certain Mobile Devices, Associated Software, and Components Thereof*" Doc. No. 583990-434901_13 "*Software Sherlock 2.0, 1998*".
ITC Investigation No. 337-744, captioned: "*Certain Mobile Devices, Associated Software, and Components Thereof*" Doc. No. 583991-434901_14 "*Acerson WordPerfect 5.1 1990*".
ITC Investigation No. 337-744, captioned: "*Certain Mobile Devices, Associated Software, and Components Thereof*" Doc. No. 538992-434901_15 "*Allen Vices and Virtues 1993*".
ITC Investigation No. 337-744, captioned: "*Certain Mobile Devices, Associated Software, and Components Thereof*" Doc. No. 538993-434901_16 "*Almax Software Longer Filenames for DOS 1993*".
ITC Investigation No. 337-744, captioned: "*Certain Mobile Devices, Associated Software, and Components Thereof*" Doc. No. 538994-434901_17 "*Baird Benefits 4DOS 1993*".
ITC Investigation No. 337-744, captioned: "*Certain Mobile Devices, Associated Software, and Components Thereof*" Doc. No. 538995-434901_18 "*Berst Come Closer 1993*".
ITC Investigation No. 337-744, captioned: "*Certain Mobile Devices, Associated Software, and Components Thereof*" Doc. No. 538996-434901_19 "*Beta Systems DOS History 2003*".
ITC Investigation No. 337-744, captioned: "*Certain Mobile Devices, Associated Software, and Components Thereof*" Doc. No. 538998-434901_21 "*Bonner Build a Doc 1992*".
ITC Investigation No. 337-744, captioned: "*Certain Mobile Devices, Associated Software, and Components Thereof*" Doc. No. 538999-434901_22 "*Bonner GeoWorks 1990*".
ITC Investigation No. 337-744, captioned: "*Certain Mobile Devices, Associated Software, and Components Thereof*" Doc. No. 584000-434901_23 "*Bonner Whats in 1988*".
ITC Investigation No. 337-744, captioned: "*Certain Mobile Devices, Associated Software, and Components Thereof*" Doc. No. 584001-434901_24 "*Bonner Windows 3.1 1992*".
ITC Investigation No. 337-744, captioned: "*Certain Mobile Devices, Associated Software, and Components Thereof*" Doc. No. 584002-434901_25 "*Busch 4DOS 1992*".
ITC Investigation No. 337-744, captioned: "*Certain Mobile Devices, Associated Software, and Components Thereof*" Doc. No. 584003-434901_26 "*Capen Ultimate File Manager 1993*".
ITC Investigation No. 337-744, captioned: "*Certain Mobile Devices, Associated Software, and Components Thereof*" Doc. No. 584004-434901_27 "*Chin Using Unused Bytes 1991*".
ITC Investigation No. 337-744, captioned: "*Certain Mobile Devices, Associated Software, and Components Thereof*" Doc. No. 584005-434901_28 "*Clark Proposed DOS 1993*".
ITC Investigation No. 337-744, captioned: "*Certain Mobile Devices, Associated Software, and Components Thereof*" Doc. No. 584006-434901_29 "*Cluts Making Room 1996*".
ITC Investigation No. 337-744, captioned: "*Certain Mobile Devices, Associated Software, and Components Thereof*" Doc. No. 584007-434901_30 "*Comer The Tilde 1986*".
ITC Investigation No. 337-744, captioned: "*Certain Mobile Devices, Associated Software, and Components Thereof*" Doc. No. 584008-434901_31 "*Comm Rule 51(4)EPC 2000*".
ITC Investigation No. 337-744, captioned: "*Certain Mobile Devices, Associated Software, and Components Thereof*" Doc. No. 584009-434901_32 "*Crow Encapsulation of Applications 1989*".
ITC Investigation No. 337-744, captioned: "*Certain Mobile Devices, Associated Software, and Components Thereof*" Doc. No. 584010-434901_33 "*Dateline Gold Retr 2.0b 1993*".
ITC Investigation No. 337-744, captioned: "*Certain Mobile Devices, Associated Software, and Components Thereof*" Doc. No. 584011-434901_34 "*Dateline The Intell Way 1987*".
ITC Investigation No. 337-744, captioned: "*Certain Mobile Devices, Associated Software, and Components Thereof*" Doc. No. 584012-434901_35 "*Davis NT No Thanks 1993*".
ITC Investigation No. 337-744, captioned: "*Certain Mobile Devices, Associated Software, and Components Thereof*" Doc. No. 584013-434901_36 "*Derfler Build Workgroup Sol 1988*".
ITC Investigation No. 337-744, captioned: "*Certain Mobile Devices, Associated Software, and Components Thereof*" Doc. No. 584014-434901_37 "*DeVoney NT Has Arrived 1993*".
ITC Investigation No. 337-744, captioned: "*Certain Mobile Devices, Associated Software, and Components Thereof*" Doc. No. 584015-434902_38 "*Dig Res Intr ROM 1998*".
ITC Investigation No. 337-744, captioned: "*Certain Mobile Devices, Associated Software, and Components Thereof*" Doc. No. 584016-434902_39 "*Duncan Comparing DOS 1989*".
ITC Investigation No. 337-744, captioned: "*Certain Mobile Devices, Associated Software, and Components Thereof*" Doc. No. 584017-434901_40 "*Duncan Des Goals 1989*".
ITC Investigation No. 337-744, captioned: "*Certain Mobile Devices, Associated Software, and Components Thereof*" Doc. No. 584018-434901_41 "*Duncan Getting Acquainted Prt 1 1990*".
ITC Investigation No. 337-744, captioned: "*Certain Mobile Devices, Associated Software, and Components Thereof*" Doc. No. 584019-434901_42 "*Duncan Getting Acquainted Prt 2 1990*".
ITC Investigation No. 337-744, captioned: "*Certain Mobile Devices, Associated Software, and Components Thereof*" Doc. No. 584020-434901_43 "*Duncan Using Long File Names Prt 1 1990*".
ITC Investigation No. 337-744, captioned: "*Certain Mobile Devices, Associated Software, and Components Thereof*" Doc. No. 584021-434901_44 "*Duncan Using Long File Names Prt 2 1990*".
ITC Investigation No. 337-744, captioned: "*Certain Mobile Devices, Associated Software, and Components Thereof*" Doc. No. 584022-434901_45 "*CD-ROM Rock Ridge Group 1991*".
ITC Investigation No. 337-744, captioned: "*Certain Mobile Devices, Associated Software, and Components Thereof*" Doc. No. 584023-434901_46 "*Florida Sun Flash Rock Ridge Prel CD-ROM Specs 1991*".
ITC Investigation No. 337-744, captioned: "*Certain Mobile Devices, Associated Software, and Components Thereof*" Doc. No. 584024-434901_47 "*Fowler Cross Talking 1993*".
ITC Investigation No. 337-744, captioned: "*Certain Mobile Devices, Associated Software, and Components Thereof*" Doc. No. 584025-434901_48 "*Freed High End 1992*".
ITC Investigation No. 337-744, captioned: "*Certain Mobile Devices, Associated Software, and Components Thereof*" Doc. No. 584026-434901_49 "*Fuchs DOS FAQ 2004*".
ITC Investigation No. 337-744, captioned: "*Certain Mobile Devices, Associated Software, and Components Thereof*" Doc. No. 584027-434901_50 "*Giovetti Way You Work 1992*".
ITC Investigation No. 337-744, captioned: "*Certain Mobile Devices, Associated Software, and Components Thereof*" Doc. No. 583928-434900_1 "*Appendix B Index*" Oct. 4, 2010.
ITC Investigation No. 337-744, captioned: "*Certain Mobile Devices, Associated Software, and Components Thereof*" Doc. No. 583933-434900_6 "*Tech Refs Cited*" Oct. 4, 2010.
ITC Investigation No. 337-744, captioned: "*Certain Mobile Devices, Associated Software, and Components Thereof*" Doc. No. 583978-434901_1 "*Appendix B Index*" Oct. 4, 2010.
ITC Investigation No. 337-744, captioned: "*Certain Mobile Devices, Associated Software, and Components Thereof*" Doc. No. 583997-434901_20 "*Blackwell WSC Launches Extend*" Jul. 27, 1990.

(56) References Cited

OTHER PUBLICATIONS

ITC Investigation No. 337-744, captioned: "*Certain Mobile Devices, Associated Software, and Components Thereof*" Doc. No. 434896-583831_1 "*Appendix A Index—CD 2 of 5*" Oct. 4, 2010.
ITC Investigation No. 337-744, captioned: "*Certain Mobile Devices, Associated Software, and Components Thereof*" Doc. No. 434896-583849_19 "*Appendix A5 Tech Refs Cover*" Oct. 4, 2010.
ITC Investigation No. 337-744, captioned: "*Certain Mobile Devices, Associated Software, and Components Thereof*" Doc. No. 434897-585094_27 "*Appendix A5_058 Almax Sftwr Longer Filenames for DOS*" May 1993.
ITC Investigation No. 337-744, captioned: "*Certain Mobile Devices, Associated Software, and Components Thereof*" Doc. No. 434897-585095_28 "*Appendix A5_059 Baird Benefits 4DOS*" May 7, 1993.
ITC Investigation No. 337-744, captioned: "*Certain Mobile Devices, Associated Software, and Components Thereof*" Doc. No. 434897-585096_29 "*Appendix A5_060 Berst Come Closer*" Apr. 1, 1993.
ITC Investigation No. 337-744, captioned: "*Certain Mobile Devices, Associated Software, and Components Thereof*" Doc. No. 434897-585097_30 "*Appendix A5_061 Beta Systems DOS History*" Apr. 30, 2003.
ITC Investigation No. 337-744, captioned: "*Certain Mobile Devices, Associated Software, and Components Thereof*" Doc. No. 434897-585099_32 "*Appendix A5_063 Bonner Build a Doc*" Dec. 1991.
ITC Investigation No. 337-744, captioned: "*Certain Mobile Devices, Associated Software, and Components Thereof*" Doc. No. 434897-585100_33 "*Appendix A5_064 Bonner GeoWorks*" Dec. 1990.
ITC Investigation No. 337-744, captioned: "*Certain Mobile Devices, Associated Software, and Components Thereof*" Doc. No. 434897-585102_35 "*Appendix A5_066 Bonner Windows 3.1*" May 1992.
ITC Investigation No. 337-744, captioned: "*Certain Mobile Devices, Associated Software, and Components Thereof*" Doc. No. 434897-585103_36 "*Appendix A5_067 Busch 4DOS*" Jul. 1992.
ITC Investigation No. 337-744, captioned: "*Certain Mobile Devices, Associated Software, and Components Thereof*" Doc. No. 434897-585104_37 "*Appendix A5_068 Capen Ultimate File Manager*" Jun. 1993.
ITC Investigation No. 337-744, captioned: "*Certain Mobile Devices, Associated Software, and Components Thereof*" Doc. No. 434897-585105_38 "*Appendix A5_069 Chin Using Unused Bytes*" Oct. 14, 1991.
ITC Investigation No. 337-744, captioned: "*Certain Mobile Devices, Associated Software, and Components Thereof*" Doc. No. 434897-585106_39 "*Appendix A5_070 Clark Proposed DOS*" Aug. 11, 1993.
ITC Investigation No. 337-744, captioned: "*Certain Mobile Devices, Associated Software, and Components Thereof*" Doc. No. 434897-585107_40 "*Appendix A5_071 Cluts Making Room*" Aug. 1996.
ITC Investigation No. 337-744, captioned: "*Certain Mobile Devices, Associated Software, and Components Thereof*" Doc. No. 434897-585108_41 "*Appendix A5_072 Comer The Tilde*" May 19, 1996.
ITC Investigation No. 337-744, captioned: "*Certain Mobile Devices, Associated Software, and Components Thereof*" Doc. No. 434897-585109_42 "*Appendix A5_073 Comm Rule 51_4 EPC*" (EP Appl. No. 94105169.0) Dec. 19, 2000.
ITC Investigation No. 337-744, captioned: "*Certain Mobile Devices, Associated Software, and Components Thereof*" Doc. No. 434897-585110_43 "*Appendix A5_074 Crow Encapsulation of Applications*" Aug. 1989.
ITC Investigation No. 337-744, captioned: "*Certain Mobile Devices, Associated Software, and Components Thereof*" Doc. No. 434899-583881_1 "*Appendix B Index-CD 1 of 5*" Oct. 4, 2010.
ITC Investigation No. 337-744, captioned: "*Certain Mobile Devices, Associated Software, and Components Thereof*" Doc. No. 434899-583882_2 "*Appendix B1*" Feb. 17, 2010.
ITC Investigation No. 337-744, captioned: "*Certain Mobile Devices, Associated Software, and Components Thereof*" Doc. No. 434899-583887_7 "*Appendix B2*" Feb. 17, 2010.
ITC Investigation No. 337-744, captioned: "*Certain Mobile Devices, Associated Software, and Components Thereof*" Doc. No. 434899-583892_12 "*Appendix B3_000.Tech Refs Cited in 5758352*" Jan. 8, 2005.
ITC Investigation No. 337-744, captioned: "*Certain Mobile Devices, Associated Software, and Components Thereof*" Doc. No. 434899-583915_35 "*Appendix B3-023 Bonner Whats in a Name*" Sep. 1989.
ITC Investigation No. 337-744, captioned: "*Certain Mobile Devices, Associated Software, and Components Thereof*" Doc. No. 434902-584029_1 "*Appendix B Index-CD 4 of 5*" Oct. 4, 2010.
ITC Investigation No. 337-744, captioned: "*Certain Mobile Devices, Associated Software, and Components Thereof*" Doc. No. 434902-584039_11 "*Appendix B4_103 Idol Sherlock*" Nov. 1993.
ITC Investigation No. 337-744, captioned: "*Certain Mobile Devices, Associated Software, and Components Thereof*" Doc. No. 434902-584054_26 "*Appendix B4_118 Merkmal Ansp 1 Ex. 5 of Ref*" 2003 (cited within ITC Investigation No. 337-744 on Oct. 4, 2010).
ITC Investigation No. 337-744, captioned: "*Certain Mobile Devices, Associated Software, and Components Thereof*" Doc. No. 434902-584055_27 "*Appendix B4_119 Merkmal Ansp 12 Ex. 6 of Ref*" 2003 (cited within ITC Investigation No. 337-744 on Oct. 4, 2010).
ITC Investigation No. 337-744, captioned: "*Certain Mobile Devices, Associated Software, and Components Thereof*" Doc. No. 434902-584077_49 "*Appendix B Index-CD 5 of 5*" Oct. 21, 1991.
ITC Investigation No. 337-744, captioned: "*Certain Mobile Devices, Associated Software, and Components Thereof*" Doc. No. 434902-584483_73 "*434902 Appendix B4-124*" Dec. 4, 1992.
ITC Investigation No. 337-744, captioned: "*Certain Mobile Devices, Associated Software, and Components Thereof*" Doc. No. 434902-58448474 "*434902 Appendix B4-161*" 1998 (cited within ITC Investigation No. 337-744 on Oct. 4, 2010).
ITC Investigation No. 337-744, captioned: "*Certain Mobile Devices, Associated Software, and Components Thereof*" Doc. No. 585120-434898_1 "*Appendix A Index—CD 4 of 5*" Oct. 4, 2010.
ITC Investigation No. 337-744, captioned: "*Certain Mobile Devices, Associated Software, and Components Thereof*" Doc. No. 585128-434898_9 "*Appendix A4_088 Florida Sun Flash Rock Ridge Prel CD-ROM Specs*" Mar. 1991.
ITC Investigation No. 337-744, captioned: "*Certain Mobile Devices, Associated Software, and Components Thereof*" Doc. No. 585157-434898_38 "*Appendix A4_117 Merkmal Ansp 1 Ex 5 of Ref*" 2004 (cited within ITC Investigation No. 337-744 on Oct. 8, 2010).
ITC Investigation No. 337-744, captioned: "*Certain Mobile Devices, Associated Software, and Components Thereof*" Doc. No. 585158-434898_39 "*Appendix A4_118 Merkmal Ansp 12 Ex 6 of Ref*" 2004 (cited within ITC Investigation No. 337-744 on Oct. 8, 2010).
ITC Investigation No. 337-744, captioned: "*Certain Mobile Devices, Associated Software, and Components Thereof*" Doc. No. 585159-434898_40 "*Appendix A4_119 Microsoft App C—LAN Mgr Macintosh*" 1991 (cited within ITC Investigation No. 337-744 on Oct. 8, 2010).
ITC Investigation No. 337-744, captioned: "*Certain Mobile Devices, Associated Software, and Components Thereof*" Doc. No. 585168-434898_49 "*Appendix A Index—CD 5 of 5*" Oct. 2010.
ITC Investigation No. 337-744, captioned: "Certain Mobile Devices, Associated Software, and Components Thereof" Doc. No. 583883-434899_3 "Appendix B1_part 1" May 26, 1998.
ITC Investigation No. 337-744, captioned: "Certain Mobile Devices, Associated Software, and Components Thereof" Doc. No. 583884-434899_4 "Appendix B1_part 2" May 26, 1998.
ITC Investigation No. 337-744, captioned: "Certain Mobile Devices, Associated Software, and Components Thereof" Doc. No. 583885-434899_5 "Appendix B1_part 3" Apr. 11, 1997.
ITC Investigation No. 337-744, captioned: "Certain Mobile Devices, Associated Software, and Components Thereof" Doc. No. 583886-434899_6 "Appendix B1_part 4" Nov. 30, 1990.
ITC Investigation No. 337-744, captioned: "Certain Mobile Devices, Associated Software, and Components Thereof" Doc. No. 583888-434899_8 "Appendix B2_Part 1" Jan. 8, 2005.
ITC Investigation No. 337-744, captioned: "Certain Mobile Devices, Associated Software, and Components Thereof" Doc. No. 583889-434899_9 "Appendix B2_part 2" Sep. 16, 2004.

(56) References Cited

OTHER PUBLICATIONS

ITC Investigation No. 337-744, captioned: "Certain Mobile Devices, Associated Software, and Components Thereof" Doc. No. 583890-434899_10 "Appendix B2_Part 3" Jan. 8, 2005.
ITC Investigation No. 337-744, captioned: "Certain Mobile Devices, Associated Software, and Components Thereof" Doc. No. 583891-434899_11 "Appendix B2_Part 4" Jan. 8, 2005.
ITC Investigation No. 337-744, captioned: "Certain Mobile Devices, Associated Software, and Components Thereof" Doc. No. 583650-434802_1 "Complaint" Oct. 1, 2010.
ITC Investigation No. 337-744, captioned: "Certain Mobile Devices, Associated Software, and Components Thereof" Doc. No. 587482-434802_2 "434802 Publ Version of Conf Exhibits (9 thru 48)" Oct. 1, 2010.
ITC Investigation No. 337-744, captioned: "Certain Mobile Devices, Associated Software, and Components Thereof" Doc. No. 583603-434802_3 "Exhibit 1" Jun. 30, 2010.
ITC Investigation No. 337-744, captioned: "Certain Mobile Devices, Associated Software, and Components Thereof" Doc. No. 583611-434802_4 "Exhibit 2" Mar. 2010.
ITC Investigation No. 337-744, captioned: "Certain Mobile Devices, Associated Software, and Components Thereof" Doc. No. 583632-434802_7 "Exhibit 5" Feb. 23, 2010.
ITC Investigation No. 337-744, captioned: "Certain Mobile Devices, Associated Software, and Components Thereof" Doc. No. 583643-434802_8 "Exhibit 6" Feb. 23, 2010.
ITC Investigation No. 337-744, captioned: "Certain Mobile Devices, Associated Software, and Components Thereof" Doc. No. 583644-434802_9 "Exhibit 7" Oct. 1, 2010.
ITC Investigation No. 337-744, captioned: "Certain Mobile Devices, Associated Software, and Components Thereof" Doc. No. 583645-434802_10 "Exhibit 8" Oct. 1, 2010.
ITC Investigation No. 337-744, captioned: "Certain Mobile Devices, Associated Software, and Components Thereof" Doc. No. 583605-434802_12 "Exhibit 12" Dec. 16, 2003.
ITC Investigation No. 337-744, captioned: "Certain Mobile Devices, Associated Software, and Components Thereof" Doc. No. 583606-434802_13 "Exhibit 13" Oct. 1, 2010.
ITC Investigation No. 337-744, captioned: "Certain Mobile Devices, Associated Software, and Components Thereof" Doc. No. 583608-434802_15 "Exhibit 16" Nov. 30, 2004.
ITC Investigation No. 337-744, captioned: "Certain Mobile Devices, Associated Software, and Components Thereof" Doc. No. 583609-434802_16 "Exhibit 17" Oct. 1, 2010.
ITC Investigation No. 337-744, captioned: "Certain Mobile Devices, Associated Software, and Components Thereof" Doc. No. 583612-434802_18 "Exhibit 20" Jun. 21, 2005.
ITC Investigation No. 337-744, captioned: "Certain Mobile Devices, Associated Software, and Components Thereof" Doc. No. 583613-434802_19 "Exhibit 21" Jan. 5, 2010.
ITC Investigation No. 337-744, captioned: "Certain Mobile Devices, Associated Software, and Components Thereof" Doc. No. 583615-434802_21 "Exhibit 24" Jan. 5, 2010.
ITC Investigation No. 337-744, captioned: "Certain Mobile Devices, Associated Software, and Components Thereof" Doc. No. 583616-434802_22 "Exhibit 25" Oct. 1, 2010.
ITC Investigation No. 337-744, captioned: "Certain Mobile Devices, Associated Software, and Components Thereof" Doc. No. 583618-434802_24 "Exhibit 28" Jun. 2, 1994.
ITC Investigation No. 337-744, captioned: "Certain Mobile Devices, Associated Software, and Components Thereof" Doc. No. 583619-434802_25 "Exhibit 29" Oct. 1, 2010.
ITC Investigation No. 337-744, captioned: "Certain Mobile Devices, Associated Software, and Components Thereof" Doc. No. 583622-434802_27 "Exhibit 32" Jun. 10, 2003.
ITC Investigation No. 337-744, captioned: "Certain Mobile Devices, Associated Software, and Components Thereof" Doc. No. 583623-434802_28 "Exhibit 33" Oct. 1, 2010.
ITC Investigation No. 337-744, captioned: "Certain Mobile Devices, Associated Software, and Components Thereof" Doc. No. 583625-434802_30 "Exhibit 36" Apr. 9, 2002.
ITC Investigation No. 337-744, captioned: "Certain Mobile Devices, Associated Software, and Components Thereof" Doc. No. 583626-434802_31 "Exhibit 37" Oct. 1, 2010.
ITC Investigation No. 337-744, captioned: "Certain Mobile Devices, Associated Software, and Components Thereof" Doc. No. 583648-434802_32 "434802 Exhibit 39" Oct. 1, 2010.
ITC Investigation No. 337-744, captioned: "Certain Mobile Devices, Associated Software, and Components Thereof" Doc. No. 583651-434802_33 "434802 Exhibit 40" Oct. 1, 2010.
ITC Investigation No. 337-744, captioned: "Certain Mobile Devices, Associated Software, and Components Thereof" Doc. No. 583652-434802_34 "434802 Exhibit 41" Oct. 1, 2010.
ITC Investigation No. 337-744, captioned: "Certain Mobile Devices, Associated Software, and Components Thereof" Doc. No. 583628-434802_35 "Exhibit 42" Oct. 1, 2010.
ITC Investigation No. 337-744, captioned: "Certain Mobile Devices, Associated Software, and Components Thereof" Doc. No. 583629-434802_36 "Exhibit 43" Oct. 1, 2010.
ITC Investigation No. 337-744, captioned: "Certain Mobile Devices, Associated Software, and Components Thereof" Doc. No. 583653-434802_37 "434802 Exhibit 44" Oct. 1, 2010.
ITC Investigation No. 337-744, captioned: "Certain Mobile Devices, Associated Software, and Components Thereof" Doc. No. 583630-434802_38 "Exhibit 45" Oct. 1, 2010.
ITC Investigation No. 337-744, captioned: "Certain Mobile Devices, Associated Software, and Components Thereof" Doc. No. 583654-434802_39 "434802 Exhibit 46 pt 1" Oct. 1, 2010.
ITC Investigation No. 337-744, captioned: "Certain Mobile Devices, Associated Software, and Components Thereof" Doc. No. 583649-434802_40 "434802 Exhibit 46 pt 2" Jul. 29, 2010.
ITC Investigation No. 337-744, captioned: "Certain Mobile Devices, Associated Software, and Components Thereof" Doc. No. 583655-434802_41 "434802 Exhibit 47" Oct. 1, 2010.
ITC Investigation No. 337-744, captioned: "Certain Mobile Devices, Associated Software, and Components Thereof" Doc. No. 583631-434802_42 "Exhibit 49" Sep. 9, 2010.
ITC Investigation No. 337-744, captioned: "Certain Mobile Devices, Associated Software, and Components Thereof" Doc. No. 583633-434802_43 "Exhibit 50" Sep. 22, 2010.
ITC Investigation No. 337-744, captioned: "Certain Mobile Devices, Associated Software, and Components Thereof" Doc. No. 583634-434802_44 "Exhibit 51" Oct. 1, 2010.
ITC Investigation No. 337-744, captioned: "Certain Mobile Devices, Associated Software, and Components Thereof" Doc. No. 583635-434802_45 "Exhibit 52" Oct. 1, 2010.
ITC Investigation No. 337-744, captioned: "Certain Mobile Devices, Associated Software, and Components Thereof" Doc. No. 583636-434802_46 "Exhibit 53" Oct. 1, 2010.
ITC Investigation No. 337-744, captioned: "Certain Mobile Devices, Associated Software, and Components Thereof" Doc. No. 583637-434802_47 "Exhibit 54" Oct. 1, 2010.
ITC Investigation No. 337-744, captioned: "Certain Mobile Devices, Associated Software, and Components Thereof" Doc. No. 583638-434802_48 "Exhibit 55" Oct. 1, 2010.
ITC Investigation No. 337-744, captioned: "Certain Mobile Devices, Associated Software, and Components Thereof" Doc. No. 583639-434802_49 "Exhibit 56" Oct. 1, 2010.
ITC Investigation No. 337-744, captioned: "Certain Mobile Devices, Associated Software, and Components Thereof" Doc. No. 583640-434802_50 "Exhibit 57" Oct. 1, 2010.
ITC Investigation No. 337-744, captioned: "Certain Mobile Devices, Associated Software, and Components Thereof" Doc. No. 583641-434802_51 "Exhibit 58" Oct. 1, 2010.
ITC Investigation No. 337-744, captioned: "Certain Mobile Devices, Associated Software, and Components Thereof" Doc. No. 583642-434802_52 "Exhibit 59" Oct. 1, 2010.
ITC Investigation No. 337-744, captioned: "Certain Mobile Devices, Associated Software, and Components Thereof" Doc. No. 585380-435336_1 "435336—First Amended Verified Complaint" Oct. 12, 2010.

(56) References Cited

OTHER PUBLICATIONS

ITC Investigation No. 337-744, captioned: "Certain Mobile Devices, Associated Software, and Components Thereof" Doc. No. 592791-438464_1 "592791—Respondents Motorola Response to the Amended Complaint" Nov. 22, 2010.

ITC Investigation No. 337-744, captioned: "Certain Mobile Devices, Associated Software, and Components Thereof" Doc. No. 593100-438563_1 "438563—Original Verification to Motorola's Response to Amended Complaint" Nov. 23, 2010.

ITC Investigation No. 337-744, captioned: "Certain Mobile Devices, Associated Software, and Components Thereof" Doc. No. 593120-438686_1 "593120—Discovery Statement of the Commission Investigative Staff" Nov. 20, 2010.

ITC Investigation No. 337-744, captioned: "Certain Mobile Devices, Associated Software, and Components Thereof" Doc. No. 609645-445051_1 "Microsoft's Opening Claim Construction Brief" Feb. 24, 2011.

ITC Investigation No. 337-744, captioned: "Certain Mobile Devices, Associated Software, and Components Thereof" Doc. No. 609646-445051_2 "Exhibit List" Feb. 24, 2011.

ITC Investigation No. 337-744, captioned: "Certain Mobile Devices, Associated Software, and Components Thereof" Doc. No. 609648-445051_4 "Exhibit 102" Nov. 16, 1994.

ITC Investigation No. 337-744, captioned: "Certain Mobile Devices, Associated Software, and Components Thereof" Doc. No. 609649-445051_5 "Exhibit 103" Sep. 16, 2004.

ITC Investigation No. 337-744, captioned: "Certain Mobile Devices, Associated Software, and Components Thereof" Doc. No. 609650-445051_6 "Exhibit 104" Aug. 1993.

ITC Investigation No. 337-744, captioned: "Certain Mobile Devices, Associated Software, and Components Thereof" Doc. No. 609653-445051_9 "Exhibit 302" Aug. 7, 1996.

ITC Investigation No. 337-744, captioned: "Certain Mobile Devices, Associated Software, and Components Thereof" Doc. No. 609654-445051_10 "Exhibit 303" 2002 (cited within ITC Investigation No. 337-744 on Feb. 24, 2011).

ITC Investigation No. 337-744, captioned: "Certain Mobile Devices, Associated Software, and Components Thereof" Doc. No. 609657-445051_12 "Exhibit 402 pt1" Nov. 30, 2004.

ITC Investigation No. 337-744, captioned: "Certain Mobile Devices, Associated Software, and Components Thereof" Doc. No. 609661-445051_16 "Exhibit 503" 2010 (cited within ITC Investigation No. 337-744 on Feb. 24, 2011).

ITC Investigation No. 337-744, captioned: "Certain Mobile Devices, Associated Software, and Components Thereof" Doc. No. 609662-445051_17 "Exhibit 504" Feb. 17, 2011.

ITC Investigation No. 337-744, captioned: "Certain Mobile Devices, Associated Software, and Components Thereof" Doc. No. 609663-445051_18 "Exhibit 505" Feb. 17, 2011.

ITC Investigation No. 337-744, captioned: "Certain Mobile Devices, Associated Software, and Components Thereof" Doc. No. 609655-445051_20 "Exhibit 602" Jan. 5, 2010.

ITC Investigation No. 337-744, captioned: "Certain Mobile Devices, Associated Software, and Components Thereof" Doc. No. 609670-445051_24 "Exhibit 703" 1994 (cited within ITC Investigation No. 337-744 on Feb. 24, 2011).

ITC Investigation No. 337-744, captioned: "Certain Mobile Devices, Associated Software, and Components Thereof" Doc. No. 609672-445051_26 "Exhibit 802 pt2" Jan. 1997.

ITC Investigation No. 337-744, captioned: "Certain Mobile Devices, Associated Software, and Components Thereof" Doc. No. 609673-445051_27 "Exhibit 802" Jan. 10, 2003.

ITC Investigation No. 337-744, captioned: "Certain Mobile Devices, Associated Software, and Components Thereof" Doc. No. 609674-445051_28 "Exhibit 803" Oct. 4, 1999.

ITC Investigation No. 337-744, captioned: "Certain Mobile Devices, Associated Software, and Components Thereof" Doc. No. 609666-445051_29 "Public Exhibit 804" Feb. 24, 2011.

ITC Investigation No. 337-744, captioned: "Certain Mobile Devices, Associated Software, and Components Thereof" Doc. No. 610278-445051_31 "Exhibit 902—Part 1" Jun. 20, 2006.

ITC Investigation No. 337-744, captioned: "Certain Mobile Devices, Associated Software, and Components Thereof" Doc. No. 609676-445051_32 "Exhibit 902 Prt2" Feb. 25, 1999.

ITC Investigation No. 337-744, captioned: "Certain Mobile Devices, Associated Software, and Components Thereof" Doc. No. 609677-445051_33 "Exhibit 902 pt3" Mar. 5, 2007.

ITC Investigation No. 337-744, captioned: "Certain Mobile Devices, Associated Software, and Components Thereof" Doc. No. 609675-445051_34 "Exhibit 903" Feb. 24, 2011.

ITC Investigation No. 337-744, captioned: "Certain Mobile Devices, Associated Software, and Components Thereof" Doc. No. 611060-445200_1 "611060" Feb. 25, 2011.

ITC Investigation No. 337-744, captioned: "Certain Mobile Devices, Associated Software, and Components Thereof" Doc. No. 611061-445200_2 "611061" Feb. 25, 2011.

ITC Investigation No. 337-744, captioned: "Certain Mobile Devices, Associated Software, and Components Thereof" Doc. No. 611062-445200_3 "611062" Feb. 25, 2011.

ITC Investigation No. 337-744, captioned: "Certain Mobile Devices, Associated Software, and Components Thereof" Doc. No. 611063-445200_4 "611063" Feb. 25, 2011.

ITC Investigation No. 337-744, captioned: "Certain Mobile Devices, Associated Software, and Components Thereof" Doc. No. 611064-445200_5 "611064" Feb. 25, 2011.

ITC Investigation No. 337-744, captioned: "Certain Mobile Devices, Associated Software, and Components Thereof" Doc. No. 611065-445200_6 "611065" Feb. 25, 2011.

ITC Investigation No. 337-744, captioned: "Certain Mobile Devices, Associated Software, and Components Thereof" Doc. No. 611066-445200_7 "611066" Feb. 25, 2011.

ITC Investigation No. 337-744, captioned: "Certain Mobile Devices, Associated Software, and Components Thereof" Doc. No. 611067-445200_8 "611067" Feb. 25, 2011.

ITC Investigation No. 337-744, captioned: "Certain Mobile Devices, Associated Software, and Components Thereof" Doc. No. 611068-445200_9 "611068" Feb. 25, 2011.

ITC Investigation No. 337-744, captioned: "Certain Mobile Devices, Associated Software, and Components Thereof" Doc. No. 611069-445200_10 "611069" Feb. 25, 2011.

ITC Investigation No. 337-744, captioned: "Certain Mobile Devices, Associated Software, and Components Thereof" Doc. No. 611070-445200_11 "611070" Feb. 25, 2011.

ITC Investigation No. 337-744, captioned: "Certain Mobile Devices, Associated Software, and Components Thereof" Doc. No. 611071-445200_12 "611071" Feb. 25, 2011.

ITC Investigation No. 337-744, captioned: "Certain Mobile Devices, Associated Software, and Components Thereof" Doc. No. 611072-445200_13 "611072" Feb. 25, 2011.

ITC Investigation No. 337-744, captioned: "Certain Mobile Devices, Associated Software, and Components Thereof" Doc. No. 611073-445200_14 "611073" Feb. 25, 2011.

ITC Investigation No. 337-744, captioned: "Certain Mobile Devices, Associated Software, and Components Thereof" Doc. No. 611074-445200_15 "611074" Feb. 25, 2011.

ITC Investigation No. 337-744, captioned: "Certain Mobile Devices, Associated Software, and Components Thereof" Doc. No. 611075-445200_16 "611075" Feb. 25, 2011.

ITC Investigation No. 337-744, captioned: "Certain Mobile Devices, Associated Software, and Components Thereof" Doc. No. 611076-445200_17 "611076" Feb. 25, 2011.

ITC Investigation No. 337-744, captioned: "Certain Mobile Devices, Associated Software, and Components Thereof" Doc. No. 611077-445200_18 "611077" Feb. 25, 2011.

ITC Investigation No. 337-744, captioned: "Certain Mobile Devices, Associated Software, and Components Thereof" Doc. No. 611078-445200_19 "611078" Feb. 25, 2011.

ITC Investigation No. 337-744, captioned: "Certain Mobile Devices, Associated Software, and Components Thereof" Doc. No. 611079-445200_20 "611079" Feb. 25, 2011.

(56) References Cited

OTHER PUBLICATIONS

ITC Investigation No. 337-744, captioned: "Certain Mobile Devices, Associated Software, and Components Thereof" Doc. No. 611080-445200_21 "611080" Feb. 25, 2011.
ITC Investigation No. 337-744, captioned: "Certain Mobile Devices, Associated Software, and Components Thereof" Doc. No. 611081-445200_22 "611081" Feb. 25, 2011.
ITC Investigation No. 337-744, captioned: "Certain Mobile Devices, Associated Software, and Components Thereof" Doc. No. 611082-445200_23 "611082" Feb. 25, 2011.
ITC Investigation No. 337-744, captioned: "Certain Mobile Devices, Associated Software, and Components Thereof" Doc. No. 611083-445200_24 "611083" Feb. 25, 2011.
ITC Investigation No. 337-744, captioned: "Certain Mobile Devices, Associated Software, and Components Thereof" Doc. No. 611093-445200_34 "611093" Jan. 23, 1996.
ITC Investigation No. 337-744, captioned: "Certain Mobile Devices, Associated Software, and Components Thereof" Doc. No. 611094-445200_35 "611094" Aug. 22, 2005.
ITC Investigation No. 337-744, captioned: "Certain Mobile Devices, Associated Software, and Components Thereof" Doc. No. 611095-445200_36 "611095" Apr. 1994-1997.
ITC Investigation No. 337-744, captioned: "Certain Mobile Devices, Associated Software, and Components Thereof" Doc. No. 611096-445200_37 "611096" Aug. 20, 2004.
ITC Investigation No. 337-744, captioned: "Certain Mobile Devices, Associated Software, and Components Thereof" Doc. No. 611097-445200_38 "611097" Feb. 5, 2005.
ITC Investigation No. 337-744, captioned: "Certain Mobile Devices, Associated Software, and Components Thereof" Doc. No. 611098-445200_39 "611098" Jun. 18, 2009.
ITC Investigation No. 337-744, captioned: "Certain Mobile Devices, Associated Software, and Components Thereof" Doc. No. 611099-445200_40 "611099" 1998 (cited within ITC Investigation No. 337-744 on Feb. 25, 2011).
ITC Investigation No. 337-744, captioned: "Certain Mobile Devices, Associated Software, and Components Thereof" Doc. No. 611100-445200_41 "611100" 2001 (cited within ITC Investigation No. 337-744 on Feb. 25, 2011).
ITC Investigation No. 337-744, captioned: "Certain Mobile Devices, Associated Software, and Components Thereof" Doc. No. 611101-445200_42 "611101" Feb. 20, 2011.
ITC Investigation No. 337-744, captioned: "Certain Mobile Devices, Associated Software, and Components Thereof" Doc. No. 611102-445200_43 "611102" 1994 (cited within ITC Investigation No. 337-744 on Feb. 25, 2011).
ITC Investigation No. 337-744, captioned: "Certain Mobile Devices, Associated Software, and Components Thereof" Doc. No. 611103-445200_44 "611103" 2000 (cited within ITC Investigation No. 337-744 on Feb. 25, 2011).
ITC Investigation No. 337-744, captioned: "Certain Mobile Devices, Associated Software, and Components Thereof" Doc. No. 611104-445200_45 "611104" Feb. 25, 2011.
ITC Investigation No. 337-744, captioned: "Certain Mobile Devices, Associated Software, and Components Thereof" Doc. No. 611105-445200_46 "611105" 1983 (cited within ITC Investigation No. 337-744 on Feb. 25, 2011).
ITC Investigation No. 337-744, captioned: "Certain Mobile Devices, Associated Software, and Components Thereof" Doc. No. 611108-445200_49 "611108" 2005 (cited within ITC Investigation No. 337-744 on Feb. 25, 2011).
ITC Investigation No. 337-744, captioned: "Certain Mobile Devices, Associated Software, and Components Thereof" Doc. No. 611109-445200_50 "611109" 1999 (cited within ITC Investigation No. 337-744 on Feb. 25, 2011).
ITC Investigation No. 337-744, captioned: "Certain Mobile Devices, Associated Software, and Components Thereof" Doc. No. 611110-445200_51 "611110" Feb. 25, 2011.
ITC Investigation No. 337-744, captioned: "Certain Mobile Devices, Associated Software, and Components Thereof" Doc. No. 611111-445200_52 "611111" Feb. 25, 2011.
ITC Investigation No. 337-744, captioned: "Certain Mobile Devices, Associated Software, and Components Thereof" Doc. No. 611112-445200_53 "611112" Feb. 25, 2011.
ITC Investigation No. 337-744, captioned: "Certain Mobile Devices, Associated Software, and Components Thereof" Doc. No. 611113-445200_54 "611113" Feb. 25, 2011.
ITC Investigation No. 337-744, captioned: "Certain Mobile Devices, Associated Software, and Components Thereof" Doc. No. 611114-445200_55 "611114" Feb. 25, 2011.
ITC Investigation No. 337-744, captioned: "Certain Mobile Devices, Associated Software, and Components Thereof" Doc. No. 611115-445200_56 "611115" Feb. 25, 2011.
ITC Investigation No. 337-744, captioned: "Certain Mobile Devices, Associated Software, and Components Thereof" Doc. No. 584101-434903_1 "Appendix C Index" Oct. 4, 2010.
ITC Investigation No. 337-744, captioned: "Certain Mobile Devices, Associated Software, and Components Thereof" Doc. No. 584102-434903_2 "Appendix C1" Sep. 16, 2003.
ITC Investigation No. 337-744, captioned: "Certain Mobile Devices, Associated Software, and Components Thereof" Doc. No. 584120-434903_20 "Appendix C2_Tech Refs Cited in 6621746" Oct. 4, 2010.
ITC Investigation No. 337-744, captioned: "Certain Mobile Devices, Associated Software, and Components Thereof" Doc. No. 584121-434903_21 "Appendix D Index-CD 1 of 1" Oct. 4, 2010.
ITC Investigation No. 337-744, captioned: "Certain Mobile Devices, Associated Software, and Components Thereof" Doc. No. 584122-434903_22 "Appendix D" Feb. 17, 2010.
ITC Investigation No. 337-744, captioned: "Certain Mobile Devices, Associated Software, and Components Thereof" Doc. No. 584123-434903_23 "Appendix D1_part 1" Nov. 30, 2004.
ITC Investigation No. 337-744, captioned: "Certain Mobile Devices, Associated Software, and Components Thereof" Doc. No. 584124-434903_24 "Appendix D1_part 2" Jun. 28, 2005.
ITC Investigation No. 337-744, captioned: "Certain Mobile Devices, Associated Software, and Components Thereof" Doc. No. 584125-434903_25 "Appendix D2_000 Tech Refs Cited in 6826762" Oct. 4, 2010.
ITC Investigation No. 337-744, captioned: "Certain Mobile Devices, Associated Software, and Components Thereof" Doc. No. 583732-434904_1 "Appendix E Index-CD 1 of 1" Oct. 4, 2010.
ITC Investigation No. 337-744, captioned: "Certain Mobile Devices, Associated Software, and Components Thereof" Doc. No. 583733-434904_2 "Appendix E" Feb. 17, 2010.
ITC Investigation No. 337-744, captioned: "Certain Mobile Devices, Associated Software, and Components Thereof" Doc. No. 583734-434904_3 "Appendix E1 6909910_Certified FH" Jun. 21, 2005.
ITC Investigation No. 337-744, captioned: "Certain Mobile Devices, Associated Software, and Components Thereof" Doc. No. 583735-434904_4 "Appendix E2_000 Tech Refs Cited in 6909910" Oct. 4, 2010.
ITC Investigation No. 337-744, captioned: "Certain Mobile Devices, Associated Software, and Components Thereof" Doc. No. 583746-434904_10 "Appendix F Index-CD 1 of 1" Oct. 4, 2010.
ITC Investigation No. 337-744, captioned: "Certain Mobile Devices, Associated Software, and Components Thereof" Doc. No. 583747-434904_11 "Appendix F" Feb. 17, 2010.
ITC Investigation No. 337-744, captioned: "Certain Mobile Devices, Associated Software, and Components Thereof" Doc. No. 583748-434904_12 "Appendix F1 7644376_Certified FH" Jan. 5, 2010.
ITC Investigation No. 337-744, captioned: "Certain Mobile Devices, Associated Software, and Components Thereof" Doc. No. 583749-434904_13 "Appendix F2_000.Tech Refs Cited in 7644376" Oct. 4, 2010.
ITC Investigation No. 337-744, captioned: "Certain Mobile Devices, Associated Software, and Components Thereof" Doc. No. 583757-434904_21 "Appendix F2_009 U.S. Appl. No. 60/513,723" Oct. 23, 2003.

(56) References Cited

OTHER PUBLICATIONS

ITC Investigation No. 337-744, captioned: "Certain Mobile Devices, Associated Software, and Components Thereof" Doc. No. 583758-434904_22 "Appendix G Index-CD 1 of 1" Oct. 4, 2010.
ITC Investigation No. 337-744, captioned: "Certain Mobile Devices, Associated Software, and Components Thereof" Doc. No. 583761-434904_25 "Appendix G2_000 Tech Refs Cited in 5664133" Oct. 4, 2010.
ITC Investigation No. 337-744, captioned: "Certain Mobile Devices, Associated Software, and Components Thereof" Doc. No. 584994-434905_1 "Appendix I Index-CD 1 of 1" Oct. 4, 2010.
ITC Investigation No. 337-744, captioned: "Certain Mobile Devices, Associated Software, and Components Thereof" Doc. No. 584995-434905_2 "Appendix I2_000.Tech Refs Cited in 6370566" Oct. 4, 2010.
ITC Investigation No. 337-744, captioned: "Certain Mobile Devices, Associated Software, and Components Thereof" Doc. No. 585029-434905_36 "Appendix I2_034.Byrne_The MS Outlook 97 Automation Model" Mar. 3, 1997.
ITC Investigation No. 337-744, captioned: "Certain Mobile Devices, Associated Software, and Components Thereof" Doc. No. 585030-434905_37 "Appendix I2_035.IBM Tech Discl Method for PDA Calendar" Mar. 1994.
ITC Investigation No. 337-744, captioned: "Certain Mobile Devices, Associated Software, and Components Thereof" Doc. No. 585031-434905_38 "Appendix I2_036.MS Apptitem Object" Mar. 9, 1999.
ITC Investigation No. 337-744, captioned: "Certain Mobile Devices, Associated Software, and Components Thereof" Doc. No. 585032-434905_39 "Appendix I2_037.MS RecurrencePattern Object" Mar. 9, 1999.
ITC Investigation No. 337-744, captioned: "Certain Mobile Devices, Associated Software, and Components Thereof" Doc. No. 585033-434905_40 "Appendix I2_038.MS RecurringEvent Object" Mar. 11, 1999.
ITC Investigation No. 337-744, captioned: "Certain Mobile Devices, Associated Software, and Components Thereof" Doc. No. 585034-434905_41 "Appendix I2_039.MSOffice 97 Guide_Chp 5 MS Outlook Objects" Mar. 1, 1999.
ITC Investigation No. 337-744, captioned: "Certain Mobile Devices, Associated Software, and Components Thereof" Doc. No. 585035-434905_42 "Appendix I2_040.OConnor_Managing Contacts in Windows 95" Apr. 16, 1996.
ITC Investigation No. 337-744, captioned: "Certain Mobile Devices, Associated Software, and Components Thereof" Doc. No. 585036-434905_43 "Appendix I2_041.Pepper_The CallManager System" May 1, 1997.
ITC Investigation No. 337-744, captioned: "Certain Mobile Devices, Associated Software, and Components Thereof" Doc. No. 585204-434905_44 "Appendix H Index-CD 1 of 1" Oct. 4, 2010.
ITC Investigation No. 337-744, captioned: "Certain Mobile Devices, Associated Software, and Components.Thereof" Doc. No. 585205-434905_45 "Appendix H1_part 2" Jan. 1997.
ITC Investigation No. 337-744, captioned: "Certain Mobile Devices, Associated Software, and Components Thereof" Doc. No. 585206-434905_46 "Appendix H2_000.Tech Refs Cited in 6578054" Oct. 4, 2010.
ITC Investigation No. 337-744, captioned: "Certain Mobile Devices, Associated Software, and Components Thereof" Doc. No. 585220-434905_60 "Appendix H2_014.Fielding Hypertext Trnsfer Protocol" Jun. 1999.
ITC Investigation No. 337-744, captioned: "Certain Mobile Devices, Associated Software, and Components Thereof" Doc. No. 585221-434905_61 "Appendix H2_015.Fielding Hypertext Transfr Protocol" Jan. 1997.
ITC Investigation No. 337-744, captioned: "Certain Mobile Devices, Associated Software, and Components Thereof" Doc. No. 585222-434905_62 "Appendix H2_016.Goland HTTP Exts for Distrib Authoring" Feb. 1999.
ITC Investigation No. 337-744, captioned: "Certain Mobile Devices, Associated Software, and Components Thereof" Doc. No. 585223-434905_63 "Appendix H2_017.Martin Strategy for Distrib DP" Feb. 1998.
ITC Investigation No. 337-744, captioned: "Certain Mobile Devices, Associated Software, and Components Thereof" Doc. No. 585224-434905_64 "Appendix H2_018.Slein Reqmnts for a Dist Authoring" Feb. 1998.
ITC Investigation No. 337-744, captioned: "Certain Mobile Devices, Associated Software, and Components Thereof" Doc. No. 585225-434905_65 "Appendix H2_019.Yavin Republication Fact Track" Aug. 1995.
ITC Investigation No. 337-744, captioned: "Certain Mobile Devices, Associated Software, and Components Thereof" Doc. No. 611575-445623_1 "Microsoft's Reply Claim Construction Brief" Mar. 3, 2011.
ITC Investigation No. 337-744, captioned: "Certain Mobile Devices, Associated Software, and Components Thereof" Doc. No. 611576-445623_2 "Exhibit 105" Jun. 20, 2005.
ITC Investigation No. 337-744, captioned: "Certain Mobile Devices, Associated Software, and Components Thereof" Doc. No. 611577-445623_3 "Exhibit 106" Jun. 4, 1992.
ITC Investigation No. 337-744, captioned: "Certain Mobile Devices, Associated Software, and Components Thereof" Doc. No. 611578-445623_4 "Exhibit 304" Dec. 1996.
ITC Investigation No. 337-744, captioned: "Certain Mobile Devices, Associated Software, and Components Thereof" Doc. No. 611579-445623_5 "Exhibit 305" Mar. 2, 2011.
ITC Investigation No. 337-744, captioned: "Certain Mobile Devices, Associated Software, and Components Thereof" Doc. No. 611580-445623_6 "Exhibit 306" Mar. 2, 2011.
ITC Investigation No. 337-744, captioned: "Certain Mobile Devices, Associated Software, and Components Thereof" Doc. No. 611581-445623_7 "Exhibit 704" 1992 (cited within ITC Investigation No. 337-744 on Mar. 3, 2011).
ITC Investigation No. 337-744, captioned: "Certain Mobile Devices, Associated Software, and Components Thereof" Doc. No. 611583-445623_9 "Exhibit List" Mar. 3, 2011.
ITC Investigation No. 337-744, captioned: "Certain Mobile Devices, Associated Software, and Components Thereof" Doc. No. 611594-445626_1 "611594" Mar. 3, 2011.
ITC Investigation No. 337-744, captioned: "Certain Mobile Devices, Associated Software, and Components Thereof" Doc. No. 611604-445626_11 "611604" Jan. 23, 1996.
ITC Investigation No. 337-744, captioned: "Certain Mobile Devices, Associated Software, and Components Thereof" Doc. No. 611605-445626_12 "611605" Aug. 23, 2005.
ITC Investigation No. 337-744, captioned: "Certain Mobile Devices, Associated Software, and Components Thereof" Doc. No. 611606-445626_13 "611606" Dec. 13, 1993.
ITC Investigation No. 337-744, captioned: "Certain Mobile Devices, Associated Software, and Components.Thereof" Doc. No. 611607-445626_14 "611607" Aug. 20, 2004.
ITC Investigation No. 337-744, captioned: "Certain Mobile Devices, Associated Software, and Components Thereof" Doc. No. 611608-445626_15 "611608" Feb. 5, 2005.
ITC Investigation No. 337-744, captioned: "Certain Mobile Devices, Associated Software, and Components Thereof" Doc. No. 611609-445626_16 "611609" Jun. 19, 2009.
ITC Investigation No. 337-744, captioned: "Certain Mobile Devices, Associated Software, and Components Thereof" Doc. No. 611610-445626_17 "611610" 1998 (cited within ITC Investigation No. 337-744 on Mar. 3, 2011).
ITC Investigation No. 337-744, captioned: "Certain Mobile Devices, Associated Software, and Components Thereof" Doc. No. 611611-445626_18 "611611" 2001 (cited within ITC Investigation No. 337-744 on Mar. 3, 2011).
ITC Investigation No. 337-744, captioned: "Certain Mobile Devices, Associated Software, and Components Thereof" Doc. No. 611612-445626_19 "611612" Feb. 20, 2011.

(56) References Cited

OTHER PUBLICATIONS

ITC Investigation No. 337-744, captioned: "Certain Mobile Devices, Associated Software, and Components Thereof" Doc. No. 611613-445626_20 "611613" 1994 (cited within ITC Investigation No. 337-744 on Mar. 3, 2011).
ITC Investigation No. 337-744, captioned: "Certain Mobile Devices, Associated Software, and Components Thereof" Doc. No. 611614-445626_21 "611614" 2000 (cited within ITC Investigation No. 337-744 on Mar. 3, 2011).
ITC Investigation No. 337-744, captioned: "Certain Mobile Devices, Associated Software, and Components Thereof" Doc. No. 611615-445626_22 "611615"1999 (cited within ITC Investigation No. 337-744 on Mar. 3, 2011).
ITC Investigation No. 337-744, captioned: "Certain Mobile Devices, Associated Software, and Components Thereof" Doc. No. 611616-445626_23 "611616" 2005 (cited within ITC Investigation No. 337-744 on Mar. 3, 2011).
ITC Investigation No. 337-744, captioned: "Certain Mobile Devices, Associated Software, and Components Thereof" Doc. No. 611619-445626_26 "611619" 1993 (cited within ITC Investigation No. 337-744 on Mar. 3, 2011).
ITC Investigation No. 337-744, captioned: "Certain Mobile Devices, Associated Software, and Components Thereof" Doc. No. 611620-445626_27 "611620" Feb. 26, 2010.
ITC Investigation No. 337-744, captioned: "Certain Mobile Devices, Associated Software, and Components Thereof" Doc. No. 611621-445626_28 "611621" Mar. 3, 2011.
ITC Investigation No. 337-744, captioned: "Certain Mobile Devices, Associated Software, and Components Thereof" Doc. No. 611622-445626_29 "611622" Mar. 3, 2011.
ITC Investigation No. 337-744, captioned: "Certain Mobile Devices, Associated Software, and Components Thereof" Doc. No. 611694-445691_1 "Respondents Motorola, Inc. and Motorola Mobility Inc. and Complainant Microsoft Corporation's Joint Claim Chart" Mar. 3, 2011.
ITC Investigation No. 337-744, captioned: "Certain Mobile Devices, Associated Software, and Components Thereof" Doc. No. 613968-446856_1 "613968" Mar. 21, 2011.
ITC Investigation No. 337-744, captioned: "Certain Mobile Devices, Associated Software, and Components Thereof" Doc. No. 623287-449708_1 "Notice of Prior Art" Apr. 27, 2011.
ITC Investigation No. 337-744, captioned: "Certain Mobile Devices, Associated Software, and Components Thereof" Doc. No. 583786-434895_1 "A1 Photocopy of CD of 5579517" Feb. 19, 2010.
ITC Investigation No. 337-744, captioned: "Certain Mobile Devices, Associated Software, and Components Thereof" Doc. No. 583787-434895_2 "A2 Photocopy of CD 90-007007_Reexam 517" Feb. 17, 2010.
ITC Investigation No. 337-744, captioned: "Certain Mobile Devices, Associated Software, and Components Thereof" Doc. No. 583788-434895_3 "A3 Photocopy of CD 90-007371_Reexam 517" Feb. 17, 2010.
ITC Investigation No. 337-744, captioned: "Certain Mobile Devices, Associated Software, and Components Thereof" Doc. No. 583789-434895_4 "Appendix A Index—Cd 1 of 5" Oct. 4, 2010.
ITC Investigation No. 337-744, captioned: "Certain Mobile Devices, Associated Software, and Components Thereof" Doc. No. 583790-434895_5 "Appendix A1_Part 1" Nov. 26, 1996.
ITC Investigation No. 337-744, captioned: "Certain Mobile Devices, Associated Software, and Components Thereof" Doc. No. 583791-434895_6 "Appendix A1_Part 2" Jan. 6, 1994.
ITC Investigation No. 337-744, captioned: "Certain Mobile Devices, Associated Software, and Components Thereof" Doc. No. 583792-434895_7 "Appendix A1_Part 3" Nov. 16, 1994.
ITC Investigation No. 337-744, captioned: "Certain Mobile Devices, Associated Software, and Components Thereof" Doc. No. 583793-434895_8 "Appendix A1_Part 4" Apr. 24, 1995.
ITC Investigation No. 337-744, captioned: "Certain Mobile Devices, Associated Software, and Components Thereof" Doc. No. 583794-434895_9 "Appendix A2_Part 1" Apr. 19, 2004.
ITC Investigation No. 337-744, captioned: "Certain Mobile Devices, Associated Software, and Components Thereof" Doc. No. 583795-434895_10 "Appendix A2_Part 10" Apr. 19, 2004.
ITC Investigation No. 337-744, captioned: "Certain Mobile Devices, Associated Software, and Components Thereof" Doc. No. 583796-434895_11 "Appendix A2_Part 11" Apr. 19, 2004.
ITC Investigation No. 337-744, captioned: "Certain Mobile Devices, Associated Software, and Components Thereof" Doc. No. 583797-434895_12 "Appendix A2_Part 12" Apr. 19, 2004.
ITC Investigation No. 337-744, captioned: "Certain Mobile Devices, Associated Software, and Components Thereof" Doc. No. 583798-434895_13 "Appendix A2_Part 13" Apr. 19, 2004.
ITC Investigation No. 337-744, captioned: "Certain Mobile Devices, Associated Software, and Components Thereof" Doc. No. 583799-434895_14 "Appendix A2_Part 14" Apr. 19, 2004.
ITC Investigation No. 337-744, captioned: "Certain Mobile Devices, Associated Software, and Components Thereof" Doc. No. 583800-434895_15 "Appendix A2_Part 15" Apr. 19, 2004.
ITC Investigation No. 337-744, captioned: "Certain Mobile Devices, Associated Software, and Components Thereof" Doc. No. 583801-434895_16 "Appendix A2_Part 16" Apr. 19, 2004.
ITC Investigation No. 337-744, captioned: "Certain Mobile Devices, Associated Software, and Components Thereof" Doc. No. 583802-434895_17 "Appendix A2_Part 17" Apr. 19, 2004.
ITC Investigation No. 337-744, captioned: "Certain Mobile Devices, Associated Software, and Components Thereof" Doc. No. 583803-434895_18 "Appendix A2_Part 18" Apr. 19, 2004.
ITC Investigation No. 337-744, captioned: "Certain Mobile Devices, Associated Software, and Components Thereof" Doc. No. 583804-434895_19 "Appendix A2_Part 2" Apr. 19, 2004.
ITC Investigation No. 337-744, captioned: "Certain Mobile Devices, Associated Software, and Components Thereof" Doc. No. 583805-434895_20 "Appendix A2_Part 3" Apr. 19, 2004.
ITC Investigation No. 337-744, captioned: "Certain Mobile Devices, Associated Software, and Components Thereof" Doc. No. 583806-434895_21 "Appendix A2_Part 4" Sep. 16, 2004.
ITC Investigation No. 337-744, captioned: "Certain Mobile Devices, Associated Software, and Components Thereof" Doc. No. 583807-434895_22 "Appendix A2_Part 5" Dec. 21, 2004.
ITC Investigation No. 337-744, captioned: "Certain Mobile Devices, Associated Software, and Components Thereof" Doc. No. 583808-434895_23 "Appendix A2_Part 6" Apr. 19, 2004.
ITC Investigation No. 337-744, captioned: "Certain Mobile Devices, Associated Software, and Components Thereof" Doc. No. 583809-434895_24 "Appendix A2_Part 7" Apr. 19, 2004.
ITC Investigation No. 337-744, captioned: "Certain Mobile Devices, Associated Software, and Components Thereof" Doc. No. 583810-434895_25 "Appendix A2_Part 8" Apr. 19, 2004.
ITC Investigation No. 337-744, captioned: "Certain Mobile Devices, Associated Software, and Components Thereof" Doc. No. 583811-434895_26 "Appendix A2_Part 9" Apr. 19, 2004.
ITC Investigation No. 337-744, captioned: "Certain Mobile Devices, Associated Software, and Components Thereof" Doc. No. 583812-434895_27 "Appendix A3_Part 1" Jan. 8, 2005.
ITC Investigation No. 337-744, captioned: "Certain Mobile Devices, Associated Software, and Components Thereof" Doc. No. 583813-434895_28 "Appendix A3_Part 10" Jan. 8, 2005.
ITC Investigation No. 337-744, captioned: "Certain Mobile Devices, Associated Software, and Components Thereof" Doc. No. 583814-434895_29 "Appendix A3_Part 11" Jan. 8, 2005.
ITC Investigation No. 337-744, captioned: "Certain Mobile Devices, Associated Software, and Components Thereof" Doc. No. 583815-434895_30 "Appendix A3_Part 12" Jan. 8, 2005.
ITC Investigation No. 337-744, captioned: "Certain Mobile Devices, Associated Software, and Components Thereof" Doc. No. 583816-434895_31 "Appendix A3_Part 13" Jan. 8, 2005.
ITC Investigation No. 337-744, captioned: "Certain Mobile Devices, Associated Software, and Components Thereof" Doc. No. 583817-434895_32 "Appendix A3_Part 14" Jan. 8, 2005.
ITC Investigation No. 337-744, captioned: "Certain Mobile Devices, Associated Software, and Components Thereof" Doc. No. 583818-434895_33 "Appendix A3_Part 15" Jan. 8, 2005.

(56) References Cited

OTHER PUBLICATIONS

ITC Investigation No. 337-744, captioned: "Certain Mobile Devices, Associated Software, and Components Thereof" Doc. No. 583819-434895_34 "Appendix A3_Part 16" Jan. 8, 2005.
ITC Investigation No. 337-744, captioned: "Certain Mobile Devices, Associated Software, and Components Thereof" Doc. No. 583820-434895_35 "Appendix A3_Part 17" Jan. 8, 2005.
ITC Investigation No. 337-744, captioned: "Certain Mobile Devices, Associated Software, and Components Thereof" Doc. No. 583821-434895_36 "Appendix A3_Part 2" Jan. 8, 2005.
ITC Investigation No. 337-744, captioned: "Certain Mobile Devices, Associated Software, and Components Thereof" Doc. No. 583822-434895_37 "Appendix A3_Part 3" Jan. 8, 2005.
ITC Investigation No. 337-744, captioned: "Certain Mobile Devices, Associated Software, and Components Thereof" Doc. No. 583823-434895_38 "Appendix A3_Part 4" Jan. 8, 2005.
ITC Investigation No. 337-744, captioned: "Certain Mobile Devices, Associated Software, and Components Thereof" Doc. No. 583824-434895_39 "Appendix A3_Part 5" Jan. 8, 2005.
ITC Investigation No. 337-744, captioned: "Certain Mobile Devices, Associated Software, and Components Thereof" Doc. No. 583825-434895_40 "Appendix A3_Part 6" Jan. 8, 2005.
ITC Investigation No. 337-744, captioned: "Certain Mobile Devices, Associated Software, and Components Thereof" Doc. No. 583826-434895_41 "Appendix A3_Part 7" Jan. 8, 2005.
ITC Investigation No. 337-744, captioned: "Certain Mobile Devices, Associated Software, and Components Thereof" Doc. No. 583827-434895_42 "Appendix A3_Part 8" Jan. 8, 2005.
ITC Investigation No. 337-744, captioned: "Certain Mobile Devices, Associated Software, and Components Thereof" Doc. No. 583828-434895_43 "Appendix A3_Part 9" Jan. 8, 2005.
ITC Investigation No. 337-744, captioned: "Certain Mobile Devices, Associated Software, and Components Thereof" Doc. No. 583829-434895_44 "Appendix A4_000 Tech Refs Cited in 5579517" Oct. 4, 2010.
ITC Investigation No. 337-744, captioned: "Certain Mobile Devices, Associated Software, and Components Thereof" Doc. No. 626074-450925_1 "450925" May 17, 2011.
ITC Investigation No. 337-744, captioned: "Certain Mobile Devices, Associated Software, and Components Thereof" Doc. No. 655660-457613_1 "655660" Aug. 24, 2011.
ITC Investigation No. 337-744, captioned: "Certain Mobile Devices, Associated Software, and Components Thereof" Doc. No. 655427-457422_1 "655427" Aug. 19, 2011.
ITC Investigation No. 337-744, captioned: "Certain Mobile Devices, Associated Software, and Components Thereof" Doc. No. 655428-457423_1 "655428", Aug. 19, 2011.
ITC Investigation No. 337-744, captioned: "Certain Mobile Devices, Associated Software, and Components Thereof" Docket Report retrieved Sep. 1, 2011.
ITC Investigation No. 337-744, captioned: "Certain Mobile Devices, Associated Software, and Components Thereof" Doc. No. 713750-470025_1 "Complainant Microsoft Corporation's Response to Respondent Motorola Mobility, Inc.'s Petition and Contingent Petition for Review" Jan. 26, 2012.
ITC Investigation No. 337-744, captioned: "Certain Mobile Devices, Associated Software, and Components Thereof" Doc. No. 713748-470024_1 "Summary of Complainant Microsoft Corporation's Response to Respondent Motorola Mobility, Inc.'s Petition and Contingent Petition for Review" Jan. 26, 2012.
ITC Investigation No. 337-744, captioned: "Certain Mobile Devices, Associated Software, and Components Thereof" Doc. No. 469387-711302_1 "Public Version of Respondent Motorola Mobility Inc.'s Summary of response to Complainant Microsoft Corporation's Petition for Review" Jan. 23, 2012.
ITC Investigation No. 337-744, captioned: "Certain Mobile Devices, Associated Software, and Components Thereof" Doc. No. 469359-711253_1 "Jan. 20, 2012[Public] Public Version of Motorola Mobility Inc.'s Response to Petition for Review" Jan. 20, 2012.
ITC Investigation No. 337-744, captioned: "Certain Mobile Devices, Associated Software, and Components Thereof" Doc. No. 469354-711246_1 "Public Version of Respondent Motorola Mobility Inc.'s Summary of Petition and Contingent Petition for Review" Jan. 2012.
ITC Investigation No. 337-744, captioned: "Certain Mobile Devices, Associated Software, and Components Thereof" Doc. No. 469352-711241_1 "Public Version of Respondent Motorola Mobility Inc.'s Petition and Contingent Petition for Review" Jan. 20, 2012.
ITC Investigation No. 337-744, captioned: "Certain Mobile Devices, Associated Software, and Components Thereof" Doc. No. 468894-708680_1 "Microsoft Corporation's Petition for Review of Initial Determination" Jan. 18, 2012.
ITC Investigation No. 337-744, captioned: "Certain Mobile Devices, Associated Software, and Components Thereof" Doc. No. 468883-708670_1 "Public Version of Microsoft Summary of Petition for Review" Jan. 17, 2012.
ITC Investigation No. 337-744, captioned: "Certain Mobile Devices, Associated Software, and Components Thereof" Doc. No. 467464-705702_1 "467464" Dec. 29, 2011.
ITC Investigation No. 337-744, captioned: "Certain Mobile Devices, Associated Software, and Components Thereof" Doc. No. 480750-748295_1 "748295" May 21, 2012.
ITC Investigation No. 337-744, captioned: "Certain Mobile Devices, Associated Software, and Components Thereof" Doc. No. 480752-748264_1 "748264" May 18, 2012.
ITC Investigation No. 337-744, captioned: "Certain Mobile Devices, Associated Software, and Components Thereof" Doc. No. 480668-748147_1 "748147" May 18, 2012.
ITC Investigation No. 337-744, captioned: "Certain Mobile Devices, Associated Software, and Components Thereof" Doc. No. 476982-735467_1 "Complainant Microsoft Corporation's Response to Motorola Mobility's Written Submission in Response to Notice of a Commission Determination to Review a Final Initial Determination in Part" Apr. 6, 2012.
ITC Investigation No. 337-744, captioned: "Certain Mobile Devices, Associated Software, and Components Thereof" Doc. No. 476447-732456_1 "732456" Mar. 27, 2012.
ITC Investigation No. 337-744, captioned: "Certain Mobile Devices, Associated Software, and Components Thereof" Doc. No. 476443-732448_1 "Mar. 30, 2012 (Public) Respondent Motorola Mobility Inc's Opening Brief on Commission Review.pdf" Mar. 19, 2012.
ITC Investigation No. 337-744, captioned: "Certain Mobile Devices, Associated Software, and Components Thereof" Doc. No. 476312-732171_1 "Complainant Microsoft Corporation's Written Submission in Response to Notice of Commission Determination to Review a Final Initial Determaion in Part (1 of 2)" Mar. 19, 2012.
ITC Investigation No. 337-744, captioned: "Certain Mobile Devices, Associated Software, and Components Thereof" Doc. No. 476312-732170_2 "Complainant Microsoft Corporation's Written Submission in Response to Notice of Commission Determination to Review a Final Initial Determaion in Part (2 of 2)" Mar. 19, 2012.
ITC Investigation No. 337-744, captioned: "Certain Mobile Devices, Associated Software, and Components Thereof" Doc. No. 476085_731229_1 "Microsoft's Response to Public Interest Statement of Non-Party Google, Inc." Mar. 27, 2012.
ITC Investigation No. 337-744, captioned: "Certain Mobile Devices, Associated Software, and Components Thereof" Doc. No. 476085_731230_2 "Exhibit A" Jun. 13, 2011.
ITC Investigation No. 337-744, captioned: "Certain Mobile Devices, Associated Software, and Components Thereof" Doc. No. 476085_731231_3 "Exhibit B" Aug. 22, 2011.
ITC Investigation No. 337-744, captioned: "Certain Mobile Devices, Associated Software, and Components Thereof" Doc. No. 476085_731232_4 "Exhibit C" Dec. 22, 2011.
ITC Investigation No. 337-744, captioned: "Certain Mobile Devices, Associated Software, and Components Thereof" Doc. No. 476085_731233_5 "Exhibit D" Feb. 27, 2012.
ITC Investigation No. 337-744, captioned: "Certain Mobile Devices, Associated Software, and Components Thereof" Doc. No. 476085_731234_6 "Exhibit E" Nov. 15, 2011.
ITC Investigation No. 337-744, captioned: "Certain Mobile Devices, Associated Software, and Components Thereof" Doc. No. 476085_731235_7 "Exhibit F" Mar. 27, 2012.

(56) References Cited

OTHER PUBLICATIONS

ITC Investigation No. 337-744, captioned: "*Certain Mobile Devices, Associated Software, and Components Thereof*" Doc. No. 476085_731236_8 "*Exhibit G*" Mar. 27, 2012.
ITC Investigation No. 337-744, captioned: "*Certain Mobile Devices, Associated Software, and Components Thereof*" Doc. No. 476085_731237_9 "*Exhibit H*" 2010.
ITC Investigation No. 337-744, captioned: "*Certain Mobile Devices, Associated Software, and Components Thereof*" Doc. No. 476085_731238_10 "*Exhibit I*" Sep. 15, 2010.
ITC Investigation No. 337-744, captioned: "*Certain Mobile Devices, Associated Software, and Components Thereof*" Doc. No. 476085_731240_11 "*Exhibit J*" May 5, 2011.
ITC Investigation No. 337-744, captioned: "*Certain Mobile Devices, Associated Software, and Components Thereof*" Doc. No. 476085_731241_12 "*Exhibit K*" May 8, 2011.
ITC Investigation No. 337-744, captioned: "*Certain Mobile Devices, Associated Software, and Components Thereof*" Doc. No. 476085_731242_13 "*Exhibit L*" Aug. 6, 2010.
ITC Investigation No. 337-744, captioned: "*Certain Mobile Devices, Associated Software, and Components Thereof*" Doc. No. 476085_731243_14 "*Exhibit M*" May 9, 2011.
ITC Investigation No. 337-744, captioned: "*Certain Mobile Devices, Associated Software, and Components Thereof*" Doc. No. 476085_731244_15 "*Exhibit N*" Aug. 16, 2011.
ITC Investigation No. 337-744, captioned: "*Certain Mobile Devices, Associated Software, and Components Thereof*" Doc. No. 476085_731245_16 "*Exhibit O*" Jul. 22, 2010.
ITC Investigation No. 337-744, captioned: "*Certain Mobile Devices, Associated Software, and Components Thereof*" Doc. No. 476085_731246_17 "*Exhibit P*" Jul. 2011.
ITC Investigation No. 337-744, captioned: "*Certain Mobile Devices, Associated Software, and Components Thereof*" Doc. No. 476085_731247_18 "*Exhibit Q*" Feb. 16, 2012.
ITC Investigation No. 337-744, captioned: "*Certain Mobile Devices, Associated Software, and Components Thereof*" Doc. No. 482094_751737_1 "*482094*" Jun. 5, 2012.
ITC Investigation No. 337-744, captioned: "*Certain Mobile Devices, Associated Software, and Components Thereof*" Docket Report retrieved Jun. 8, 2012.
ITC Investigation No. 337-744, captioned: "Certain Mobile Devices, Associated Software, and Components Thereof" Docket Report retrieved Jun. 27, 2013.
ITC Investigation No. 337-744, captioned: "Certain Mobile Devices, Associated Software, and Components Thereof" Doc. No. 482881_755061_1, Jun. 13, 2012 (2 pages).
ITC Investigation No. 337-744, captioned: "Certain Mobile Devices, Associated Software, and Components Thereof" Doc. No. 483744_756513_1, Jun. 25, 2012 (4 pages).
ITC Investigation No. 337-744, captioned: "Certain Mobile Devices, Associated Software, and Components Thereof" Doc. No. 485881_761536_1, Jul. 19, 2012 (84 pages).
ITC Investigation No. 337-744, captioned: "Certain Mobile Devices, Associated Software, and Components Thereof" Doc. No. 487409_768216_1, Aug. 6, 2012 (1 page).
ITC Investigation No. 337-744, captioned: "Certain Mobile Devices, Associated Software, and Components Thereof" Doc. No. 489451_776795_1, Aug. 27, 2012 (89 pages).
ITC Investigation No. 337-744, captioned: "Certain Mobile Devices, Associated Software, and Components Thereof" Doc. No. 489808_777712_1, Aug. 29, 2012 (3 pages).
ITC Investigation No. 337-744, captioned: "Certain Mobile Devices, Associated Software, and Components Thereof" Doc. No. 491009_783036_1, Sep. 14, 2012 (8 pages).
ITC Investigation No. 337-744, captioned: "Certain Mobile Devices, Associated Software, and Components Thereof" Doc. No. 491009_783034_2, Sep. 14, 2012 (14 pages).
ITC Investigation No. 337-744, captioned: "Certain Mobile Devices, Associated Software, and Components Thereof" Doc. No. 491009_783035_3, Sep. 14, 2012 (2 pages).
ITC Investigation No. 337-744, captioned: "Certain Mobile Devices, Associated Software, and Components Thereof" Doc. No. 492412_787901_1, Oct. 4, 2012 (3 pages).
ITC Investigation No. 337-744, captioned: "Certain Mobile Devices, Associated Software, and Components Thereof" Doc. No. 493680_791927_1, Oct. 16, 2012 (5 pages).
ITC Investigation No. 337-744, captioned: "Certain Mobile Devices, Associated Software, and Components Thereof" Doc. No. 493681_791928_1, Oct. 16, 2012 (9 pages).
ITC Investigation No. 337-744, captioned: "Certain Mobile Devices, Associated Software, and Components Thereof" Doc. No. 493815_792094_1, Oct. 17, 2012 (pp. 12).
ITC Investigation No. 337-744, captioned: "Certain Mobile Devices, Associated Software, and Components Thereof" Doc. No. 496503_798287_1, Nov. 7, 2012 (4 pages).
ITC Investigation No. 337-744, captioned: "Certain Mobile Devices, Associated Software, and Components Thereof" Doc. No. 502131_814080_1, Jan. 25, 2013 (3 pages).
ITC Investigation No. 337-744, captioned: "Certain Mobile Devices, Associated Software, and Components Thereof" Doc. No. 502410_814465, Jan. 30, 2013 (1 page).
ITC Investigation No. 337-744, captioned: "Certain Mobile Devices, Associated Software, and Components Thereof" Doc. No. 505434_828065_1, Mar. 8, 2013 (142 pages).
ITC Investigation No. 337-744, captioned: "Certain Mobile Devices, Associated Software, and Components Thereof" Doc. No. 505434_828066_2, Mar. 8, 2013 (142 pages).
ITC Investigation No. 337-744, captioned: "Certain Mobile Devices, Associated Software, and Components Thereof" Doc. No. 507079_838104_1, Apr. 5, 2013 (2 pages).
ITC Investigation No. 337-744, captioned: "Certain Mobile Devices, Associated Software, and Components Thereof" Doc. No. 508408_840335_1, Apr. 30, 2013 (3 pages).
ITC Investigation No. 337-744, captioned: "Certain Mobile Devices, Associated Software, and Components Thereof" Doc. No. 508522_840479_1, May 1, 2013 (3 pages).
ITC Investigation No. 337-744, captioned: "Certain Mobile Devices, Associated Software, and Components Thereof" Doc. No. 509069_842167_1, May 13, 2013 (3 pages).
ITC Investigation No. 337-744, captioned: "Certain Mobile Devices, Associated Software, and Components Thereof" Doc. No. 509954_849809_1, May 28, 2013 (3 pages).
ITC Investigation No. 337-744, captioned: "Certain Mobile Devices, Associated Software, and Components Thereof" Doc. No. 510948_851243_1, Jun. 10, 2013 (3 pages).
ITC Investigation No. 337-744, captioned: "Certain Mobile Devices, Associated Software, and Components Thereof" Doc. No. 510950_851245_1, Jun. 10, 2013 (3 pages).
ITC Investigation No. 337-744, captioned: "Certain Mobile Devices, Associated Software, and Components Thereof" Doc. No. 513896_860777_1, Jul. 18, 2013 (3 pages).
ITC Investigation No. 337-744, captioned: "Certain Mobile Devices, Associated Software, and Components Thereof" Doc. No. 513940_860844_1, Jul. 18, 2013 (2 pages).
ITC Investigation No. 337-744, captioned: "Certain Mobile Devices, Associated Software, and Components Thereof" Doc. No. 583604-434802_11 "Exhibit 11", Oct. 4, 2010, 30 pages.
ITC Investigation No. 337-744, captioned: "Certain Mobile Devices, Associated Software, and Components Thereof" Doc. No. 583607-434802_14 "Exhibit 15", Oct. 4, 2010, 23 pages.
ITC Investigation No. 337-744, captioned: "Certain Mobile Devices, Associated Software, and Components Thereof" Doc. No. 583610-434802_17 "Exhibit 19", Oct. 4, 2010, 18 pages.
ITC Investigation No. 337-744, captioned: "Certain Mobile Devices, Associated Software, and Components Thereof" Doc. No. 583614-434802_20 "Exhibit 23", Oct. 4, 2010, 22 pages.
ITC Investigation No. 337-744, captioned: "Certain Mobile Devices, Associated Software, and Components Thereof" Doc. No. 583617-434802_23 "Exhibit 27", Oct. 4, 2010, 10 pages.
ITC Investigation No. 337-744, captioned: "Certain Mobile Devices, Associated Software, and Components Thereof" Doc. No. 583620-434802_5 "Exhibit 3", Oct. 4, 2010, 26 pages.

(56) References Cited

OTHER PUBLICATIONS

ITC Investigation No. 337-744, captioned: "Certain Mobile Devices, Associated Software, and Components Thereof" Doc. No. 583621-434802_26 "Exhibit 31", Oct. 4, 2010, 23 pages.
ITC Investigation No. 337-744, captioned: "Certain Mobile Devices, Associated Software, and Components Thereof" Doc. No. 583624-434802_29 "Exhibit 35", Oct. 4, 2010, 38 pages.
ITC Investigation No. 337-744, captioned: "Certain Mobile Devices, Associated Software, and Components Thereof" Doc. No. 583627-434802_6 "Exhibit 4", Oct. 4, 2010, 28 pages.
ITC Investigation No. 337-744, captioned: "Certain Mobile Devices, Associated Software, and Components Thereof" Doc. No. 609647-445051_3 "Exhibit 101", Feb. 24, 2011, 23 pages.
ITC Investigation No. 337-744, captioned: "Certain Mobile Devices, Associated Software, and Components Thereof" Doc. No. 609651-445051_7 "Exhibit 201", Feb. 24, 2011, 25 pages.
ITC Investigation No. 337-744, captioned: "Certain Mobile Devices, Associated Software, and Components Thereof" Doc. No. 609652-445051_8 "Exhibit 301", Feb. 24, 2011, 27 pages.
ITC Investigation No. 337-744, captioned: "Certain Mobile Devices, Associated Software, and Components Thereof" Doc. No. 609656-445051_11 "Exhibit 401", Feb. 24, 2011, 23 pages.
ITC Investigation No. 337-744, captioned: "Certain Mobile Devices, Associated Software, and Components Thereof" Doc. No. 609658-445051_13 "Exhibit 402 pt2", Feb. 24, 2011, 360 pages.
ITC Investigation No. 337-744, captioned: "Certain Mobile Devices, Associated Software, and Components Thereof" Doc. No. 609659-445051_14 "Exhibit 501", Feb. 24, 2011, 18 pages.
ITC Investigation No. 337-744, captioned: "Certain Mobile Devices, Associated Software, and Components Thereof" Doc. No. 609660-445051_15 "Exhibit 502", Feb. 24, 2011, 139 pages.
ITC Investigation No. 337-744, captioned: "Certain Mobile Devices, Associated Software, and Components Thereof" Doc. No. 609664-445051_19 "Exhibit 601", Feb. 24, 2011, 51 pages.
ITC Investigation No. 337-744, captioned: "Certain Mobile Devices, Associated Software, and Components Thereof" Doc. No. 609665-445051_30 "Exhibit 901", Feb. 24, 2011, 38 pages.
ITC Investigation No. 337-744, captioned: "Certain Mobile Devices, Associated Software, and Components Thereof" Doc. No. 609667-445051_21 "Exhibit 701", Feb. 24, 2011, 22 pages.
ITC Investigation No. 337-744, captioned: "Certain Mobile Devices, Associated Software, and Components Thereof" Doc. No. 609668-445051_22 "Exhibit 702 pt1", Feb. 24, 2011, 246 pages.
ITC Investigation No. 337-744, captioned: "Certain Mobile Devices, Associated Software, and Components Thereof" Doc. No. 609669-445051_23 "Exhibit 702 pt2", Feb. 24, 2011, 245 pages.
ITC Investigation No. 337-744, captioned: "Certain Mobile Devices, Associated Software, and Components Thereof" Doc. No. 609671-445051_25 "Exhibit 801", Feb. 24, 2011, 23 pages.
ITC Investigation No. 337-744, captioned: "Certain Mobile Devices, Associated Software, and Components Thereof" Doc. No. 611084-445200_25 "611084", Feb. 25, 2011, 23 pages.
ITC Investigation No. 337-744, captioned: "Certain Mobile Devices, Associated Software, and Components Thereof" Doc. No. 611085-445200_26 "611085", Feb. 25, 2011, 25 pages.
ITC Investigation No. 337-744, captioned: "Certain Mobile Devices, Associated Software, and Components Thereof" Doc. No. 611086-445200_27 "611086", Feb. 25, 2011, 19 pages.
ITC Investigation No. 337-744, captioned: "Certain Mobile Devices, Associated Software, and Components Thereof" Doc. No. 611087-445200_28 "611087", Feb. 25, 2011, 36 pages.
ITC Investigation No. 337-744, captioned: "Certain Mobile Devices, Associated Software, and Components Thereof" Doc. No. 611088-445200_29 "611088", Feb. 25, 2011, 21 pages.
ITC Investigation No. 337-744, captioned: "Certain Mobile Devices, Associated Software, and Components Thereof" Doc. No. 611089-445200_30 "611089", Feb. 25, 2011, 27 pages.
ITC Investigation No. 337-744, captioned: "Certain Mobile Devices, Associated Software, and Components Thereof" Doc. No. 611090-445200_31 "611090", Feb. 25, 2011, 20 pages.
ITC Investigation No. 337-744, captioned: "Certain Mobile Devices, Associated Software, and Components Thereof" Doc. No. 611091-445200_32 "611091", Feb. 25, 2011, 15 pages.
ITC Investigation No. 337-744, captioned: "Certain Mobile Devices, Associated Software, and Components Thereof" Doc. No. 611092-445200_33 "611092", Feb. 25, 2011, 48 pages.
ITC Investigation No. 337-744, captioned: "Certain Mobile Devices, Associated Software, and Components Thereof" Doc. No. 611106-445200_47 "611106", Feb. 25, 2011, 18 pages.
ITC Investigation No. 337-744, captioned: "Certain Mobile Devices, Associated Software, and Components Thereof" Doc. No. 611107-445200_48 "611107", Feb. 25, 2011, 43 pages.
ITC Investigation No. 337-744, captioned: "Certain Mobile Devices, Associated Software, and Components Thereof" Doc. No. 611582-445623_8 "Exhibit 705", Mar. 3, 2011, 9 pages.
ITC Investigation No. 337-744, captioned: "Certain Mobile Devices, Associated Software, and Components Thereof" Doc. No. 611595-445626_2 "611595", Mar. 3, 2011, 23 pages.
ITC Investigation No. 337-744, captioned: "Certain Mobile Devices, Associated Software, and Components Thereof" Doc. No. 611596-445626_3 "611596", Mar. 3, 2011, 25 pages.
ITC Investigation No. 337-744, captioned: "Certain Mobile Devices, Associated Software, and Components Thereof" Doc. No. 611597-445626_4 "611597", Mar. 3, 2011, 19 pages.
ITC Investigation No. 337-744, captioned: "Certain Mobile Devices, Associated Software, and Components Thereof" Doc. No. 611598-445626_5 "611598", Mar. 3, 2011, 36 pages.
ITC Investigation No. 337-744, captioned: "Certain Mobile Devices, Associated Software, and Components Thereof" Doc. No. 611599-445626_6 "611599", Mar. 3, 2011, 21 pages.
ITC Investigation No. 337-744, captioned: "Certain Mobile Devices, Associated Software, and Components Thereof" Doc. No. 611600-445626_7 "611600", Mar. 3, 2011, 27 pages.
ITC Investigation No. 337-744, captioned: "Certain Mobile Devices, Associated Software, and Components Thereof" Doc. No. 611601-445626_8 "611601", Mar. 3, 2011, 20 pages.
ITC Investigation No. 337-744, captioned: "Certain Mobile Devices, Associated Software, and Components Thereof" Doc. No. 611602-445626_9 "611602", Mar. 3, 2011, 15 pages.
ITC Investigation No. 337-744, captioned: "Certain Mobile Devices, Associated Software, and Components Thereof" Doc. No. 611603-445626_10 "611603", Mar. 3, 2011, 48 pages.
ITC Investigation No. 337-744, captioned: "Certain Mobile Devices, Associated Software, and Components Thereof" Doc. No. 611617-445626_24 "611617", Mar. 3, 2011, 43 pages.
ITC Investigation No. 337-744, captioned: "Certain Mobile Devices, Associated Software, and Components Thereof" Doc. No. 611618-445626_25 "611618", Mar. 3, 2011, 18 pages.
ITC Investigation No. 337-744, captioned: "Certain Mobile Devices, Associated Software, and Components Thereof" Doc. No. 626074-450925_1 "450925", May 17, 2011.
ITC Investigation No. 337-744, captioned: "Certain Mobile Devices, Associated Software, and Components Thereof" Doc. No. 655427-457422_1 "655427", Aug. 22, 2011.
ITC Investigation No. 337-744, captioned: "Certain Mobile Devices, Associated Software, and Components Thereof" Doc. No. 655428-457423_"655428", Aug. 22, 2011.
ITC Investigation No. 337-744, captioned: "Certain Mobile Devices, Associated Software, and Components Thereof" Doc. No. 655660-457613_1 "655660", Aug. 24, 2011.
ITC Investigation No. 337-744, captioned: "Certain Mobile Devices, Associated Software, and Components Thereof" Docket Report retrieved Nov. 4, 2013.
ITC Investigation No. 337-744, captioned: "Certain Mobile Devices, Associated Software, and Components Thereof" Doc. No. 872165-518592_1 "518592", Sep. 19, 2013 (3 pages).
ITC Investigation No. 337-744, captioned: "Certain Mobile Devices, Associated Software, and Components Thereof" Docket Report retrieved Jul. 14, 2014.
ITC Investigation No. 337-744, captioned: "Certain Mobile Devices, Associated Software, and Components Thereof" Doc. No. 530132-907407_"907407", Mar. 19, 2014.

(56) References Cited

OTHER PUBLICATIONS

ITC Investigation No. 337-744, captioned: "Certain Mobile Devices, Associated Software, and Components Thereof" Doc. No. 531057-910294_"910294", Apr. 3, 2014.
ITC Investigation No. 337-744, captioned: "Certain Mobile Devices, Associated Software, and Components Thereof" Doc. No. 531103-910345_"910345", Apr. 3, 2014.
ITC Investigation No. 337-744, captioned: "Certain Mobile Devices, Associated Software, and Components Thereof" Doc. No. 531141-910505_"910505", Apr. 4, 2014.
ITC Investigation No. 337-744, captioned: "Certain Mobile Devices, Associated Software, and Components Thereof" Doc. No. 531468-910957_"910957", Apr. 9, 2014.
ITC Investigation No. 337-744, captioned: "Certain Mobile Devices, Associated Software, and Components Thereof" Doc. No. 532361-912722_"912722", Apr. 15, 2014.
ITC Investigation No. 337-744, captioned: "Certain Mobile Devices, Associated Software, and Components Thereof" Doc. No. 531919-911772_"911772", Apr. 15, 2014.
ITC Investigation No. 337-744, captioned: "Certain Mobile Devices, Associated Software, and Components Thereof" Doc. No. 532362-912725_"912725", Apr. 21, 2014.
ITC Investigation No. 337-744, captioned: "Certain Mobile Devices, Associated Software, and Components Thereof" Doc. No. 532824-915990_"915990", Apr. 29, 2014.
ITC Investigation No. 337-744, captioned: "Certain Mobile Devices, Associated Software, and Components Thereof" Doc. No. 532909-916227_"916227", Apr. 30, 2014.
ITC Investigation No. 337-744, captioned: "Certain Mobile Devices, Associated Software, and Components Thereof" Doc. No. 533183-916956_"916956", May. 5, 2014.
ITC Investigation No. 337-744, captioned: "Certain Mobile Devices, Associated Software, and Components Thereof" Doc. No. 533639-919787_"919787", May 1, 2014.
ITC Investigation No. 337-744, captioned: "Certain Mobile Devices, Associated Software, and Components Thereof" Doc. No. 536016-934991_"934991", Jun. 17, 2014.
ITC Investigation No. 337-744, captioned: "Certain Mobile Devices, Associated Software, and Components Thereof" Doc. No. 536017-934994_"934994", Jun. 17, 2014.
ITC Investigation No. 337-744, captioned: "Certain Mobile Devices, Associated Software, and Components Thereof" Doc. No. 536018-934997_"934997", Jun. 17, 2014.
ITC Investigation No. 337-744, captioned: "Certain Mobile Devices, Associated Software, and Components Thereof" Doc. No. 536102-935206_"935206", Jun. 18, 2014.
ITC Investigation No. 337-744, captioned: "Certain Mobile Devices, Associated Software, and Components Thereof" Doc. No. 536147-935173_"935173", Jun. 18, 2014.
ITC Investigation No. 337-744, captioned: "Certain Mobile Devices, Associated Software, and Components Thereof" Docket Report retrieved Nov. 4, 2014, 4 pgs.
ITC Investigation No. 337-744, captioned: "Certain Mobile Devices, Associated Software, and Components Thereof" Doc. No. 544241-957405_"957405", Oct. 15, 2014, 9 pgs.
ITC Investigation No. 337-744, captioned: "Certain Mobile Devices, Associated Software, and Components Thereof" Doc. No. 544300-957405_"958091", Oct. 16, 2014, 13 pgs.
ITC Investigation No. 337-744, captioned: "Certain Mobile Devices, Associated Software, and Components Thereof" Doc. No. 965692-546521_"546521", Nov. 20, 2014.
ITC Investigation No. 337-744, captioned: "Certain Mobile Devices, Associated Software, and Components Thereof" Doc. No. 974921-547238_"547238", Dec. 3, 2014.
ITC Investigation No. 337-744, captioned: "Certain Mobile Devices, Associated Software, and Components Thereof" Docket Report retrieved Jan. 9, 2015.

* cited by examiner

METHOD AND SYSTEM FOR SUPPORTING OFF-LINE MODE OF OPERATION AND SYNCHRONIZATION

CROSS REFERENCE TO RELATED APPLICATIONS

The present application is a continuation application of U.S. patent application Ser. No. 11/613,157, filed Dec. 19, 2006 (anticipated as issuing on Jan. 4, 2011, as U.S. Pat. No. 7,865,469), and entitled "Method And System For Supporting Off-Line Mode Of Operation And Synchronization", which is a continuation of U.S. patent application Ser. No. 10/459,380, filed Jun. 10, 2003 (now U.S. Pat. No. 7,240,091) and entitled the same, which is a continuation of U.S. patent application Ser. No. 09/412,766, filed Oct. 4, 1999 (now U.S. Pat. No. 6,578,054) and entitled "Method And System For Supporting Off-Line Mode Of Operation And Synchronization Using Resource State Information", which patent applications are incorporated herein by reference in their entirety.

BACKGROUND OF THE INVENTION

1. The Field of the Invention

The present invention relates to the support of on-line and off-line transmission and synchronization of data. More specifically, the present invention relates to systems and methods that eliminate redundant data transmission and allow multiple copies of data to be synchronized so that incremental changes made to one copy of the data can be identified, transferred, and incorporated into the other copy of the data, regardless of whether the incremental changes are made on-line or off-line.

2. The Prior State of the Art

With the advent of the personal computer as the standard information tool, individuals everywhere at anytime need access to information. Never before has there been so much information readily available or such high expectations for how much the individual will be able to accomplish by utilizing information. It is now more common than ever for multiple users to simultaneously, or in tandem, work on shared data such as, by way of example, word processing documents, electronic mail messages, spreadsheets, electronic forms, graphic images, or a host of other data objects. Thus, accessing and sharing current and accurate information among multiple users has become increasingly vital to businesses and individuals.

Traditionally, a user desiring to access shared information located on one or more servers has had to work "on-line." More specifically, the user logs on to a network and communicates directly with a server. All requests from the user are sent directly to the server. Prior to disconnecting the communication, the user updates the data object on the server and must request a local copy or else the user will not have access to the data object once he or she logs off the network. Once "off-line," the user has no way of knowing whether the local copy of the data object contains current and accurate information because the data object on the server could have been modified by a second user while the first user was off-line. Furthermore, if the data object on the server was modified by a second user while the first user was off-line and if the first user makes changes to his/her local copy of the data object, logs on to the network, and saves the local copy on the server under the original name of the data object, changes made to the data object by the second user will be overwritten and lost.

Another limitation is highlighted when two or more users desire access to a data object simultaneously. Under the traditional method, a first user is allowed to obtain and edit the data object. Any subsequent users desiring access to the data object are limited to a "read only" access of the data object. Therefore, while the first user is using the data object, the subsequent users can access but cannot edit the data object. In order to edit, a subsequent user would be required to save the data object under a different name. Once the subsequent user completes the edits, the changes made to the data object by the first user will be overwritten and lost if the changes made by the subsequent user are saved on the server under the original name. Alternatively, if the subsequent user saves the data object on the server under a new name, multiple copies of the data object will exist on the server. One copy will contain the changes made by the first user and a second copy will contain the changes made by the subsequent user. Where multiple copies exist, it would be difficult to know which copy, if any, contains the most current and accurate information.

Using conventional techniques, clients and servers have engaged in redundant communication of information when a user has been making changes to a shared data object while the client is on-line and subsequently desires to obtain a local copy of the shared data object for use off-line. In particular, the on-line changes made to the shared data object are transmitted from the client to the server during the on-line operation of the client. When the client is about to go off-line, the client issues a request to the server for the most current copy of the shared data object in order to store the copy locally for off-line use. In response, the server transmits the current copy of the data object, which includes the changes that have recently been made by the client. In other words, the foregoing client/server communication involves changes being sent from client to server and subsequently from server to client. Such repetitive transmission of data in a network can introduce potentially significant increases in network traffic, particularly in large organizations with many clients.

It would therefore be desirable to ensure current and accurate information through a model that would synchronize all copies of a data object. It would also be desirable for a synchronization model to be able to identify which copy of a data object is more current and accurate. It would be desirable for none of the changes to be lost or overwritten when multiple copies of a data object are used to update the copy on the server. There is also a need in the art for any such synchronization model to allow multiple users to access and edit the data object simultaneously. Furthermore, it would be desirable if the synchronization mode could eliminate the creation of redundant copies of the data object. It would also be advantageous to eliminate redundant transmissions of data object between clients and servers. Any synchronization model that could exhibit such capabilities would be particularly useful if it could support changes made to local copies of data objects regardless of whether a client was on-line or off-line with the server.

SUMMARY OF THE INVENTION

The foregoing problems in the prior state of the art have been successfully overcome by the present invention, which is directed to a system and method for elimination of redundant data transmission and for incremental change synchronization between multiple copies of data. The systems and methods of the present invention allow multiple copies of data to be synchronized so that incremental changes made to one copy of the data can be identified, transferred, and incorporated into the other copy of the data. The systems and methods of the present invention produce a more efficient use of time and network bandwidth by eliminating the transmission of redundant data. Furthermore, copies of a data object can be reliably and efficiently synchronized regardless of whether the changes made to a copy of the data object are executed while the client is operating on-line or off-line.

Implementation of the present invention may take place in an environment where multiple copies of a data object or resource are present, or where a data object or resource is shared. By way of example, the present invention can be implemented in an environment where a client is connected to a server. The present invention can also be implemented in an environment where multiple clients are connected to the same server. Another example would include multiple clients connected to multiple servers. In each of the environments, the present invention preserves incremental changes to data object regardless of whether the changes are made while a client is on-line or off-line, ensures that all copies of a data object or resource are synchronized without loss of any incremental changes, and prevents the transmission of redundant data between servers and clients.

As part of the present invention, a client, while connected to a server, identifies to the server the current state of data located at the client and issues a request for the server to evaluate the state of the client's data. The server responds to the request by returning an identification of server data that is not included in the client's data and an identification of the client's data that has been changed on the server. The client is then able to download from or upload to the server new or modified data.

As data is uploaded to or downloaded from the server, the data is saved in a local storage location associated with the client and remains available to the user after the client is no longer connected to the server. In other words, as a client interacts with a server, the client stores a copy of the data object or resource and corresponding identification in cache. Therefore, when the client is "off-line" from the server, the client is still able to work on the data object or resource as if it were "on-line" because a copy is located in the client's cache. Furthermore, the presence of the data object or resource copy in cache prevents the need to download a copy from a server each time that the user desires to obtain the data object or resource. Thus, the repetitive transmission of the same data between a client and server is reduced or eliminated according to the invention.

Later, when the client is again "on-line," all copies of the data object or resource are synchronized. The client identifies to the server the current state of the copy in the client's cache. The server determines if the copy in the client's cache is the most current version of the data object or resource, and all copies of the data object are synchronized to the most current version. If there are conflicts between copies of the data object or resource, the conflicts are detected and resolved and all copies are synchronized to reflect the most current version of the data object or resource.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and objects of the invention are obtained, a more particular description of the invention briefly described above will be rendered by reference to specific embodiments thereof that are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems and methods for the elimination of redundant data transmission in a computer network and for synchronization between multiple copies of data. Multiple copies of data are synchronized so that incremental changes made to one copy of the data can be identified, transferred, and incorporated into all other copies of the data. Eliminating the transmission of redundant data produces a more efficient use of time and network bandwidth. Furthermore, the systems and methods of the present invention support on-line and off-line modes of operation while preserving data transmission efficiency and ensuring reliable synchronization of data.

Embodiments for implementation of the systems and methods of the present invention may comprise a special-purpose or general-purpose computer including computer hardware and/or software components that further include computer-readable media for carrying out or containing computer-executable instructions or data structures. Computer-executable instructions include, for example, instructions and data which cause a special-purpose or general-purpose computer to perform a certain function or group of functions. Computer-readable media can include any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of computer-executable instructions or data structures, or that can be used to store information or data, and that can be accessed by a special-purpose or general-purpose computer.

When information is transferred or provided over a means of communication, such as a network (either hardwired, wireless, or a combination of hardwired or wireless), to a computer, the computer properly views the connection as a computer-readable medium. Thus, any such connection can be properly termed a computer-readable medium.

For purposes of illustration, this description of the invention refers to diagrams and flowcharts depicting the structure or processing of embodiments for implementing the systems and methods of the present invention. Using the diagrams and flowcharts in this manner should not be construed as limiting the scope of the present invention. The description of the invention presented herein makes reference to terminology, methods and concepts from RFC 2518. Therefore, for purposes of the description, RFC 2518 is incorporated herein by reference. Examples of terms used herein and defined in RFC 2518 include "resource" and "collection."

Figure 1A:
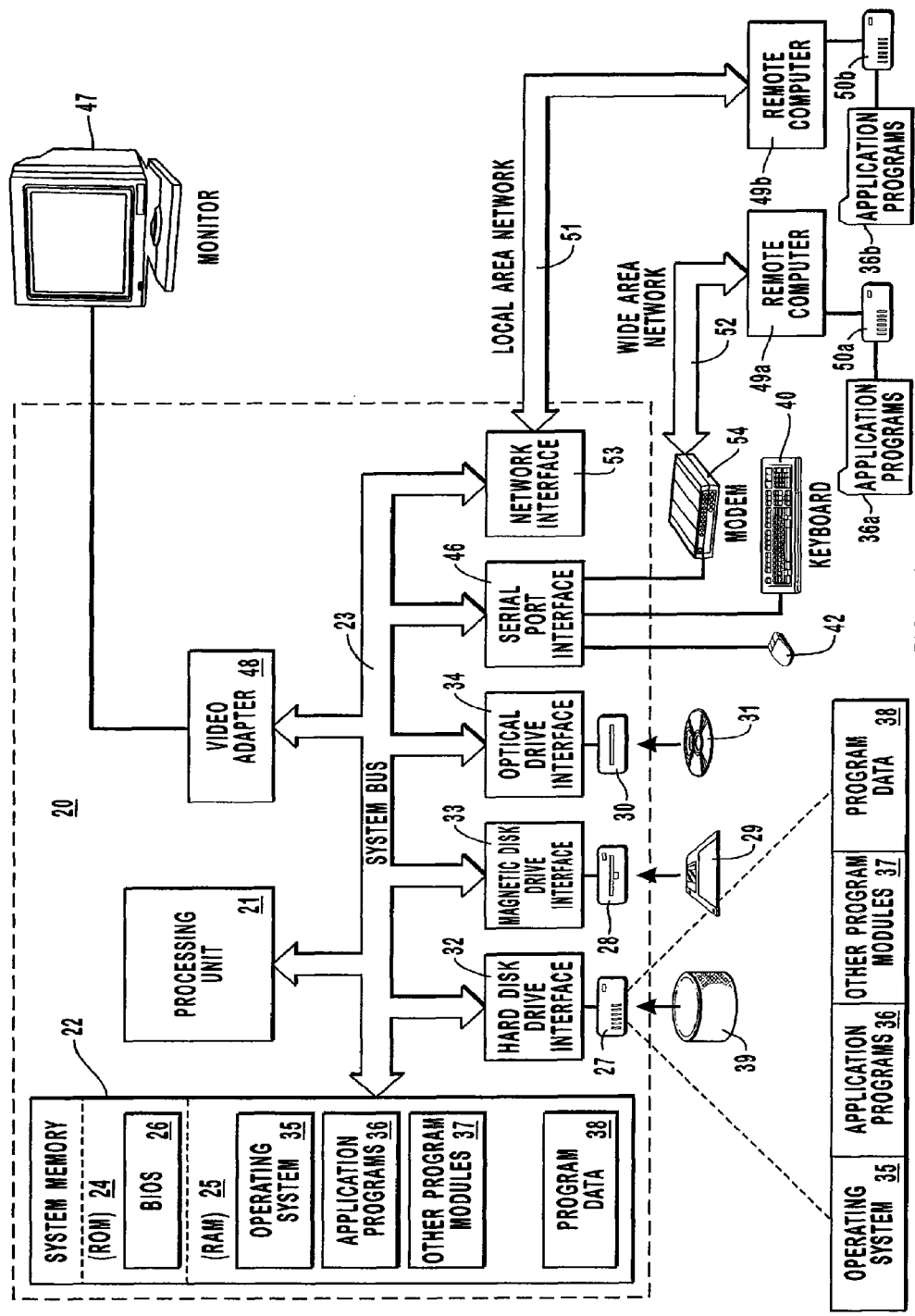
FIG. 1A illustrates an exemplary system that provides a suitable operating environment for the present invention.
Figure 1B:
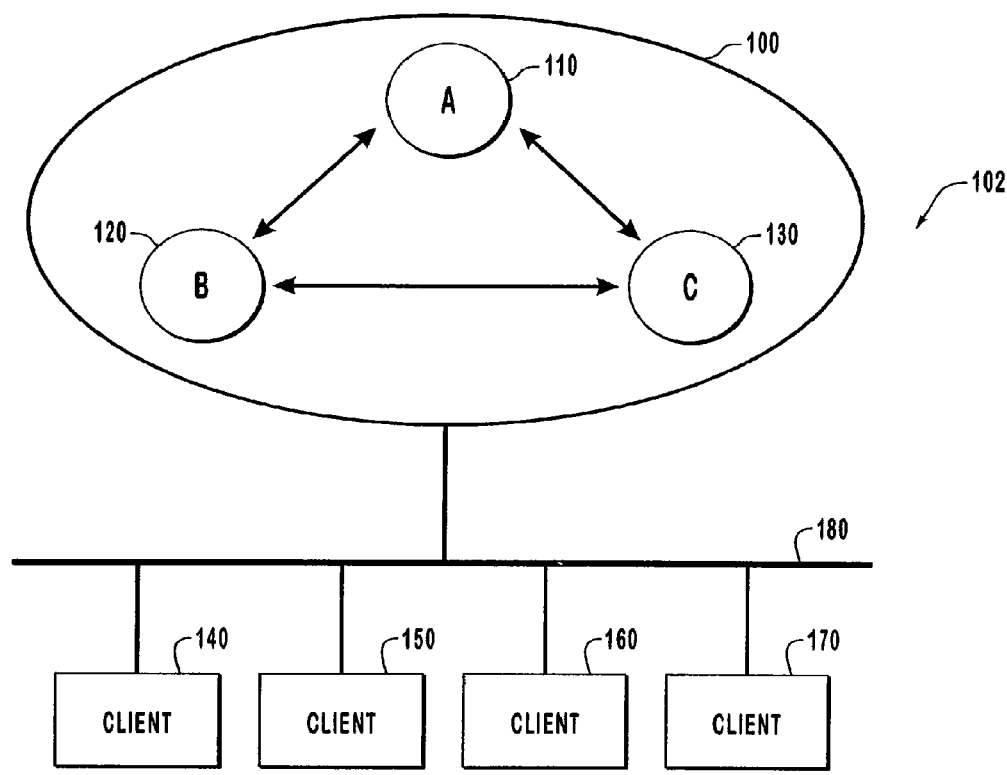
FIG. 1B is a schematic illustration of an exemplary operating environment that highlights the use of one or more leaf nodes connected to a cloud of servers for implementation of the present invention.

FIGS. 1A and 1B provide suitable computing environments in which the invention may be implemented. Although not required, the invention will be described in the general context of computer-executable instructions, such as program modules, being executed by computers in network environments. Generally, program modules include routines, programs, objects, components, data structures, and so forth that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention is described herein in reference to distributed computing environments where tasks are performed by local and remote processing devices that are linked (either by hardwired links, wireless links, or by a combination of hardwired or wireless links) through a communications or computer network. In the distributed computing environment, program modules may be located in both local and remote memory storage devices.

With reference to FIG. 1A, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS)) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically includes many or all of the elements described above relative to the computer 20, although only memory storage devices 50a and 50b and their associated application programs 36a and 36b have been illustrated in FIG. 1A. The logical connections depicted in FIG. 1A include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Now referring to FIG. 1B, an exemplary network environment shown generally at 102 is illustrated. Network 102 includes a cloud of servers 100 that provides network and computing services. The term "cloud of servers" is to be understood as referring to a group of one or more servers, any one of which may be used to provide network and computing services to clients. For purposes of illustration, cloud 100 includes three servers, namely, servers 110, 120, and 130. The number of servers in any particular network in which the invention is practiced is not critical with respect to the manner in which the invention operates. Depending on the size of network 102, the capabilities of the servers, and the network services required by the clients, as few as one server or as many servers as needed may be included in cloud 100. Moreover, the individual servers 110, 120 and 130 in cloud 100 may be in a single general location in an enterprise, or may be located remotely with respect to one another.

Network 102 also includes one or more clients connected to the cloud of servers 100 by way of a data communication infrastructure 180, which may be wired or wireless. For illustration purposes, clients 140, 150, 160, and 170, which may be any special-purpose of general-purpose computers, are depicted in FIG. 1B. As used herein, the term "leaf nodes" shall refer to clients associated with a network in which the invention is employed. In practice, network 102 can have as few as one client or can have as many clients as is required by the enterprise or organization served by the network. While network 102 might have only one client, the full benefits of the invention are often more pronounced when a plurality of clients are associated with the network, since the invention enables access and synchronization of multiple copies of a particular resource that may be shared among any number of clients. Indeed, one of the advantageous features of the invention is that it can reliably and efficiently manage the synchronization of shared resources, even as the number of clients associated with network 100 grows large.

A client can comprise an internal or external computer readable media for providing local, nonvolatile storage of information, as will be further explained below. Servers 110, 120 and 130, are kept in consistent replica of data among themselves so that changes can be entered into any one of the servers. As will be explained below, implementation of the present invention allows for the modifying of a resource by a client regardless of whether that client is logged on or logged off from communication infrastructure 180, ensures synchronization of all copies of a resource whether at a server or at a client, and optimizes network bandwidth and time by preventing redundant transmission of data across infrastructure 180.

Figure 2:
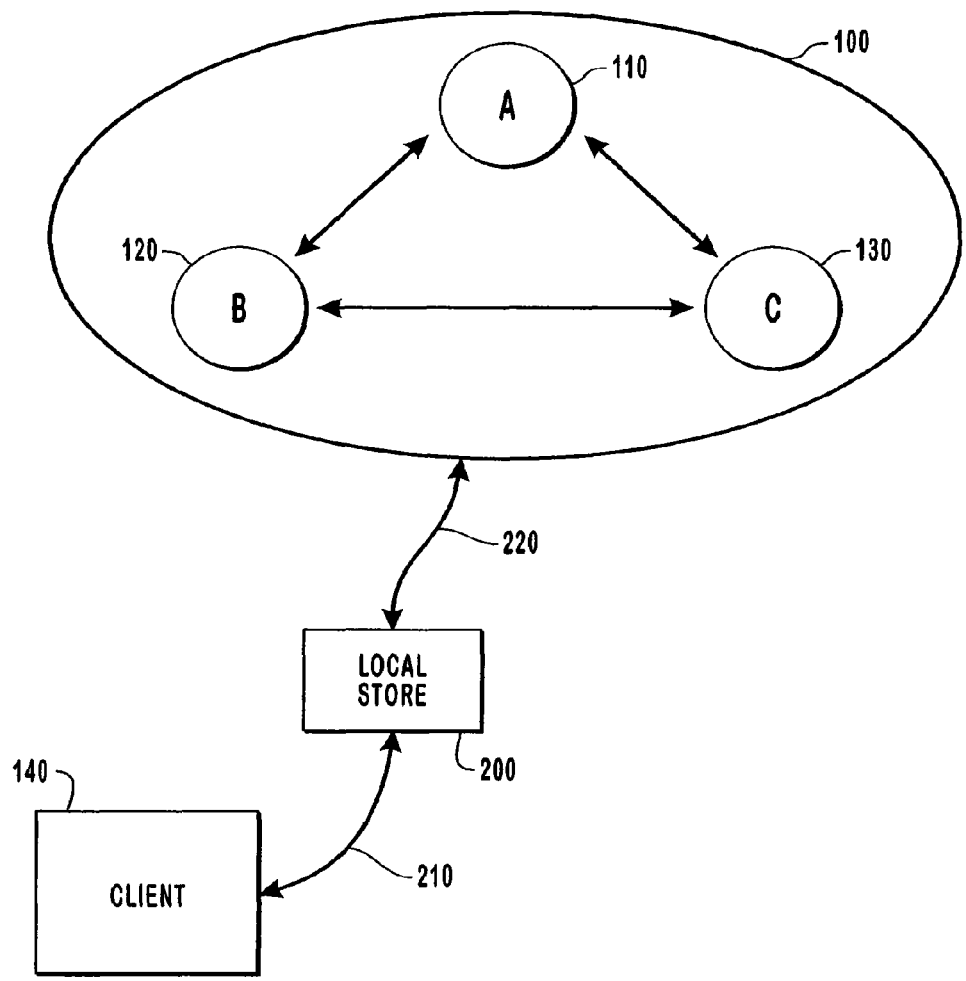
FIG. 2 is a schematic illustration of data transmission between a client and a server that employs a caching mode of operation.

FIG. 2 illustrates an embodiment of the present invention wherein data is transmitted between a server and a client that employs a caching mode of operation. As mentioned above, a client, such as client 140, can comprise an internal or external computer readable media, which may be a nonvolatile storage device providing local storage of information. FIG. 2 illustrates the computer readable media as local store 200.

FIG. 2 illustrates an embodiment of the invention associated with a caching mode of operation in which data is transmitted from client 140 to any one of the servers within the cloud of servers 100. The data can be sent either by way of direct transmission or by first passing the data through local store 200, as depicted by the combination of transmissions 210 and 220. In a further embodiment, when client 140 is on-line with any one of the servers within the cloud of servers 100, all data transmission is sent directly to the server. When client 140 is off-line with servers 100, all data operations, such as read requests, write requests, delete requests and other communication generated for accessing or manipulating a resource is communicated between client 140 and local store 200.

As used herein, the term "on-line" refers to a state in which a client communicates with a server using the communication infrastructure. For example, a client that is sending network requests to a server or receiving network or computing services from the server is on-line. In contrast, the term "off-line" refers to a client that is operating in a state in which it is not immediately capable of actively communicating with a server. For instance, a client that has physically disconnected from a wired communication infrastructure or is not communicating over a wireless communication infrastructure is off-line. Moreover, a client that may be physically connected to a communication infrastructure, but is operating only locally without communicating over the infrastructure can also be considered to be off-line.

In contrast to the communication from client to server illustrated in FIG. 2, all data transmission originating from a server is first passed through local store 200 before reaching client 140 in this embodiment. In this manner, local store 200 can cache all data transmitted from the cloud of servers 100 to client 140. As such, when client 140 is off-line, it can obtain the data cached in local store 200 in a similar way as if client 140 were on-line with any one of the servers within the cloud of servers 100, such as server 110, and obtained the data directly from server 110. Therefore, when client 140 requests data that has been cached in local store 200, it can obtain the data regardless as to whether client 140 is on-line or off-line. Indeed, from the standpoint of client 140, retrieval of a resource from local store 200 during an off-line mode of operation can appear as if the client remained on-line and were accessing the resource from servers 100.

Another embodiment of the invention is associated with a caching mode of operation. In this embodiment the data can only be sent to one of the servers, such as server 110, by first sending the data to local store 200, as depicted by the combination of transmissions 210 and 220. Therefore, local store 200 is involved in all communication with servers 100 while client 140 is on-line and all read requests, write requests, or any other communication generated for accessing or manipulating a resource while the client is off-line.

Similarly, all data transmission originating from a server is first passed through local store 200 before reaching client 140. In this manner local store 200 can cache all data transmitted from the cloud of servers 100 to client 140. As such, when client 140 is off-line, it can obtain the data cached in local store 200 in a similar way as if client 140 were on-line with any one of the servers within the cloud of servers 100. Therefore, when client 140 requests data that has been cached in local store 200, it can obtain the data regardless as to whether client 140 is on-line or off-line.

As introduced above, the systems and methods of the present invention provide for the synchronization between multiple copies of data. Multiple copies of data are synchronized so that incremental changes made to one copy of the data can be identified, transferred, and incorporated into all other copies of the data.

Figure 3:
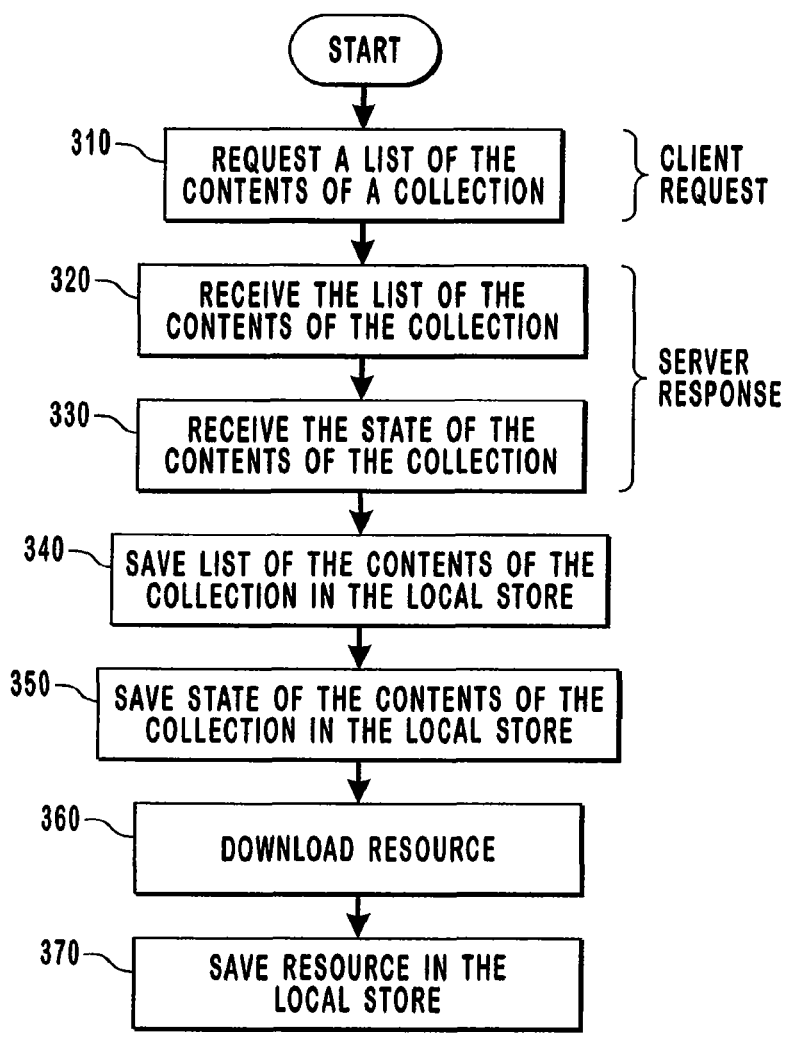
FIG. 3 is a flowchart illustrating an initial synchronization and download during an on-line mode of operation.

FIG. 3 illustrates one embodiment of a method for performing initial synchronization between a client and server and download during an on-line mode of operation. The method of FIG. 3 can be used to coordinate the use and modification of any type of resource. However, in order establish a context in which the following description can be easily understood and not by limitation, the resources could be a set of e-mail messages stored at the server, while the collection could be an inbox that stores the e-mail messages or the resources could be a set of word processing documents, while the collection could be a file system folder that stores the word processing documents. In the following description associated with FIGS. 3-5, specific reference will be made to word processing documents to illustrate this embodiment of the invention. Again, however, the invention can be practiced with any desired type of resource.

In step 310 a client requests a list of the contents of a collection located at a server. The server then responds by transmitting a list of the resources contained in the collection and information that specifies the state of the resources contained in the collection, as respectively illustrated by steps 320 and 330. In step 320 the client receives the list of the contents of the collection. In one embodiment, the list includes identifiers representing each of the resources of the collection. Although not necessary, the identifiers can be compressed prior to transmission to optimize network bandwidth and time. The identifiers can include, for example, a Uniform Resource Identifier (URI) or other information that uniquely identifies the resources.

In step 330 the client receives the information specifying the state of the contents of the collection. The "state" of the contents of a collection stored at a server refers to the identity of the current version of a resource stored at a server. The state of any particular copy of a resource refers to the version of the resource when it was stored at the server. As a particular resource stored at one or more servers undergoes a series of successive updates, the resource is considered to have passed through a corresponding series of states, each of which represents a single update version of the resource. In one embodiment, information specifying the state of the contents of the resources includes an identifiers, which can be termed resource state identifiers. Although not necessary, these identifiers can also be compressed to optimize network bandwidth and time.

In summary, steps 310, 320, and 330 result in the client being given at least two pieces or sets of information associated with the collection specified in the request of step 310. First, the client is given information representing the identity of the various resources that are contained in a collection stored at the server in step 320. Second, the client is given information that essentially represents or is associated with the current update version of the various resources that are contained in the collection in step 330. These two pieces or sets of information can be subsequently used by the methods and systems of the invention to manage synchronization of copies of the resources contained in the collection and to eliminate repetitive transmission of resources or portions of resources between the client and the server as will be further described herein below.

In order to obtain a more detailed description of the processes and mechanisms whereby steps 310, 320, and 330 can be performed, reference is made to U.S. Pat. No. 6,694,335, entitled "Method, Computer Readable Medium, and System For Monitoring The State of A Collection of Resources", filed on Oct. 4, 1999, which is assigned to the same assignee as the present application, and which is incorporated herein by reference; and U.S. Pat. No. 6,578,069, entitled "Method, Data Structure, and Computer Program Product For Identifying A Network Resource", filed on Oct. 4, 1999, which is assigned to the same assignee as the present application, and which is incorporated herein by reference.

In steps 340, 350 and 370 data is cached in a local storage associated with the client. More specifically, in step 340, the list of the contents of the collection received in step 320 is cached in a local storage. In step 350 the state of the contents of the collection received in step 330 is cached in local storage. The client can then obtain one or more resources from the server. In step 360 the client requests and the server downloads a resource and corresponding identifiers in the collection. If, for example, the resources in the collection are word processing documents, the client in 360 can request a selected document. The corresponding identifiers referred to in step 360 can include information that represents the current update version of the downloaded resource. In step 370 the downloaded resource and corresponding identifiers are cached in local storage. For purposes of this description and the accompanying claims, the term "download" refers to data transmission from server to client, whereas "upload" refers to data transmission from client to server.

It should be noted that steps 360 and 370 are optional, depending on whether the user of the client wants to obtain a particular resource at this time. If no resource is downloaded at this time, the client still has obtained information in steps 320 and 330 that identifies the resources contained in the collection and represents the current update version of the resources as they are stored at the server.

Figure 4:
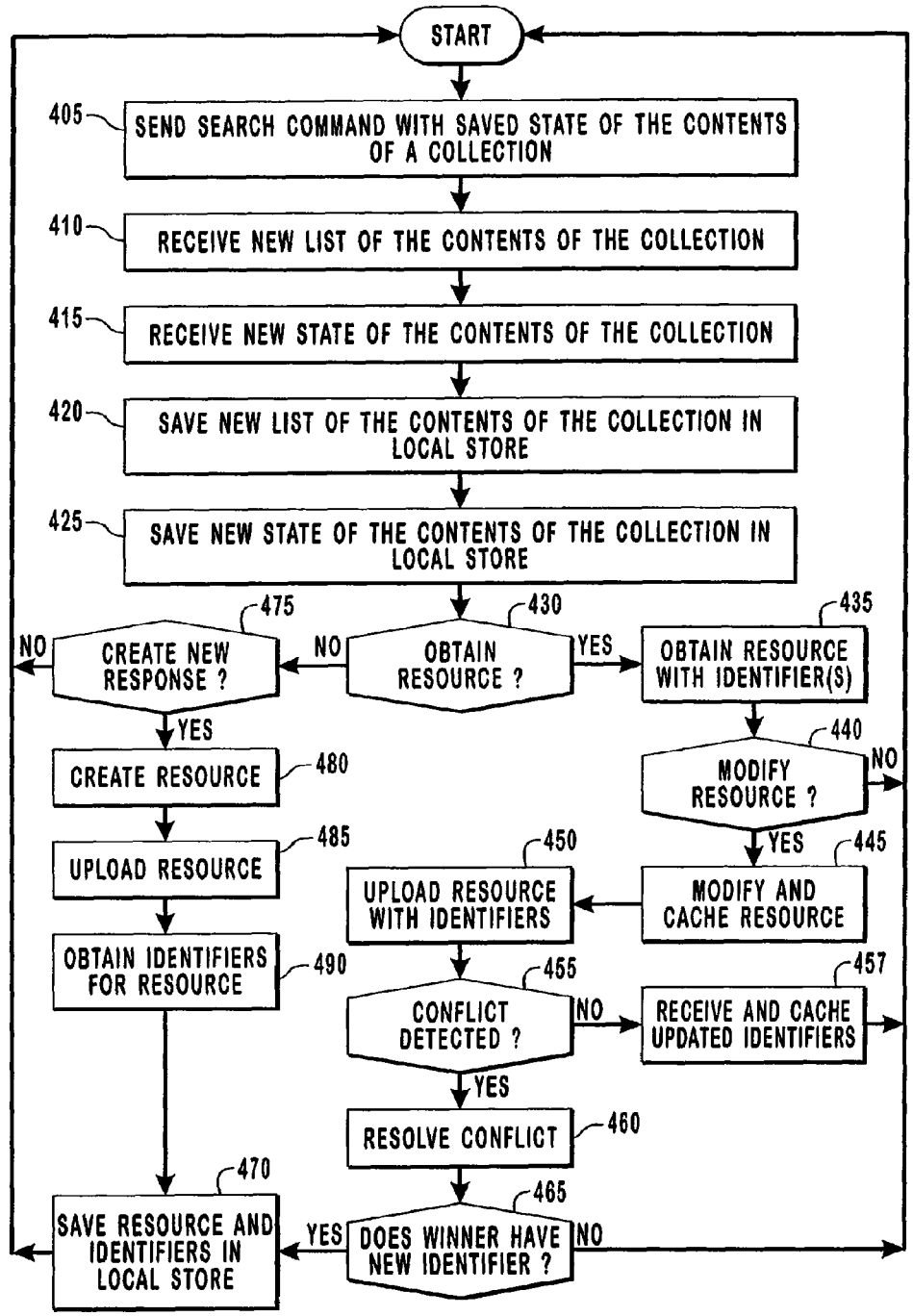
FIG. 4 is a flowchart illustrating a method of resource modification, synchronization, download and/or upload performed after the steps of FIG. 3 during an on-line mode of operation.
Figure 5:
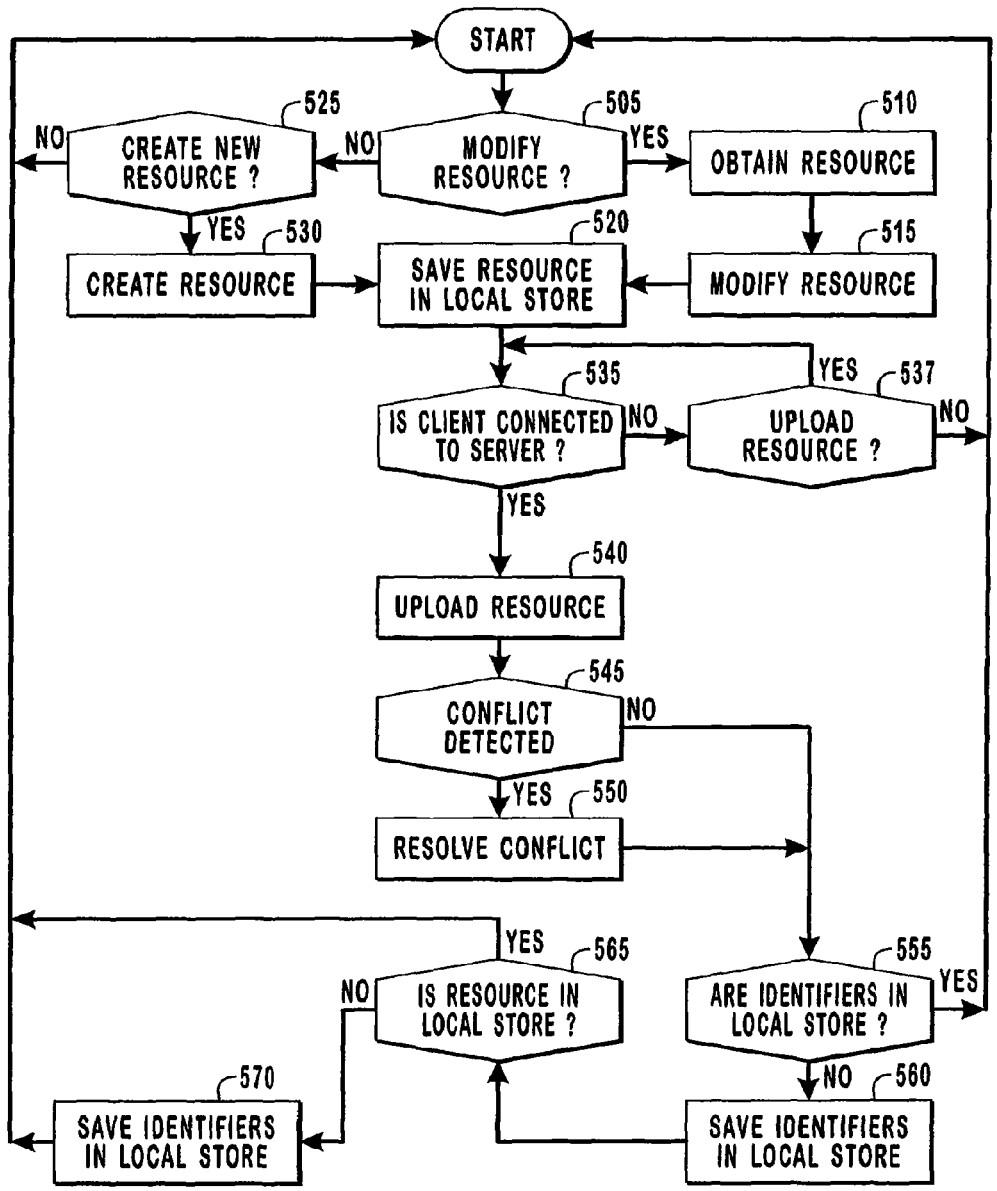
FIG. 5 is a flowchart illustrating a method of off-line resource modification and subsequent resource synchronization that is performed after the steps of FIG. 3.
Figure 6:
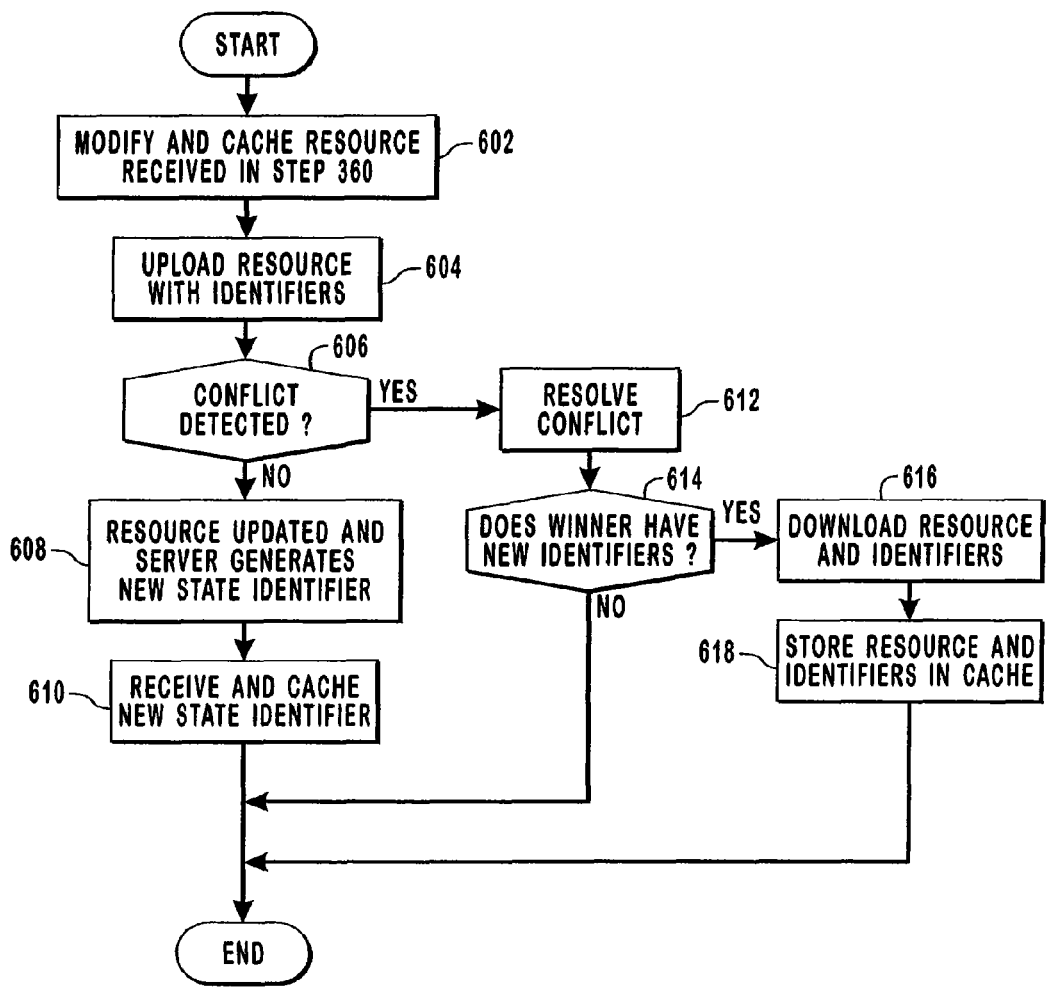
FIG. 6 is a flowchart depicting a method of modifying the resource downloaded in FIG. 3 and synchronizing the modified resource with a copy stored at the server.

FIGS. 4-6 represent various methods and operations that can be performed in the network after the initial synchronization of FIG. 3. FIG. 4 represents a method of performing on-line modification, downloading, uploading, and synchronization of resources. FIG. 5 depicts a method whereby a client modifies a resource off-line, which is later synchronized on-line. Finally, FIG. 6 represents a method of modifying and synchronizing the resource downloaded in step 360 of FIG. 3.

FIG. 4 provides a flowchart illustrating a subsequent resource modification, synchronization, download and/or upload during an on-line mode of operation. The mode of operation in FIG. 4 is "on-line" in the sense that any modification of resources is conducted while the client is on-line. The method illustrated in FIG. 4 is conducted after an initial synchronization has been conducted as shown, for example, in FIG. 3 and assumes that the client operates in the caching mode.

In step 405 of FIG. 4, the client again requests a list of the contents of a collection located at the server. The server then responds by transmitting the list and state of the contents of the collection, as respectively illustrated by steps 410 and 415. In step 410 the client receives a new list of the contents of the collection. Depending on the activity associated with the collection that has been conducted at the server since the time of the previous request (i.e., step 310 of FIG. 3), the list obtained in step 410 can be identical or different from the list obtained in step 320 of FIG. 3. For instance, if a word processing document has been deleted or created at the server (perhaps by a different client) since the time of step 310, the list obtained in step 410 will include information identifying the new word processing document. In contrast, if no changes to the collection have been made, the list received in step 410 will be identical to the list obtained in 320.

In step 415 the client receives a new state of the contents of the collection. In a similar manner, the new state can be identical to the state previously received in step 330 of FIG. 3 or can be an updated version. For example, if an existing word processing document has been modified and stored at the server (perhaps by a different client) since the time of the previous request (i.e., step 310), the state of the modified word processing document will be different, reflecting the updated version of the document. Similarly, if a word processing document has been created or deleted at the server since the time of step 310, the state of the contents of the collection will also be different. In contrast, if no updated versions have been stored and no resources have been created or deleted, the state received in step 415 will be identical to the list received in step 330.

Assuming that the new list and the new state are differ from the previous list and state, steps 420 and 425 cache the new list and new state, respectively, in local storage. Decision block 430 then inquires as to whether the client desires to obtain a resource from the server. If the client does, the method advances to step 435. Otherwise, the method proceeds to decision block 475.

In step 435 the client requests a resource and the identifiers corresponding to the resource. In this step and others that follow, unless otherwise indicated, the "identifiers" refer to at least information that uniquely identifies the resource and information that specifies the update version of the resource. If the resource has never been cached in local storage, the resource and corresponding identifiers are downloaded from the server in step 435. In this manner, repetitive downloading of the same resource to a particular client is eliminated.

Alternatively, if the resource has been previously cached in the local store associated with the requesting client, step 435 involves a comparison that takes place between the state of the resource in the local store with the state of the resource on the server. This comparison is conducted in order to determine whether the copy of the resource stored in the local store is the most recent version or whether a more recent version exists at the server. In other words, the comparison addresses the possibility that another client has modified and updated the requested resource since the last time that the requesting client has obtained the copy of the resource. It should be noted that the comparison requires transmission of an identifier representing the state of the resource, without requiring transmission of the entire resource between client and server. In this manner, the comparison reduces the network traffic that might otherwise be required and avoids transmitting the same version of the resource more than once.

A more detailed explanation of how the comparison can be performed is included in U.S. Pat. No. 6,694,335, entitled "Method, Computer Readable Medium, and System For Monitoring The State of A Collection of Resources", which was previously incorporated herein by reference; and in U.S. Pat. No. 6,994,642, entitled "Systems and Methods for Detecting and Resolving Resource Conflicts", which was filed on Oct. 4, 1999, which was assigned to the same assignee as the present application, and which is incorporated herein by reference.

If the resource at the local store is found to have an identical or more recent state compared to the state of the resource located at the server, then the client obtains the resource in step 435 by accessing the locally stored resource rather than the copy stored at the server, thereby optimizing network bandwidth and time. Otherwise, the resource and corresponding identifiers are downloaded in step 435 from the server and cached in the local store, thereby replacing the stale resource and identifiers that have been stored locally.

Decision block 440 inquires as to whether the client is to modify the resource. For instance, the client is to modify the resource if the user wants to edit the contents of the resource or delete the resource. If the client does not desire to modify the resource, processing returns back to step 405. Otherwise, the client modifies the resource in step 445 and it is cached in local storage.

After the modifications have been performed, the client in step 450 can update the copy of the resource at the server by uploading the resource with its corresponding identifiers. Upon receiving the uploaded resource and corresponding identifiers, the server in decision block 455 compares the state of the uploaded resource with the copy of the resource located at the server to determine whether there is a conflict. In other words, the comparison determines whether the copy of the resource stored at the server has been modified during the period of time that has elapsed since the uploading client last accessed the resource from the cloud of servers. To illustrate further, a conflict may arise when two clients access the same copy of a word processing document stored at a server and both attempt to make and save modifications to the document.

If there is no conflict, the server updates the version of the resource and the identifiers stored at the server and, in step 457, the updated identifiers are received by the client and cached in local storage. Processing then returns to step 405. If a conflict is detected then the conflict is resolved in step 460. A server or a client can perform conflict resolution. Alternatively, a user can be prompted to resolve the conflict. A more detailed description of conflict resolution that can be used with the invention is included in U.S. Pat. No. 6,944,642, entitled "Systems and Methods for Detecting and Resolving Resource Conflicts." Once the conflict has been resolved, decision block 465 inquires as to whether the winning, or more current, resource has corresponding identifiers that are different from the corresponding identifiers located in cache. If the identifiers are identical then processing returns to step 405. Otherwise, the winning resource and corresponding identifier are cached in local storage in step 470.

Returning to decision block 430, if it is determined that the client does not desire to obtain a resource then decision block 475 determines whether the client desires to create a new resource. If the client does not desire to create a new resource then processing returns to step 405. Otherwise, the client creates a new resource in step 480 and the new resource is uploaded to the client in step 485. In step 490 the server assigns identifiers to the new resource and downloads the identifiers to the client. It should be noted that, in this embodiment, the identifiers assigned by the server to the new resource is downloaded to the client in step 490, but the resource is not downloaded, since it already exists at the client. The new resource and corresponding identifiers are cached in local storage in step 470 and processing returns to step 405.

FIG. 5 provides a flowchart illustrating resource modification, synchronization, download and/or upload, some of which can occur during an off-line mode of operation. The mode of operation in FIG. 5 is "off-line" in the sense that modification of resources can be conducted while the client is off-line. For instance, a network user can download a resource, disconnect the client from the network, make modifications to the resource while off-line, and later synchronize while on-line. The method illustrated in FIG. 5 is conducted after an initial synchronization is performed on-line as shown, for example, in FIG. 3. FIG. 5 further assumes that the client operates in the caching mode.

For purposes of illustration, it is presumed that the client begins off-line at decision block 505, which 505 inquires as to whether the client desires to modify a resource. If the client does not desire to modify the resource, then processing proceeds to decision block 525. Otherwise, the client requests and obtains a resource in step 510. Because a presumption is being made that the client is off-line, the client obtains the copy of the requested resource stored in the local store associated with the client in step 510, if such a copy is stored locally. If the resource is not yet cached in the local store, an error is displayed and processing returns to decision block 505. The client modifies the resource in step 515 and it is cached in step 520.

Returning briefly to step 510, if the client had instead been on-line and the requested resource had been stored locally, a comparison would have been made regarding the state of the local copy of the resource and the state of the copy of the resource stored at the server. If the state of the resource stored at the server demonstrated that the server's copy of the resource was more current than the cached copy of the resource, the server's copy and corresponding identifiers would have been downloaded to the client and cached.

Returning now to the off-line presumption and to decision block 505, if the client does not desire to modify the resource, decision block 525 inquires as to whether the client desires to create a new resource. If a new resource is not to be created then processing returns to decision block 505. Otherwise, the new resource is created in step 530 and cached in step 520.

After the resource is cached in step 520, decision block 535 inquires as to whether the client is on-line. If it is not on-line, decision block 537 asks whether the client desires to upload the resource to the server. Processing returns to decision block 505 if the resource is not to be uploaded. Otherwise, processing remains in a loop between decision blocks 535 and 537 until the client is on-line with the server.

Once the client is on-line, the client uploads the resource and the corresponding identifiers to the server in step 540. Upon receiving the uploaded resource and corresponding identifiers the server in decision block 545 compares the state of the uploaded resource with the copy of the resource located at the server, if any. If there is no conflict then the server updates the identifiers and decision block 545 asks whether the corresponding identifiers have been cached.

If a conflict is detected in decision block 545 then the conflict is resolved in step 550. A server or a client can perform conflict resolution. Alternatively, a user can be prompted to resolve the conflict. A more detailed description of conflict resolution that can be used with the invention is included in U.S. Pat. No. 6,944,642, entitled "Systems and Methods for Detecting and Resolving Resource Conflicts."

Decision block 555 inquires as to whether the identifiers corresponding to the winning, or more current, resource are located in cache. If the identifiers are in cache then processing returns to decision block 505. Otherwise, the identifiers are cached in step 560. Decision block 565 inquires as to whether the winning, or more recent, resource is in cache. If it is then processing returns to decision block 505. Otherwise the resource is cached and processing returns to decision block 505.

FIG. 6 illustrates selected steps of a method for modifying and synchronizing the resource that was received by the client in step 360 of FIG. 3. The method illustrated in FIG. 6 is performed after an initial synchronization has been conducted as shown, for example, in FIG. 3 and assumes that the client operates in the caching mode. Step 602 can be executed while the client is on-line or off-line.

In step 602, the client, either in the on-line of off-line mode, modifies the resource received in step 3 of FIG. 3 and stores the changes to the resource in cache in the local store. Later, when the client is on-line and is to initiate synchronization of the resource, it uploads the resource and the corresponding identifiers, including the information (obtained in step 360) that specifies the update version of the copy of the resource stored at the server.

In decision block 606, the server then performs conflict detection as disclosed previously in reference to step 455 of FIG. 4. If no conflict is detected or, in other words, if the copy of the resource to be overwritten at the server has not changed since the time it was downloaded to the client in step 360 of FIG. 3, the server updates the resource in step 608 and generates a new state identifier, which specifies that a new updated version of the resource has been stored at the server. In step 610, the client receives and caches the new state identifier. It is noted that the server does not need to transmit the updated copy of the resource in this embodiment, since the client has already cached this version of the resource in step 602.

Returning to decision block 606, if a conflict is detected, the method advances to step 612, in which the conflict is resolved. A server or a client can perform conflict resolution. Alternatively, a user can be prompted to resolve the conflict. A more detailed description of conflict resolution that can be used with the invention is included in U.S. Pat. No. 6,944,642, entitled "Systems and Methods for Detecting and Resolving Resource Conflicts." Once the conflict has been resolved, decision block 614 inquires as to whether the winning, or more current, resource has new identifiers that are different from the corresponding identifiers located in cache. If the identifiers corresponding to the winning resource are not new, the method illustrated in FIG. 6 ends. Otherwise, the winning resource and corresponding identifiers are downloaded to the client in step 616 and cached in local storage in step 618.

Figure 7A:
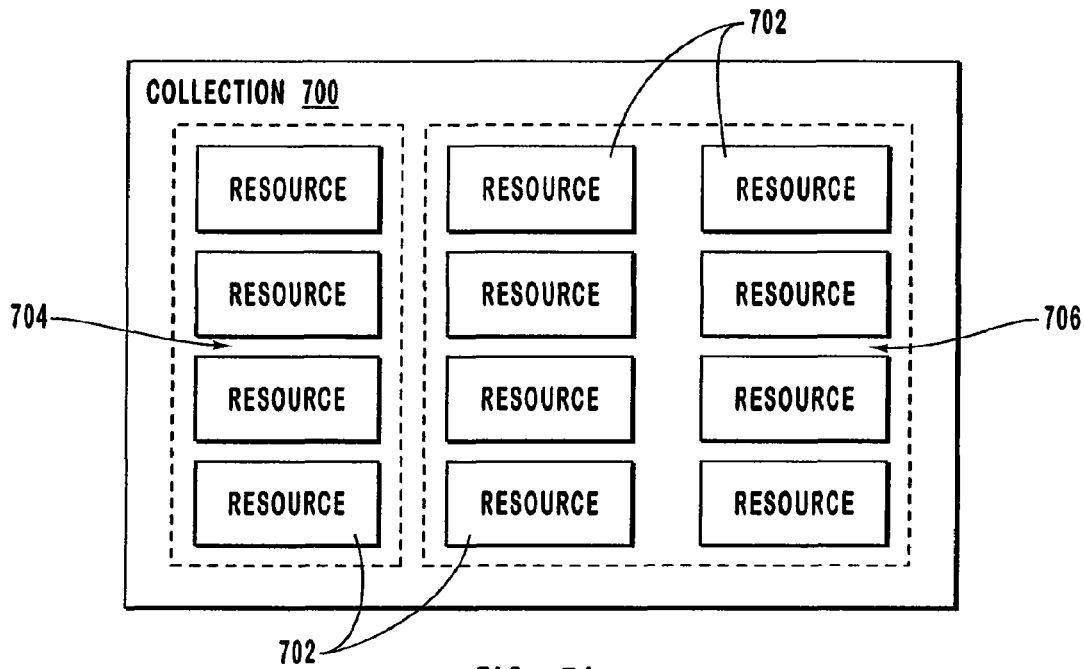
FIG. 7A is a schematic diagram illustrating a collection and resources contained by the collection.
Figure 7B:
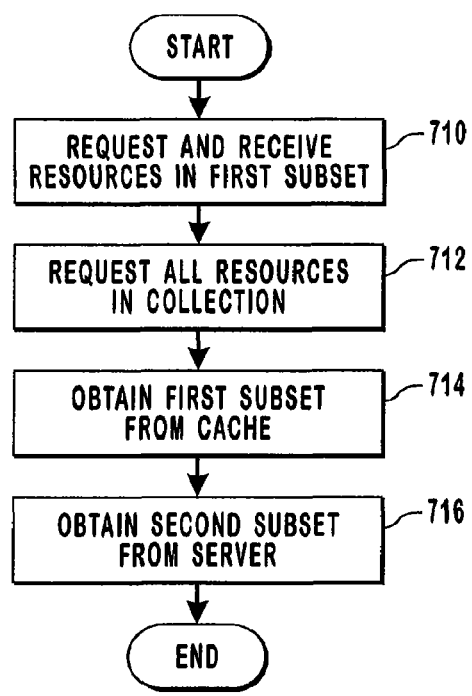
FIG. 7B is a flowchart illustrating a method for efficiently downloading a complete copy of the resources in the collection of FIG. 7A in response by a request by a client.

FIGS. 7A and 7B illustrate one example whereby the invention efficiently uses time and network bandwidth. FIG. 7A depicts a collection 700 that has a plurality of resources 702 contained therein that can be stored at the one or more servers included in the cloud of servers depicted in FIG. 1B. For purposes that will become clear below in reference to FIG. 7B, resources 702 are arbitrarily divided into two mutually exclusive subsets, namely, subset 704 and subset 706. As noted previously, the invention can be practiced with any desired collections and resources. However, in order to establish an clearly understandable context in which FIG. 7B can be described, it will be assumed that resources 702 are e-mail messages, while collection 700 is an inbox that contains the e-mail messages.

FIG. 7B is a flowchart illustrating an example in which a client has been accessing a first set of resources in a collection while on-line and, in preparation for going off-line, requests a copy of all the resources in a collection. Rather than download all of the resources in the collection, the server downloads only those that have not yet been accessed by the client, since the previously accessed resources are cached in the local store associated with the client. The server uses the techniques disclosed above in reference to FIGS. 3-6 to determine which resources have been previously accessed by the client and which are to be downloaded, and these techniques are further described below in reference to the specific steps of FIG. 7B.

In step 710, the client requests only selected resources in collection 700. One specific example of selecting only some resources in a collection might happen when the user of the client is interested in accessing only specific e-mail messages stored in an inbox. For instance, in step 710, the client might request the first subset of resources 704 illustrated in FIG. 7A. While not explicitly illustrated in FIG. 7A, the server transmits the identifiers disclosed above in reference to steps 310, 320, and 330 of FIG. 3 during step 710 for all of the resources 702 of collection 700. Moreover, the downloaded first set of resources 704 are cached in the local store associated with the client, meaning that these same resources will not need to be sent a second time to the client.

In step 712, the client requests all of resources 702 in collection 700. Such a request might occur, for example, when the user of the client is preparing to go off-line and wishes to have access to all the e-mails in the inbox. To execute the request, the client and server perform the operations disclosed above in reference to step 435. In particular, the client obtains the first subset of resources 704 from the cache and the second subset of resources from the server. Moreover, if any of the resources of the first subset have changed at the server since the time at which step 710 was executed, the server downloads those changed resources to the client as further described above in reference to step 435.

In any event, no single version of a resource is sent more than once from the server to the client. In view of this example, it can be clearly seen that the systems and methods of the invention can significantly reduce the time and network traffic that might otherwise be associated with uploading, downloading, and synchronization of resources on a network.

Therefore, as described herein, the systems and methods of the invention eliminate transmission of redundant data by assigning and comparing identifiers for resources to ensure that a resource is transmitted only once to a specific location, thereby producing a more efficient use of time and network bandwidth. The invention also synchronizes multiple copies of a resource by assigning identifiers, comparing identifiers, determining which is the most current resource, and updating the stale resources. Furthermore, no incremental change is lost because resources that are the most current are maintained and because conflicts between resources are detected and resolved. Furthermore, the systems and methods of the present invention support modification of resources while clients are in on-line and off-line modes of operation. Moreover, when a client requests data that has been cached in a local store, it can obtain the data regardless as to whether the client is "on-line" or "off-line."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States Letters Patent is:

1. In a networked system including a server and a client, wherein the server stores resources within a collection, the resources being divided into at least a first subset of resources and a second subset of resources, a method of enabling a client to access the resources, comprising the steps of:
    establishing a first communication link between the client and the server, wherein the establishment of the first communication link results in the client operating in an on-line state;
    while the first communication link is established between the client and the server:
        requesting from the server in a first request a copy of the first subset of resources of the collection, the first request including state identifiers identifying the first subset of resources of the collection;
        in response to the first request for the first subset of resources of the collection, receiving from a local store associated with the client the first subset of resources, the first subset of resources having been previously requested from the server and stored within the local store associated with the client; and
        transmitting to the server state identifiers identifying the first subset of resources received from the local store associated with the client;
    terminating the first communication link between the client and the server, wherein the termination of the first communication link results in the client operating in an off-line state;
    establishing a second communication link between the client and the server, wherein the establishment of the second communication link results in the client operating in the on-line state;
    while the second communication link between the client and server is established:
        requesting from the server in a second request a copy of the second subset of resources of the collection, wherein the second subset of resources of the collection is mutually exclusive from the first subset of resources of the collection, the second subset of resources of the collection has not been previously requested by the client, and the second request does not request a resource within the first subset of resources of the collection, the second request including state identifiers identifying the second subset of resources of the collection; and
        in response to the second request for the second subset of resources of the collection, receiving from the server the second subset of resources and receiving from the server at least one resource corresponding to at least one resource from the first subset of resources received from the local store, wherein the at least one resource corresponding to the at least one resource from the first subset of resources received from the server includes a more recent state than the corresponding at least one resource from the first subset of resources received from the local store, and wherein the at least one resource from the first subset of resources is not included in the second subset of resources.

2. A computer-implemented method implemented in a client device included in a networked system, the networked system being associated with a client device that is capable of accessing, modifying and storing a plurality of resources on a server device, the server device storing the plurality of resources in a collection, the method providing to the client device a synchronized copy of the plurality of resources while avoiding multiple downloads of each particular resource in the collection, the method comprising the steps of:
    establishing a first communication link between the client device and the server device wherein the establishment of the first communication link results in the client device operating in an on-line state;
    while the first communication link between the client device and the server device is established:
        transmitting to the server device a first request for a copy of a first subset of the plurality of resources within the collection, the first request including state identifiers identifying the first subset of the plurality of resources within the collection;
        in response to transmitting the first request for the copy of the first subset of the plurality of resources within the collection, receiving at the client device a copy of the first subset of the plurality of resources within the collection; and
        storing the first subset of the plurality of resources in a local store associated with the client device;
    terminating the first communication link between the client device and the server device without receiving at the client device another copy of the first subset of the plurality of resources within the collection, wherein the termination of the first communication link results in the client device operating in an off-line state;
    establishing a second communication link between the client device and the server device, wherein the establishment of the second communication link results in the client operating in the on-line state; and
    while the second communication link between the client device and the server device is reestablished:
        transmitting to the server device a second request for a copy of a second subset of the plurality of resources within the collection, wherein the second subset of the plurality of resources within the collection is mutually exclusive from the first subset of the plurality of resources within the collection, the second subset of the plurality of resources within the collection has not been previously requested by the client, and the second request does not request a resource within the first subset of resources of the collection, the second request including state identifiers identifying the second subset of the plurality of resources within the collection;

in response to transmitting the second request for the copy of the second subset of the plurality of resources within the collection, receiving at the client device the copy of the second subset of the plurality of resources within the collection; and in response to transmitting the second request for the copy of the second subset of the plurality of resources within the collection, receiving at the client device a copy of at least one resource within the first subset of resources within the collection, wherein the copy of the at least one resource is a modified version of a resource within the first subset of resources that was previously stored within the local store associated with the client device.

3. The method as recited in claim 2 wherein the local store is a nonvolatile storage device that is used as a cache.

4. The method as recited in claim 2, further comprising:
while the first communication link between the client device and the server device is established:
transmitting to the server device an identifier, wherein the identifier represents a state of a version of each resource within the first subset of the plurality of resources stored in the local store associated with the client device.

5. The method as recited in claim 2, further comprising:
while the first communication link between the client device and the server device is established:
storing in the local store associated with the client device the identifier, wherein the identifier represents a state of a version of each resource within the first subset of the plurality of resources stored in the local store associated with the client device.

6. One or more computer storage media not consisting of a propagated data signal, the computer storage media containing computer-executable instructions, that when executed by at least one processor, perform a method, the method being implemented in a client device included in a networked system, the networked system being associated with a client device that is capable of accessing, modifying and storing a plurality of resources on a server device, the server device storing the plurality of resources in a collection, the method providing to the client device a synchronized copy of the plurality of resources while avoiding multiple downloads of each particular resource in the collection, the method comprising the steps of:

establishing a first communication link between the client device and the server device, wherein the establishment of the first communication link results in the client device operating in an on-line state;

while the first communication link between the client device and the server device is established:
transmitting to the server device a first request for a copy of a first subset of the plurality of resources within the collection, the first request including state identifiers identifying the first subset of the plurality of resources within the collection;

in response to transmitting the first request for the copy of the first subset of the plurality of resources within the collection, receiving at the client device a copy of the first subset of the plurality of resources within the collection; and storing the first subset of the plurality of resources in a local store associated with the client device;

terminating the first communication link between the client device and the server device without receiving at the client device another copy of the first subset of the plurality of resources within the collection, wherein the termination of the first communication link results in the client device operating in an off-line state;

establishing a second communication link between the client device and the server device, wherein the establishment of the second communication link results in the client device operating in the on-line state; and while the second communication link between the client device and the server device is reestablished:
transmitting to the server device a second request for a copy of a second subset of the plurality of resources within the collection, wherein the second subset of the plurality of resources within the collection is mutually exclusive from the first subset of the plurality of resources within the collection, the second subset of the plurality of resources within the collection has not been previously requested by the client, and the second request does not request a resource within the first subset of resources of the collection, the second request including state identifiers identifying the second subset of the plurality of resources within the collection;

in response to transmitting the second request for the copy of the second subset of the plurality of resources within the collection, receiving at the client device the copy of the second subset of the plurality of resources within the collection; and in response to transmitting the second request for the copy of the second subset of the plurality of resources within the collection, receiving at the client device a copy of at least one resource within the first subset of resources within the collection, wherein the copy of the at least one resource is a modified version of a resource within the first subset of resources that was previously stored within the local store associated with the client device.

7. The computer storage media as recited in claim 6 wherein the local store is a nonvolatile storage device that is used as a cache.

8. The computer storage media as recited in claim 6, further comprising:
while the first communication link between the client device and the server device is established:
transmitting to the server device an identifier, wherein the identifier represents a state of a version of each resource within the first subset of the plurality of resources stored in the local store associated with the client device.

9. The computer storage media as recited in claim 6, further comprising:
while the first communication link between the client device and the server device is established:
storing in the local store associated with the client device an identifier, wherein the identifier represents a state of a version of each resource within the first subset of the plurality of resources stored in the local store associated with the client device.

10. A computer system within a computer network, the computer system being associated with a client device that is capable of accessing, modifying and storing a plurality of resources on a server device, the server device storing the plurality of resources in a collection, wherein the computer system provides to the client device a synchronized copy of the plurality of resources while avoiding multiple downloads of each particular resource in the collection, the computer system comprising:

at least one processor; and
at least one memory, communicatively coupled to the at least one processor and containing instructions that, when executed by the at least one processor, perform a method, comprising:
establishing a first communication link between the client device and the server device, wherein the establishment of the first communication link results in the client device operating in an on-line state;
while the first communication link between the client device and the server device is established:
transmitting to the server device a first request for a copy of a first subset of the plurality of resources within the collection, the first request including state identifiers identifying the first subset of the plurality of resources within the collection;
in response to transmitting the first request for the copy of the first subset of the plurality of resources within the collection, receiving at the client device a copy of the first subset of the plurality of resources within the collection; and
storing the first subset of the plurality of resources in a local store associated with the client device;
terminating the first communication link between the client device and the server device without receiving at the client device another copy of the first subset of the plurality of resources within the collection, wherein the termination of the first communication link results in the client device operating in an off-line state;
establishing a second communication link between the client device and the server device, wherein the establishment of the second communication link results in the client device operating in the on-line state; and
while the second communication link between the client device and the server device is reestablished:
transmitting to the server device a second request for a copy of a second subset of the plurality of resources within the collection, wherein the second subset of the plurality of resources within the collection is mutually exclusive from the first subset of the plurality of resources within the collection, the second subset of the plurality of resources within the collection has not been previously requested by the client, and the second request does not request a resource within the first subset of resources of the collection, the second request including state identifiers identifying the second subset of the plurality of resources within the collection;
in response to transmitting the second request for the copy of the second subset of the plurality of resources within the collection, receiving at the client device the copy of the second subset of the plurality of resources within the collection; and
in response to transmitting the second request for the copy of the second subset of the plurality of resources within the collection, receiving at the client device a copy of at least one resource within the first subset of resources within the collection, wherein the copy of the at least one resource is a modified version of a resource within the first subset of resources that was previously stored within the local store associated with the client device.

11. The computer system as recited in claim 10 wherein the local store is a nonvolatile storage device that is used as a cache.

12. The computer system as recited in claim 10, further comprising:
while the first communication link between the client device and the server device is established:
transmitting to the server device an identifier, wherein the identifier represents a state of a version of each resource within the first subset of the plurality of resources stored in the local store associated with the client device.

13. The computer system as recited in claim 10, further comprising:
while the first communication link between the client device and the server device is established:
storing in the local store associated with the client device an identifier, wherein the identifier represents a state of a version of each resource within the first subset of the plurality of resources stored in the local store associated with the client device.

* * * * *